(12) United States Patent
Joshi et al.

(10) Patent No.: US 9,201,677 B2
(45) Date of Patent: Dec. 1, 2015

(54) MANAGING DATA INPUT/OUTPUT OPERATIONS

(75) Inventors: Vikram Joshi, Los Gatos, CA (US);
Yang Luan, San Jose, CA (US); Manish R. Apte, San Jose, CA (US); Hrishikesh A. Vidwans, San Jose, CA (US);
Michael F. Brown, Arlington, MA (US)

(73) Assignee: Intelligent Intellectual Property Holdings 2 LLC, Wilmington, DE (US)

( * ) Notice: Subject to any disclaimer, the term of this patent is extended or adjusted under 35 U.S.C. 154(b) by 990 days.

(21) Appl. No.: 13/192,365

(22) Filed: Jul. 27, 2011

(65) Prior Publication Data
US 2012/0304171 A1 Nov. 29, 2012

Related U.S. Application Data

(60) Provisional application No. 61/489,230, filed on May 23, 2011.

(51) Int. Cl.
*G06F 9/455* (2006.01)
*G06F 12/08* (2006.01)

(52) U.S. Cl.
CPC .......... *G06F 9/45558* (2013.01); *G06F 12/084* (2013.01); *G06F 12/0871* (2013.01); *G06F 2009/45583* (2013.01); *G06F 2212/152* (2013.01); *G06F 2212/601* (2013.01)

(58) Field of Classification Search
CPC .......... G06F 9/45537; G06F 9/45533; G06F 9/5016; G06F 3/0679; G06F 2212/2022; G06F 12/0848; G06F 12/084; G06F 9/45558; G06F 12/0871; G06F 2009/45583; G06F 2212/152; G06F 2212/601
USPC ............. 711/6, 170, 171, 172, 173, 103, 129, 711/130, 147, 152, 153; 718/104
See application file for complete search history.

(56) References Cited

U.S. PATENT DOCUMENTS

| 4,571,674 | A | 2/1986 | Hartung |
| 5,043,871 | A | 8/1991 | Nishigaki et al. |
| 5,193,184 | A | 3/1993 | Belsan et al. |
| 5,261,068 | A | 11/1993 | Gaskins et al. |
| 5,291,496 | A | 3/1994 | Andaleon et al. |

(Continued)

FOREIGN PATENT DOCUMENTS

| CN | 1771495 | 5/2006 |
| EP | 1100001 | 5/2001 |

(Continued)

OTHER PUBLICATIONS

WIPO, International Search Report and Written Opinion for PCT/US2012/039189, mailed Dec. 27, 2012.

(Continued)

*Primary Examiner* — Reginald Bragdon
*Assistant Examiner* — Mehdi Namazi

(57) ABSTRACT

Systems and methods for managing data input/output operations are described that include virtual machines operating with a shared storage within a host. In such a system, a computer-implemented method is provided for dynamically provisioning cache storage while operating system applications continue to operate, including stalling the virtual machine's local cache storage operations, changing the provision of cache storage size; and resuming the operations of the virtual machine.

21 Claims, 24 Drawing Sheets

(56) References Cited

U.S. PATENT DOCUMENTS

| | | |
|---|---|---|
| 5,307,497 A | 4/1994 | Feigenbaum |
| 5,313,475 A | 5/1994 | Cromer et al. |
| 5,325,509 A | 6/1994 | Lautzenhaiser |
| 5,392,427 A | 2/1995 | Barrett et al. |
| 5,404,485 A | 4/1995 | Ban |
| 5,438,671 A | 8/1995 | Miles |
| 5,469,555 A | 11/1995 | Ghosh et al. |
| 5,499,354 A | 3/1996 | Aschoff et al. |
| 5,504,882 A | 4/1996 | Chai |
| 5,535,399 A | 7/1996 | Blitz et al. |
| 5,551,003 A | 8/1996 | Mattson et al. |
| 5,553,261 A | 9/1996 | Hasbun et al. |
| 5,559,988 A | 9/1996 | Durante et al. |
| 5,586,291 A | 12/1996 | Lasker et al. |
| 5,594,883 A | 1/1997 | Pricer |
| 5,596,736 A | 1/1997 | Kerns |
| 5,598,370 A | 1/1997 | Nijima et al. |
| 5,603,001 A | 2/1997 | Sukegawa et al. |
| 5,651,133 A | 7/1997 | Burkes |
| 5,680,579 A | 10/1997 | Young et al. |
| 5,682,497 A | 10/1997 | Robinson |
| 5,682,499 A | 10/1997 | Bakke et al. |
| 5,701,434 A | 12/1997 | Nakagawa |
| 5,734,861 A | 3/1998 | Cohn et al. |
| 5,740,367 A | 4/1998 | Spilo |
| 5,745,792 A | 4/1998 | Jost |
| 5,754,563 A | 5/1998 | White |
| 5,757,567 A | 5/1998 | Hetzler et al. |
| 5,787,486 A | 7/1998 | Chin et al. |
| 5,802,602 A | 9/1998 | Rahman et al. |
| 5,809,527 A | 9/1998 | Cooper et al. |
| 5,809,543 A | 9/1998 | Byers et al. |
| 5,845,313 A | 12/1998 | Estakhri et al. |
| 5,845,329 A | 12/1998 | Onishi et al. |
| 5,860,083 A | 1/1999 | Sukegawa |
| 5,907,856 A | 5/1999 | Estakhri et al. |
| 5,924,113 A | 7/1999 | Estakhri et al. |
| 5,930,815 A | 7/1999 | Estakhri et al. |
| 5,957,158 A | 9/1999 | Volz et al. |
| 5,960,462 A | 9/1999 | Solomon et al. |
| 5,961,660 A | 10/1999 | Capps, Jr. et al. |
| 6,000,019 A | 12/1999 | Dykstal et al. |
| 6,014,724 A | 1/2000 | Jennett |
| 6,073,232 A | 6/2000 | Kroeker et al. |
| 6,075,938 A | 6/2000 | Bugnion et al. |
| 6,101,601 A | 8/2000 | Matthews et al. |
| 6,115,703 A | 9/2000 | Bireley et al. |
| 6,128,695 A | 10/2000 | Estakhri et al. |
| 6,141,249 A | 10/2000 | Estakhri et al. |
| 6,145,051 A | 11/2000 | Estakhri et al. |
| 6,170,039 B1 | 1/2001 | Kishida |
| 6,170,047 B1 | 1/2001 | Dye |
| 6,172,906 B1 | 1/2001 | Estakhri et al. |
| 6,173,381 B1 | 1/2001 | Dye |
| 6,185,654 B1 | 2/2001 | Van Doren |
| 6,209,088 B1 | 3/2001 | Reneris |
| 6,223,308 B1 | 4/2001 | Estakhri et al. |
| 6,230,234 B1 | 5/2001 | Estakhri et al. |
| 6,236,593 B1 | 5/2001 | Hong et al. |
| 6,240,040 B1 | 5/2001 | Akaogi et al. |
| 6,256,642 B1 | 7/2001 | Krueger et al. |
| 6,266,785 B1 | 7/2001 | McDowell |
| 6,279,069 B1 | 8/2001 | Robinson et al. |
| 6,289,413 B1 | 9/2001 | Rogers et al. |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,393,513 B2 | 5/2002 | Estakhri et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,507,883 B1 | 1/2003 | Bello et al. |
| 6,507,911 B1 | 1/2003 | Langford |
| 6,516,380 B2 | 2/2003 | Kenchammana-Hoskote et al. |
| 6,523,102 B1 | 2/2003 | Dye et al. |
| 6,564,285 B1 | 5/2003 | Mills et al. |
| 6,567,889 B1 | 5/2003 | DeKoning et al. |
| 6,587,915 B1 | 7/2003 | Kim |
| 6,587,937 B1 | 7/2003 | Jensen et al. |
| 6,601,211 B1 | 7/2003 | Norman |
| 6,625,685 B1 | 9/2003 | Cho et al. |
| 6,629,112 B1 | 9/2003 | Shank |
| 6,658,438 B1 | 12/2003 | Moore et al. |
| 6,671,757 B1 | 12/2003 | Multer et al. |
| 6,675,349 B1 | 1/2004 | Chen |
| 6,715,027 B2 | 3/2004 | Kim et al. |
| 6,715,046 B1 | 3/2004 | Shoham et al. |
| 6,728,851 B1 | 4/2004 | Estakhri et al. |
| 6,742,082 B1 | 5/2004 | Lango et al. |
| 6,751,155 B2 | 6/2004 | Gorobets |
| 6,754,774 B2 | 6/2004 | Gruner et al. |
| 6,757,800 B1 | 6/2004 | Estakhri et al. |
| 6,766,413 B2 | 7/2004 | Newman |
| 6,775,185 B2 | 8/2004 | Fujisawa et al. |
| 6,779,088 B1 | 8/2004 | Benveniste et al. |
| 6,779,094 B2 | 8/2004 | Selkirk et al. |
| 6,785,776 B2 | 8/2004 | Arimilli et al. |
| 6,785,785 B2 | 8/2004 | Piccirillo et al. |
| 6,801,979 B1 | 10/2004 | Estakhri |
| 6,804,755 B2 | 10/2004 | Selkirk et al. |
| 6,877,076 B1 | 4/2005 | Cho et al. |
| 6,880,049 B2 | 4/2005 | Gruner et al. |
| 6,883,069 B2 | 4/2005 | Yoshida |
| 6,883,079 B1 | 4/2005 | Priborsky |
| 6,910,170 B2 | 6/2005 | Choi et al. |
| 6,912,537 B2 | 6/2005 | Selkirk et al. |
| 6,912,618 B2 | 6/2005 | Estakhri et al. |
| 6,925,533 B2 | 8/2005 | Lewis |
| 6,938,133 B2 | 8/2005 | Johnson et al. |
| 6,957,158 B1 | 10/2005 | Hancock et al. |
| 6,959,369 B1 | 10/2005 | Ashton et al. |
| 6,977,599 B2 | 12/2005 | Widmer |
| 6,978,342 B1 | 12/2005 | Estakhri et al. |
| 6,981,070 B1 | 12/2005 | Luk et al. |
| 6,996,676 B2 | 2/2006 | Megiddo |
| 7,010,652 B2 | 3/2006 | Piccirillo et al. |
| 7,010,662 B2 | 3/2006 | Aasheim et al. |
| 7,013,376 B2 | 3/2006 | Hooper, III |
| 7,013,379 B1 | 3/2006 | Testardi |
| 7,035,974 B2 | 4/2006 | Shang |
| 7,036,040 B2 | 4/2006 | Nicholson et al. |
| 7,043,599 B1 | 5/2006 | Ware et al. |
| 7,047,366 B1 | 5/2006 | Ezra |
| 7,050,337 B2 | 5/2006 | Iwase et al. |
| 7,058,769 B1 | 6/2006 | Danilak |
| 7,069,393 B2 | 6/2006 | Miyata et al. |
| 7,073,028 B2 | 7/2006 | Lango et al. |
| 7,076,560 B1 | 7/2006 | Lango et al. |
| 7,076,599 B2 | 7/2006 | Aasheim et al. |
| 7,076,723 B2 | 7/2006 | Saliba |
| 7,082,495 B2 | 7/2006 | DeWhitt et al. |
| 7,082,512 B2 | 7/2006 | Aasheim et al. |
| 7,085,879 B2 | 8/2006 | Aasheim et al. |
| 7,089,391 B2 | 8/2006 | Geiger et al. |
| 7,093,101 B2 | 8/2006 | Aasheim et al. |
| 7,096,321 B2 | 8/2006 | Modha |
| 7,111,140 B2 | 9/2006 | Estakhri et al. |
| 7,130,956 B2 | 10/2006 | Rao |
| 7,130,957 B2 | 10/2006 | Rao |
| 7,143,228 B2 | 11/2006 | Lida et al. |
| 7,149,947 B1 | 12/2006 | MacLellan et al. |
| 7,155,531 B1 | 12/2006 | Lango et al. |
| 7,167,953 B2 | 1/2007 | Megiddo et al. |
| 7,171,536 B2 | 1/2007 | Chang et al. |
| 7,173,852 B2 | 2/2007 | Gorobets et al. |
| 7,178,081 B2 | 2/2007 | Lee et al. |
| 7,181,572 B2 | 2/2007 | Walmsley |
| 7,194,577 B2 | 3/2007 | Johnson et al. |
| 7,194,740 B1 | 3/2007 | Frank et al. |
| 7,197,657 B1 | 3/2007 | Tobias |
| 7,203,815 B2 | 4/2007 | Haswell |
| 7,215,580 B2 | 5/2007 | Gorobets |

(56) References Cited

U.S. PATENT DOCUMENTS

| | | |
|---|---|---|
| 7,219,238 B2 | 5/2007 | Saito et al. |
| 7,234,082 B2 | 6/2007 | Lai et al. |
| 7,243,203 B2 | 7/2007 | Scheuerlein |
| 7,246,179 B2 | 7/2007 | Camara et al. |
| 7,254,686 B2 | 8/2007 | Islam |
| 7,260,820 B1 | 8/2007 | Waldspurger et al. |
| 7,272,606 B2 | 9/2007 | Borthakur et al. |
| 7,275,135 B2 | 9/2007 | Coulson |
| 7,280,536 B2 | 10/2007 | Testardi |
| 7,293,183 B2 | 11/2007 | Lee et al. |
| 7,305,520 B2 | 12/2007 | Voight et al. |
| 7,337,201 B1 | 2/2008 | Yellin et al. |
| 7,340,558 B2 | 3/2008 | Lee et al. |
| 7,340,566 B2 | 3/2008 | Voth et al. |
| 7,356,651 B2 | 4/2008 | Liu et al. |
| 7,360,015 B2 | 4/2008 | Matthews et al. |
| 7,360,037 B2 | 4/2008 | Higaki et al. |
| 7,366,808 B2 | 4/2008 | Kano et al. |
| 7,392,365 B2 | 6/2008 | Selkirk et al. |
| 7,395,384 B2 | 7/2008 | Sinclair et al. |
| 7,398,348 B2 | 7/2008 | Moore et al. |
| 7,424,593 B2 | 9/2008 | Estakhri et al. |
| 7,437,510 B2 | 10/2008 | Rosenbluth et al. |
| 7,441,090 B2 | 10/2008 | Estakhri et al. |
| 7,447,847 B2 | 11/2008 | Louie et al. |
| 7,450,420 B2 | 11/2008 | Sinclair et al. |
| 7,464,221 B2 | 12/2008 | Nakamura et al. |
| 7,487,235 B2 | 2/2009 | Andrews et al. |
| 7,487,320 B2 | 2/2009 | Bansai et al. |
| 7,500,000 B2 | 3/2009 | Groves et al. |
| 7,516,267 B2 | 4/2009 | Coulson et al. |
| 7,526,614 B2 | 4/2009 | van Riel |
| 7,529,905 B2 | 5/2009 | Sinclair |
| 7,536,491 B2 | 5/2009 | Kano et al. |
| 7,549,022 B2 | 6/2009 | Baker |
| 7,552,271 B2 | 6/2009 | Sinclair et al. |
| 7,580,287 B2 | 8/2009 | Aritome |
| 7,603,532 B2 | 10/2009 | Rajan et al. |
| 7,610,348 B2 | 10/2009 | Kisley et al. |
| 7,617,375 B2 | 11/2009 | Flemming et al. |
| 7,640,390 B2 | 12/2009 | Iwamura et al. |
| 7,644,239 B2 | 1/2010 | Ergan et al. |
| 7,660,911 B2 | 2/2010 | McDaniel |
| 7,660,941 B2 | 2/2010 | Lee et al. |
| 7,664,239 B2 | 2/2010 | Groff et al. |
| 7,669,019 B2 | 2/2010 | Fujibayashi et al. |
| 7,673,108 B2 | 3/2010 | Iyengar et al. |
| 7,676,628 B1 | 3/2010 | Compton et al. |
| 7,685,367 B2 | 3/2010 | Ruia et al. |
| 7,694,065 B2 | 4/2010 | Petev et al. |
| 7,702,873 B2 | 4/2010 | Griess et al. |
| 7,721,047 B2 | 5/2010 | Dunshea et al. |
| 7,721,059 B2 | 5/2010 | Mylly et al. |
| 7,725,628 B1 | 5/2010 | Phan et al. |
| 7,801,894 B1 | 9/2010 | Bone et al. |
| 7,805,449 B1 | 9/2010 | Bone et al. |
| 7,831,783 B2 | 11/2010 | Pandit et al. |
| 7,831,977 B2 | 11/2010 | Shultz et al. |
| 7,853,772 B2 | 12/2010 | Chang et al. |
| 7,873,782 B2 | 1/2011 | Terry et al. |
| 7,873,803 B2 | 1/2011 | Cheng |
| 7,882,305 B2 | 2/2011 | Moritoki |
| 7,904,647 B2 | 3/2011 | El-Batal et al. |
| 7,913,051 B1 | 3/2011 | Todd et al. |
| 7,917,803 B2 | 3/2011 | Stefanus et al. |
| 7,941,591 B2 | 5/2011 | Aviles |
| 7,984,230 B2 | 7/2011 | Nasu et al. |
| 8,046,526 B2 | 10/2011 | Yeh |
| 8,055,820 B2 | 11/2011 | Sebire |
| 8,060,683 B2 | 11/2011 | Schultz et al. |
| 8,095,764 B1 | 1/2012 | Bauer et al. |
| 8,135,900 B2 | 3/2012 | Kunimatsu et al. |
| 8,135,904 B2 | 3/2012 | Lasser et al. |
| 8,151,077 B1 | 4/2012 | Bauer et al. |
| 8,151,082 B2 | 4/2012 | Flynn et al. |
| 8,171,204 B2 | 5/2012 | Chow et al. |
| 8,195,929 B2 | 6/2012 | Banga et al. |
| 8,214,583 B2 | 7/2012 | Sinclair et al. |
| 8,244,935 B2 | 8/2012 | Leventhal et al. |
| 8,479,294 B1 | 7/2013 | Li et al. |
| 8,549,222 B1 | 10/2013 | Kleiman et al. |
| 2002/0069317 A1 | 6/2002 | Chow et al. |
| 2002/0069318 A1 | 6/2002 | Chow et al. |
| 2002/0103819 A1 | 8/2002 | Duvillier |
| 2002/0161855 A1 | 10/2002 | Manczak et al. |
| 2002/0181134 A1 | 12/2002 | Bunker et al. |
| 2002/0188711 A1 | 12/2002 | Meyer et al. |
| 2002/0194451 A1 | 12/2002 | Mukaida et al. |
| 2003/0061296 A1 | 3/2003 | Craddock et al. |
| 2003/0061550 A1 | 3/2003 | Ng et al. |
| 2003/0093741 A1 | 5/2003 | Argon et al. |
| 2003/0140051 A1 | 7/2003 | Fujiwara et al. |
| 2003/0145230 A1 | 7/2003 | Chiu et al. |
| 2003/0149753 A1 | 8/2003 | Lamb |
| 2003/0198084 A1 | 10/2003 | Fujisawa et al. |
| 2004/0002942 A1 | 1/2004 | Pudipeddi et al. |
| 2004/0003002 A1 | 1/2004 | Adelmann |
| 2004/0049564 A1 | 3/2004 | Ng et al. |
| 2004/0093463 A1 | 5/2004 | Shang |
| 2004/0117586 A1 | 6/2004 | Estakhri et al. |
| 2004/0148360 A1 | 7/2004 | Mehra et al. |
| 2004/0153694 A1 | 8/2004 | Nicholson et al. |
| 2004/0186946 A1 | 9/2004 | Lee |
| 2004/0205177 A1 | 10/2004 | Levy et al. |
| 2004/0225837 A1 | 11/2004 | Lewis |
| 2004/0268359 A1 | 12/2004 | Hanes |
| 2005/0002263 A1 | 1/2005 | Iwase et al. |
| 2005/0015539 A1 | 1/2005 | Horii et al. |
| 2005/0027951 A1 | 2/2005 | Piccirillo et al. |
| 2005/0055425 A1 | 3/2005 | Lango et al. |
| 2005/0055497 A1 | 3/2005 | Estakhri et al. |
| 2005/0076107 A1 | 4/2005 | Goud et al. |
| 2005/0120177 A1 | 6/2005 | Black |
| 2005/0132259 A1 | 6/2005 | Emmot et al. |
| 2005/0141313 A1 | 6/2005 | Gorobets et al. |
| 2005/0144361 A1 | 6/2005 | Gonzalez et al. |
| 2005/0144406 A1 | 6/2005 | Chong, Jr. |
| 2005/0149618 A1 | 7/2005 | Cheng |
| 2005/0149683 A1 | 7/2005 | Chong, Jr. et al. |
| 2005/0149819 A1 | 7/2005 | Hwang |
| 2005/0177672 A1 | 8/2005 | Rao |
| 2005/0177687 A1 | 8/2005 | Rao |
| 2005/0193166 A1 | 9/2005 | Johnson et al. |
| 2005/0216653 A1 | 9/2005 | Aasheim et al. |
| 2005/0229090 A1 | 10/2005 | Shen et al. |
| 2005/0240713 A1 | 10/2005 | Wu et al. |
| 2005/0246510 A1 | 11/2005 | Retnammana et al. |
| 2005/0257017 A1 | 11/2005 | Yagi |
| 2005/0257213 A1 | 11/2005 | Chu et al. |
| 2005/0273476 A1 | 12/2005 | Wertheimer et al. |
| 2005/0276092 A1 | 12/2005 | Hansen et al. |
| 2006/0004955 A1 | 1/2006 | Ware et al. |
| 2006/0020744 A1 | 1/2006 | Sinclair et al. |
| 2006/0026339 A1 | 2/2006 | Rostampour |
| 2006/0041731 A1 | 2/2006 | Jochemsen et al. |
| 2006/0053157 A1 | 3/2006 | Pitts |
| 2006/0059326 A1 | 3/2006 | Aasheim et al. |
| 2006/0075057 A1 | 4/2006 | Gildea et al. |
| 2006/0085626 A1 | 4/2006 | Roberson et al. |
| 2006/0090048 A1 | 4/2006 | Okumoto et al. |
| 2006/0106968 A1 | 5/2006 | Wooi Teoh |
| 2006/0117212 A1 | 6/2006 | Meyer et al. |
| 2006/0123197 A1 | 6/2006 | Dunshea et al. |
| 2006/0129778 A1 | 6/2006 | Clark et al. |
| 2006/0136657 A1 | 6/2006 | Rudelic et al. |
| 2006/0136685 A1 | 6/2006 | Griv et al. |
| 2006/0143396 A1 | 6/2006 | Cabot |
| 2006/0149893 A1 | 7/2006 | Barfuss et al. |
| 2006/0152981 A1 | 7/2006 | Ryu |
| 2006/0179263 A1 | 8/2006 | Song et al. |
| 2006/0184722 A1 | 8/2006 | Sinclair |
| 2006/0190552 A1 | 8/2006 | Henze et al. |
| 2006/0224849 A1 | 10/2006 | Islam et al. |
| 2006/0236061 A1 | 10/2006 | Koclanes |

(56) References Cited

U.S. PATENT DOCUMENTS

| | | |
|---|---|---|
| 2006/0248387 A1 | 11/2006 | Nicholson et al. |
| 2006/0265636 A1 | 11/2006 | Hummler |
| 2006/0271740 A1 | 11/2006 | Mark et al. |
| 2007/0006021 A1 | 1/2007 | Nicholson et al. |
| 2007/0016699 A1 | 1/2007 | Minami |
| 2007/0016754 A1 | 1/2007 | Testardi |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0050548 A1 | 3/2007 | Bali et al. |
| 2007/0050571 A1 | 3/2007 | Nakamura et al. |
| 2007/0061508 A1 | 3/2007 | Zweighaft |
| 2007/0069318 A1 | 3/2007 | Chow et al. |
| 2007/0086260 A1 | 4/2007 | Sinclair |
| 2007/0088666 A1 | 4/2007 | Saito |
| 2007/0118676 A1 | 5/2007 | Kano et al. |
| 2007/0118713 A1 | 5/2007 | Guterman et al. |
| 2007/0124474 A1 | 5/2007 | Margulis |
| 2007/0124540 A1 | 5/2007 | van Riel |
| 2007/0143532 A1 | 6/2007 | Gorobets et al. |
| 2007/0143560 A1 | 6/2007 | Gorobets |
| 2007/0143566 A1 | 6/2007 | Gorobets |
| 2007/0147356 A1 | 6/2007 | Malas et al. |
| 2007/0150689 A1 | 6/2007 | Pandit et al. |
| 2007/0156998 A1 | 7/2007 | Gorobets |
| 2007/0168698 A1 | 7/2007 | Coulson et al. |
| 2007/0198770 A1 | 8/2007 | Horii et al. |
| 2007/0204128 A1 | 8/2007 | Lee et al. |
| 2007/0208790 A1 | 9/2007 | Reuter et al. |
| 2007/0214320 A1 | 9/2007 | Ruia et al. |
| 2007/0233455 A1 | 10/2007 | Zimmer et al. |
| 2007/0233937 A1 | 10/2007 | Coulson et al. |
| 2007/0250660 A1 | 10/2007 | Gill et al. |
| 2007/0250838 A1* | 10/2007 | Belady et al. ................ 718/105 |
| 2007/0260608 A1 | 11/2007 | Hertzberg et al. |
| 2007/0261030 A1 | 11/2007 | Wadhwa |
| 2007/0263514 A1 | 11/2007 | Iwata et al. |
| 2007/0266037 A1 | 11/2007 | Terry et al. |
| 2007/0271468 A1 | 11/2007 | McKenney et al. |
| 2007/0274150 A1 | 11/2007 | Gorobets |
| 2007/0276897 A1 | 11/2007 | Tameshige et al. |
| 2007/0300008 A1 | 12/2007 | Rogers et al. |
| 2008/0005748 A1 | 1/2008 | Matthew et al. |
| 2008/0010395 A1 | 1/2008 | Mylly et al. |
| 2008/0043769 A1 | 2/2008 | Hirai |
| 2008/0052377 A1 | 2/2008 | Light |
| 2008/0052477 A1 | 2/2008 | Lee et al. |
| 2008/0059752 A1 | 3/2008 | Serizawa |
| 2008/0091876 A1 | 4/2008 | Fujibayashi et al. |
| 2008/0098159 A1 | 4/2008 | Song |
| 2008/0104321 A1 | 5/2008 | Kamisetty et al. |
| 2008/0109090 A1 | 5/2008 | Esmaili et al. |
| 2008/0120469 A1 | 5/2008 | Kornegay |
| 2008/0126507 A1 | 5/2008 | Wilkinson |
| 2008/0126700 A1 | 5/2008 | El-Batal et al. |
| 2008/0126852 A1 | 5/2008 | Brandyberry et al. |
| 2008/0133963 A1 | 6/2008 | Katano et al. |
| 2008/0137658 A1 | 6/2008 | Wang |
| 2008/0140737 A1 | 6/2008 | Garst et al. |
| 2008/0140819 A1 | 6/2008 | Bailey et al. |
| 2008/0205286 A1 | 8/2008 | Li et al. |
| 2008/0229045 A1 | 9/2008 | Qi |
| 2008/0235443 A1 | 9/2008 | Chow et al. |
| 2008/0243966 A1 | 10/2008 | Croisettier et al. |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0271039 A1* | 10/2008 | Rolia et al. ................ 718/105 |
| 2008/0276040 A1 | 11/2008 | Moritoki |
| 2009/0070526 A1 | 3/2009 | Tetrick |
| 2009/0083478 A1 | 3/2009 | Kunimatsu et al. |
| 2009/0083485 A1 | 3/2009 | Cheng |
| 2009/0089485 A1 | 4/2009 | Yeh |
| 2009/0125650 A1 | 5/2009 | Sebire |
| 2009/0125700 A1 | 5/2009 | Kisel |
| 2009/0132621 A1 | 5/2009 | Jensen et al. |
| 2009/0150599 A1 | 6/2009 | Bennett |
| 2009/0150605 A1 | 6/2009 | Flynn et al. |
| 2009/0150641 A1 | 6/2009 | Flynn et al. |
| 2009/0228637 A1 | 9/2009 | Moon |
| 2009/0248763 A1 | 10/2009 | Rajan et al. |
| 2009/0248922 A1 | 10/2009 | Hinohara et al. |
| 2009/0276588 A1 | 11/2009 | Murase |
| 2009/0276654 A1 | 11/2009 | Butterworth |
| 2009/0287887 A1 | 11/2009 | Matsuki et al. |
| 2009/0292861 A1 | 11/2009 | Kanevsky et al. |
| 2009/0294847 A1 | 11/2009 | Maruyama et al. |
| 2009/0300277 A1 | 12/2009 | Jeddoloh |
| 2009/0307424 A1 | 12/2009 | Galloway et al. |
| 2009/0313453 A1 | 12/2009 | Stefanus et al. |
| 2009/0327602 A1 | 12/2009 | Moore et al. |
| 2009/0327804 A1 | 12/2009 | Moshayedi |
| 2010/0005072 A1 | 1/2010 | Pitts |
| 2010/0005228 A1 | 1/2010 | Fukutomi et al. |
| 2010/0017556 A1 | 1/2010 | Chin |
| 2010/0017568 A1 | 1/2010 | Wadhawan et al. |
| 2010/0023674 A1 | 1/2010 | Aviles |
| 2010/0023682 A1 | 1/2010 | Lee et al. |
| 2010/0032676 A1 | 1/2010 | Moon |
| 2010/0030946 A1 | 2/2010 | Kano et al. |
| 2010/0036840 A1 | 2/2010 | Pitts |
| 2010/0042805 A1 | 2/2010 | Recio et al. |
| 2010/0070701 A1 | 3/2010 | Iyigun et al. |
| 2010/0070725 A1 | 3/2010 | Prahlad et al. |
| 2010/0070747 A1 | 3/2010 | Iyigun et al. |
| 2010/0070982 A1 | 3/2010 | Pitts |
| 2010/0076936 A1 | 3/2010 | Rajan |
| 2010/0077194 A1 | 3/2010 | Zhao et al. |
| 2010/0082774 A1 | 4/2010 | Pitts |
| 2010/0095059 A1 | 4/2010 | Kisley et al. |
| 2010/0169542 A1 | 7/2010 | Sinclair |
| 2010/0199036 A1 | 8/2010 | Siewert et al. |
| 2010/0205231 A1 | 8/2010 | Cousins |
| 2010/0205335 A1 | 8/2010 | Phan et al. |
| 2010/0211737 A1 | 8/2010 | Flynn et al. |
| 2010/0217916 A1 | 8/2010 | Guo et al. |
| 2010/0228903 A1 | 9/2010 | Chandrasekaran et al. |
| 2010/0235597 A1 | 9/2010 | Arakawa |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |
| 2010/0262773 A1 | 10/2010 | Borchers et al. |
| 2010/0262894 A1 | 10/2010 | Swing et al. |
| 2010/0262979 A1 | 10/2010 | Borchers et al. |
| 2011/0022819 A1 | 1/2011 | Post et al. |
| 2011/0107033 A1 | 5/2011 | Grigoriev et al. |
| 2011/0179162 A1* | 7/2011 | Mayo et al. ................ 709/224 |
| 2011/0225342 A1* | 9/2011 | Sharma et al. ................ 711/6 |
| 2011/0231595 A1 | 9/2011 | Zaroo et al. |
| 2011/0238546 A1* | 9/2011 | Certain et al. ................ 705/34 |
| 2011/0265083 A1 | 10/2011 | Davis |
| 2011/0314202 A1 | 12/2011 | Iyigun et al. |
| 2011/0320733 A1 | 12/2011 | Sanford et al. |
| 2012/0159081 A1 | 6/2012 | Agrawal et al. |
| 2012/0173824 A1 | 7/2012 | Iyigun et al. |
| 2012/0226866 A1* | 9/2012 | Bozek et al. ................ 711/122 |
| 2012/0254824 A1* | 10/2012 | Bansod ................ 717/101 |
| 2012/0278588 A1* | 11/2012 | Adams et al. ................ 711/206 |
| 2013/0232303 A1 | 9/2013 | Quan |

(56) References Cited

U.S. PATENT DOCUMENTS

| | | | |
|---|---|---|---|
| 2013/0339958 | A1 | 12/2013 | Droste et al. |
| 2014/0136872 | A1* | 5/2014 | Cooper et al. ............... 713/324 |
| 2014/0156938 | A1* | 6/2014 | Galchev et al. ............... 711/130 |

FOREIGN PATENT DOCUMENTS

| | | |
|---|---|---|
| EP | 1418502 | 5/2004 |
| EP | 1814039 | 3/2009 |
| GB | 123416 | 9/2001 |
| JP | 4242848 | 8/1992 |
| JP | 8153014 | 6/1996 |
| JP | 200259525 | 9/2000 |
| JP | 2009122850 | 6/2009 |
| WO | WO94/19746 | 9/1994 |
| WO | WO95/18407 | 7/1995 |
| WO | WO96/12225 | 4/1996 |
| WO | WO01/31512 | 5/2001 |
| WO | WO02/01365 | 1/2002 |
| WO | 2004061645 A2 | 7/2004 |
| WO | WO2004/099989 | 11/2004 |
| WO | WO2005/103878 | 11/2005 |
| WO | WO2006/062511 | 6/2006 |
| WO | WO2006/065626 | 6/2006 |
| WO | WO2008/130799 | 3/2008 |
| WO | WO2008/073421 | 6/2008 |
| WO | WO2011/106394 | 9/2011 |

OTHER PUBLICATIONS

Albert Noll et al., CellVM: A Homogeneous Virtual Machine System for a Heterogeneous Single-Chip Multiprocessor; *Technical Report No. 06-17, Donald Bren School of Information and Computer Science, University of California, Irvine*; Nov. 2006.
NEVEX Virtual Technologies, CacheWorks Data Sheet, http://www.nevex.com/wp-content/uploads/2010/12/Data-Sheet3.pdf, Published Dec. 1, 2010, Visited Aug. 1, 2012.
David C. Steere et al., "Efficient User-Level File Cache Management on the Sun Vnode Interface," School of Computer Science, Carnegie Mellon University, CMU-CS-90-126, Usenix Conference Proceedings, Jun. 1990.
Pin Lu et al., Virtual machine memory access tracing with hypervisor exclusive cache, Proceedings of the USENIX Annual Technical Conference 2007 (ATC'07), Article No. 3, 15 pages.
Mark Friedman et al., File Cache Performace and Tuning, Windows 2000 Performance Guide, O'Reilly & Associates, Inc., http://msdn.microsoft.com/en-us/library/ms369863.aspx, Published Jan. 2002, Visited Aug. 3, 2012.
Microsoft, Filter Driver Development Guide, http://download.microsoft.com/download/e/b/a/eba1050f-a31d-436b-9281-92cdfeae4b45/FilterDriverDeveloperGuide.doc, 2004, Published 2004, Visited Aug. 3, 2012.
Microsoft, File Cache Management, Windows Embedded CE 6.0 R3, msdn.microsoft.com/en-us/subscriptions/aa911545.aspx. Published Aug. 28, 2008, Visited Aug. 3, 2012.
D. Muntz et al., Multi-level Caching in Distributed File Systems, CITI Technical Report 91-3, Aug. 16, 1991.
Omesh Tickoo et al, Modeling Virtual Machine Performance: Challenges and Approaches, *SIGMETRICS Perform. Eval. Rev.* 37, 3 (Jan. 2010), 55-60. DOI=10.1145/1710115.1710126 http://doi.acm.org/10.1145/1710115.1710126.
Craig Linn, Windows I/O Performance: Cache Manager and File System Considerations, CMGA Proceedings, Sep. 6, 2006.
Adabas, Adabas Caching Configuration and Tuning, http://documentation.softwareag.com/adabas/ada821mfr/addons/acf/config/cfgover.htm, Published Sep. 2009, Visited Aug. 3, 2012.
Adabas, Adabas Caching Facility, http://www.softwareage.com/es/Images/Adabas_Caching_Faility_tcm24-71167.pdf, Published 2008, Visited Aug. 3, 2012.
VMware, Introduction to VMware vSphere, http://www.vmware.com/pdf/vsphere4/r40/vsp_40_intro_vs.pdf, Published 2009, Visited Aug. 1, 2012.

VMware, Virtual Disk API Programming Guide, Virtual Disk Development Kit 1.2, Published Nov. 2010, Visited Aug. 3, 2012.
Atlantis Computing Technology, Caching, http://atlantiscomputing.com/technology/caching, published 2012, accessed Aug. 1, 2012.
Richard Rosen, IntelliCache, Scalability and consumer SSDs, blogs.citrix.com/2012/01/03/intellicache-scalability-and-consumer-ssds, Jan. 3, 2012, accessed Aug. 3, 2012.
Christian Ferber, XenDesktop and local storage+IntelliCache, Jun. 22, 2011, blogs.citrix.com/2011/06/22/xendesktop-and-local-storage-intellicache/, accessed Aug. 3, 2012.
Citrix, XenServer—6.0.0 Installation Guide, Mar. 2, 2012, http://support.citrix.com/servlet/KbServlet/download/28750-102-673824/XenServer-6.0.0-installation.pdf. accessed Aug. 3, 2012.
Adabas, Adabas Caching ASSO, Data, Work, Aug. 26, 2011, http://communities.softw areag.com/web/guest/pwiki/-/wiki/Main/.../pop_up?_36_viewMode=print, Oct. 2008, accessed Aug. 3, 2012.
Adabas, File Level Caching, http://documentation.softwareag.com/adabas/ada824mfr/addons/acf/services/file-level-caching.htm, accessed Aug. 3, 2012.
Actel, "Actel Fusion FPGAs Supporting Intelligent Peripheral Management Interface (IPMI) Applications," http://www.actel.com/documents/Fusion_IPMI_AN.pdf, Oct. 1, 2006, visited Mar. 11, 2010.
Agigatech, Bulletproof Memory for RAID Servers, Part 1, http://agigatech.com/blog/bulletproof-memory-for-raid-servers-part-1/, last visited Feb. 16, 2010.
Anonymous, "Method for Fault Tolerance in Nonvolatile Storage", http://ip.com, IP.com No. IPCOM000042269D, 2005.
Ari, "Performance Boosting and Workload Isolation in Storage Area Networks with SanCache," Hewlett Packard Laboratories, Proceedings of the 23rd IEEE / 14th SA Goddard Conference on Mass Storage Systems and Technologies (MSST 2006), May 2006, pp. 263-27.
Arpaci-Dusseau, "Removing the Costs of Indirection in Flash-based SSDs with Nameless Writes," Jun. 2010, HotStorage'10, Boston, MA.
Asine, "ASPMC-660 Rugged IDE Flash Drive PMC Module," http://www.asinegroup.com/products/aspmc660.html, copyright 2002, visited Nov. 8, 2009.
Bandulet "Object-Based Storage Devices," Jul. 2007 http://developers.sun.com/solaris/articles/osd.htme, visited Dec. 1, 2011.
Barrall et al., U.S. Appl. No. 60/625,495, "Dynamically Expandable and Contractible Fault-Tolerant Storage System Permitting Variously Sized Storage Devices and Method," filed Nov. 5, 2004.
Barrall et al., U.S. Appl. No. 60/718,768, "Dynamically Adaptable Fault-Tolerant Storage System," filed Sep. 20, 2005.
BiTMICRO, "BiTMICRO Introduces E-Disk PMC Flash Disk Module at Military & aerospace Electronics East 2004," http://www.bitmicro.com/press.sub, published May 18, 2004, visited Mar. 8, 2011.
Bonnet, "Flash Device Support for Database Management," published Jan. 9, 2011.
Brandon, Jr., "Sparse Matrices in CS Education," Journal of Computing Sciences in Colleges, vol. 24 Issue 5, May 2009, pp. 93-98.
Casey, "San Cache: SSD in the San," Storage Inc., http://www.solidata.com/resourses/pdf/storageing.pdf, 2000, visited May 20, 2011.
Casey, "Solid State File-Caching for Performance and Scalability," SolidData Quarter 1 2000, http://www.storagesearch._com/3dram.html, visited May 20, 2011.
Clustered Storage Solutions: "Products," http://www.clusteredstorage.com/clustered_storage_solutions.HTML, last visited Feb. 16, 2010.
Coburn, "NV-Heaps: Making Persistent Objects Fast and Safe with Next-Generation, Non-Volatile Memories", ACM 978-1-4503-0266-1/11/0, published Mar. 5, 2011.
Data Direct Networks, "White Paper: S2A9550 Overview," www.//datadirectnet. com, 2007.
EEEL-6892, Lecture 18, "Virtual Computers," Mar. 2010.
ELNEC, "NAND Flash Memories and Programming NAND Flash Memories Using ELNEC Device Programmers, Application Note," published Mar. 1, 2007.

(56) References Cited

OTHER PUBLICATIONS

Friedman, Mark, et al., "File Cache Performance and Tuning, Windows 2000 Performance Guide, O'Reilly & Associates, Inc., http://msdn.microsoft.com/en-us/library/ms369863.aspx," published Jan. 2002, visited Aug. 3, 2012.
Gal, "A Transactional Flash File System for Microcontrollers," 2005 USENIX Annual Technical Conference, published Apr. 10, 2009.
Garfinkel, "One Big File Is Not Enough: A Critical Evaluation of the Dominant Free-Space Sanitization Technique," 6th Workshop on Privacy Enhancing Technologies. Cambridge, United Kingdom, published Jun. 1, 2006.
Gill, "WOW: Wise Ordering for Writes—Combining Spatial and Temporal Locality in Non-Volatile Caches," IBM, Fast "05: 4th USENIX Conference on File and Storage Technologies, 2005.
Gutmann, "Secure Deletion of Data from Magnetic and Solid-State Memory", Usenix, 14 pages, San Jose, CA, published Jul. 1, 1996.
Huffman, "Non-Volatile Memory Host Controller Interface," Apr. 14, 2008, 65 pgs.
Hynix Semiconductor, Intel Corporation, Micron Technology, Inc. Phison Electronics Corp., Sony Corporation, Spansion, Stmicroelectronics, "Open NAND Flash Interface Specification," Revision 2.0, Feb. 27, 2008.
HYTSOR: "Making SSDs the Survival of the Fittest in High-Performance Storage Systems," ics10-Paper 102, Feb. 2010.
IBM, "Method to Improve Reliability of SSD Arrays," Nov. 2009.
Information Technology, "SCSI Object-Based Storage Device Commands," 2 (OSD-2), Project T10/1729-D, Revision 4, published Jul. 30, 2004, printed Jul. 24, 2008.
Intel, "Non-Volatile Memory Host Controller Interface (NVMHCI) 1.0," Apr. 14, 2008.
Johnson, "An Introduction to Block Device Drivers," Jan. 1, 1995.
Kawaguchi, "A Flash-Memory Based File System," TCON'95 Proceedings of the USENIX 1995 Technical Conference Proceedings, p. 13.
Linn, Craig, "Windows I/O Performance: Cache Manager and File System Considerations," CMGA Proceedings, Sep. 6, 2006.
Lu, Pin, "Virtual Machine Memory Access Tracing with Hypervisor Exclusive Cache," Departmentn of Computer Science, University of Rochester, 2007.
Mesnier, "Object-Based Storage," IEEE Communications Magazine, Aug. 2003, pp. 84-90.
Micron Technology, Inc., "NAND Flash 101: An Introduction to ND Flash and How to Design It in to Your Next Product (TN-29-19)," http://www.micron.com/~/media/Documents/Products/Technical%20Note/ND%20Flash/145tn2919_nd_101.pdf, 2006, visited May 10, 2010.
Micron, "TN-29-08: Technical Note, Hamming Codes for NAND Flash Memory Devices," Mar. 10, 2010.
Micron, "TN-29-17: NAND Flash Design and Use Considerations," Mar. 10, 2010.
Micron, "TN-29-42: Wear-Leveling Techniques in NAND Flash Devices," Mar. 10, 2010.
Microsoft, Data Set Management Commands Proposal for ATA8-ACS2, published Oct. 5, 2007, Rev. 3.
Microsoft, "How NTFS Works," Apr. 9, 2010.
Morgenstern, David, "Is There a Flash Memory RAID in your Future?", http://www.eweek.com— eWeek, Ziff Davis Enterprise Holdings Inc., Nov. 8, 2006, visited Mar. 18, 2010.
Novell, "File System Primer", http://wiki.novell.com/index.php/File_System_Primer, 2006, visited Oct. 18, 2006.
PerfectCacheServer, "Automatic Disk Caching," http://www. Raxco.Com/business/perfectcache_server.aspx, last visited Oct. 31, 2012.
PIVOT3, "RAIGE Cluster: Technology Overview," White Paper, www.pivot3.com, Jun. 2007.
Plank, "A Tutorial on Reed-Solomon Coding for Fault Tolerance in RAID-like System," Department of Computer Science, University of Tennessee, pp. 995-1012, Sep. 1997.
Porter, "Operating System Transactions," ACM 978-1-60558-752-3/09/10, published Oct. 1, 2009.
Probert, "Windows Kernel Internals Cache Manager," Microsoft Corporation, http://www.i.u.tokyo.ac.jp/edu/training/ss/ lecture/new-documents/Lectures/15-CacheManager/CacheManager.pdf, printed May 15, 2010.
Ranaweera, 05-270RO, SAT: Write Same (10) command (41h), T10/05, Jul. 7, 2005, www.t10.org/ftp/t10/document.05/05-270r0.pdf, last visited Apr. 11, 2013.
Rosen, Richard, "IntelliCache, Scalability and consumer SSDs," blogs.citrix.com/2012/01/03/intellicache-scalability-and-consumer-ssds, Jan. 3, 2012, accessed Aug. 3, 2012.
Rosenblum, "The Design and Implementation of a Log-Structured File System," ACM Transactions on Computer Systems, vol. 10 Issue 1, Feb. 1992.
Samsung Electronics, "Introduction to Samsung's Linux Flash File System—RFS Application Note", Version 1.0, Nov. 2006.
Seagate Technology LLC, "The Advantages of Object-Based Storage-Secure, Scalable, Dynamic Storage Devices, Seagate Research Technology Paper, TP-536" Apr. 2005.
Sears, "Stasis: Flexible Transactional Storage," OSDI '06: 7th USENIX Symposium on Operating Systems Design and Implementation, published Nov. 6, 2006.
Seltzer, "File System Performance and Transaction Support", University of California at Berkeley, published Jan. 1, 1992.
Seltzer, "Transaction Support in a Log-Structured File System", Harvard University Division of Applied Sciences, published Jan. 1, 1993 (Chapter 5, pp. 52-69).
Seltzer, "Transaction Support in Read Optimized and Write Optimized File Systems," Proceedings of the 16th VLDB Conference, Brisbane, Australia, published Jan. 1, 1990.
Shimpi, Anand, The SSD Anthology: Understanding SSDs and New Drives from OCZ, Mar. 18, 2009, 69 pgs.
Shu, "Data Set Management Commands Proposals for ATA8-ACS2," Dec. 12, 2007, http://www.t13.org.Documents/Uploaded Documents/docs2008/e07154r6-Data_Set_Management_Proposal_for_ATA-ACS2.pdf, printed Apr. 5, 2010.
Singer, Dan, "Implementing MLC ND Flash for Cost-Effective, High Capacity Memory," M-Systems, White Paper, 91-SR014-02-8L, Rev. 1.1, Sep. 2003.
Solidata, "Best Practices Guide, Sybase: Maximizing Performance through Solid State File-Caching," http:// solidata.com/resources/pdf/bp-sybase.pdf. May 2000, cited May 18, 2011.
Spansion, "Data Management Software (DMS) for AMD Simultaneous Read/Write Flash Memory Devices", published Jul. 7, 2003.
Spillane, "Enabling Transactional File Access via Lightweight Kernel Extensions", Stony Brook University, IBM T. J. Watson Research Center, published Feb. 25, 2009.
State Intellectual Property Office, Office Action, CN Application No. 200780050970.0, issued Jun. 29, 2011.
State Intellectual Property Office, Office Action, Chinese Nationalization of U.S. Appl. No. 11/952,123.
State Intellectual Property Office, Office Action, CN Application No. 200780050970.0, issued Oct. 28, 2010.
State Intellectual Property Office, Office Action, CN Application No. 200780051020.X, issued Nov. 11, 2010.
State Intellectual Property Office, Office Action, CN Application No. 200780050983.8, issued May 18, 2011.
State Intellectual Property Office, Office Action, CN Application No. 200780051020.X, issued Jul. 6, 2011.
State Intellectual Property Office, Office Action, CN Application No. 200780051020.X, issued Nov. 7, 2011.
State Intellectual Property Office, Office Action, CN Application No. 200780050970.0, issued Jan. 5, 2012.
Steere, David et al., Efficient User-Level File Cache Management on the Sun Vnode Interface, School of Computer Science, Carnegie Mellon University, Apr. 18, 1990.
Superspeed, "New Super Cache 5 on Servers," http:// www.superspeed.com/servers/supercache.php, last visited Oct. 31, 2013.
Tal, "NAND vs. NOR Flash Technology," M-Systems, www2.electronicproducts.com/PrintArticle.aspx?ArticleURL=FEBMSY1.feb2002.html, visited Nov. 22, 2010.
Terry et al., U.S. Appl. No. 60/797,127, "Filesystem-aware Block Storage System, Apparatus, and Method," filed May 3, 2006.

(56) References Cited

OTHER PUBLICATIONS

USTPO, Interview Summary for U.S. Appl. No. 10/372,734, mailed Feb. 28, 2006.
USPTO, Notice of Allowance for U.S. Appl. No. 12/986,117, Mailed Apr. 4, 2013.
USPTO, Notice of Allowance for U.S. Appl. No. 12/986,117 Mailed Jun. 5, 2013.
USPTO, Office Action for U.S. Appl. No. 12/879,004 mailed Feb. 25, 2013.
USPTO, Office Action for U.S. Appl. No. 13/607,486 mailed Jan. 10, 2013.
USPTO, Office Action for U.S. Appl. No. 10/372,734, mailed Sep. 1, 2005.
USPTO, Office Action for U.S. Appl. No. 11/952,113, mailed Dec. 15, 2010.
USPTO, Office Action for U.S. Appl. No. 12/711,113, mailed Jun. 6, 2012.
USPTO, Office Action for U.S. Appl. No. 12/711,113, mailed Nov. 23, 2012.
USPTO, Office Action for U.S. Appl. No. 13/607,486 mailed May 2, 2013.
USPTO, Office Action for U.S. Appl. No. 13/118,237 mailed Apr. 22, 2013.
USPTO, Notice of Allowance, U.S. Appl. No. 11/952,109, issued May 1, 2013.
USPTO, Office Action, U.S. Appl. No. 11/952,109, mailed Nov. 29, 2011.
Van Hensbergen, IBM Research Report, "Dynamic Policy Disk Caching for Storage Networking," IBM Research Division, Computer Science, RC24123 (W0611-189), Nov. 28, 2006.
VMware, Introduction to VMware vSphere, http://www.vmware.com/pdf/vsphere4/r40/vsp_40_intro_vs.pdf, 2009, accessed Aug. 1, 2012.
VMware, Virtual Disk API Programming Guide, Virtual Disk Development Kit 1.2, Nov. 2010, accessed Aug. 3, 2012.
Volos, "Mnemosyne: Lightweight Persistent Memory", ACM 978-1-4503-0266-1/11/03, published Mar. 5, 2011.
Wacha, "Improving RAID-Based Storage Systems with Flash Memory," First Annual ISSDM/SRL Research Symposium, Oct. 20-21, 2009.
Walp, "System Integrated Flash Storage," Microsoft Corporation, 2008, http://download.microsoft.com/download/5/E/6/5E66B27B-988B-4F50-AF3A-C2FF1E62180F/COR-T559_WHO8.pptx, Printed Apr. 6, 2010, 8 pgs.
Wang, "OBFS: A File System for Object-based Storage Devices", 21st IEE/12th SA Goddard Conference on Mass Storage Systems and Technologies, Apr. 2004.
Wikipedia, "Object Storage Device," http://en.wikipedia.org/wiki/Object-storage-device, last visited Apr. 29, 2010.
Winnett, Brad, "S2A9550 Overview," White Paper, http://www.ddn.com/pdfs/ddn_s2a_9550_white_paper.pdf, Jul. 2006, 27 pgs.
WIPO, International Preliminary Report of Patentability for PCT/US2007/086691, mailed Feb. 16, 2009.
WIPO, International Preliminary Report on Patentability for PCT/US2007/086688, mailed Mar. 16, 2009.
WIPO, International Preliminary Report on Patentability for PCT/US2007/086701, mailed Mar. 16, 2009.
WIPO, International Preliminary Report on Patentability for PCT/US2007/086687, mailed Mar. 18, 2009.
WIPO, International Preliminary Report on Patentability for PCT/US2007/025048, mailed Jun. 10, 2009.
WIPO, International Preliminary Report on Patentability for PCT/US2010/048325, mailed Mar. 13, 2012.
WIPO, International Search Report and Written Opinion for PCT/US2007/086691, mailed May 8, 2008.
WIPO, International Search Report and Written Opinion for PCT/US2007/025049, mailed May 14, 2008.
WIPO, International Search Report and Written Opinion for PCT/US2007/025048, mailed May 27, 2008.
WIPO, International Search Report and Written Opinion for PCT/US2007/086701, mailed Jun. 5, 2008.
WIPO, International Search Report and Written Opinion for PCT/US2007/086687, mailed Sep. 5, 2008.
WIPO, International Search Report and Written Opinion for PCT/US2011/65927, mailed Aug. 28, 2012.
WIPO, International Search Report and Written Opinion for PCT/US2012/029722, mailed Oct. 30, 2012.
WIPO, International Search Report for PCT/US2012/039189, mailed Dec. 27, 2012.
WIPO, International Search Report and Written Opinion PCT/US2010/025885, mailed Sep. 28, 2011.
WIPO, International Search Report PCT/US2012/050194, mailed Feb. 26, 2013.
Woodhouse, "JFFS: The Journaling Flash File System," Ottawa Linux Symposium, http://sources.redhat.com/jffs2/jffs2.pdf, Jul. 2001.
Wright, "Extending ACID Semantics to the File System", ACM Transactions on Storage, vol. 3, No. 2, published May 1, 2011, pp. 1-40.
Wu, "eNVy: A Non-Volatile, Main Memory Storage System," ACM 0-89791-660-3/94/0010, ASPLOS-VI Proceedings of the sixth international conference on Architectural support for programming languages and operating systems, pp. 86-97, 1994.
Yang, "A DCD Filter Driver for Windows NT 4," Proceedings of the 12th International Conference on Computer Applications in Industry and Engineering (CAINE-99), Atlanta, George, USA, Nov. 4-6, 1999.
Yerrick, "Block Device," http://www.pineight.com/ds/block, last visited Mar. 1, 2010.
USPTO, Office Action for U.S. Appl. No. 13/287,998 mailed Jun. 10, 2014.
USPTO, Office Action for U.S. Appl. No. 14/262,581 mailed Jun. 19, 2014.
USPTO, Office Action Interview Summary for U.S. Appl. No. 13/541,659 mailed Aug. 26, 2014.
USPTO, Office Action for U.S. Appl. No. 13/687,979 mailed Sep. 9, 2014.
USPTO, Office Action for U.S. Appl. No. 13/288,005 mailed Jul. 8, 2014.

\* cited by examiner

| TIME (HH:MM) | CLOCK HAND 1 (10 MINUTES) | | CLOCK HAND 2 (1 HOUR) | |
|---|---|---|---|---|
| | BIT 1 | BIT 2 | BIT 1 | BIT 2 |
| 00:00 | 1 | 1 | 1 | 1 |
| 00:05 | 1 | 1 | 1 | 1 |
| 10 MINUTE CLOCK SWEEP | | | | |
| 00:08 | 1 | 0 | 1 | 1 |
| 10 MINUTE CLOCK SWEEP | | | | |
| 00:18 | 0 | 0 | 1 | 1 |
| DATA ACCESS | | | | |
| 00:22 | 1 | 1 | 1 | 1 |
| 10 MINUTE CLOCK SWEEP | | | | |
| 00:28 | 1 | 0 | 1 | 1 |
| 1 HOUR CLOCK SWEEP | | | | |
| 00:31 | 1 | 0 | 1 | 0 |
| 10 MINUTE CLOCK SWEEP | | | | |
| 00:38 | 0 | 0 | 1 | 0 |
| 10 MINUTE CLOCK SWEEP | | | | |
| 00:48 | 0 | 0 | 1 | 0 |
| 10 MINUTE CLOCK SWEEP | | | | |
| 00:58 | 0 | 0 | 1 | 0 |
| DATA ACCESS | | | | |
| 01:04 | 1 | 1 | 1 | 1 |
| DATA ACCESS | | | | |
| 01:07 | 1 | 1 | 1 | 1 |
| 10 MINUTE CLOCK SWEEP | | | | |
| 01:08 | 1 | 0 | 1 | 1 |

Fig. 10

| Next Cache Tag Index | State | Clock Hands | Checksum | Valid Unit Map |
|---|---|---|---|---|
|  |  |  |  |  |
|  |  |  |  |  |

MANAGING DATA INPUT/OUTPUT OPERATIONS

RELATED APPLICATIONS

This application is a conversion of U.S. Provisional Patent Application No. 61/489,230 entitled "Managing Data Input/Output Operations", filed on May 23, 2011.

BACKGROUND

Various types of computing environments share resources across multiple hosts or other systems. For example, virtualized systems and virtualized environments often support the sharing and load balancing of resources across multiple hosts or other systems. In this example, a single host can support multiple virtual machines that share common hardware components, storage systems, and the like. These virtual machines may also be referred to as "guest operating systems" as each host is capable of supporting multiple instances of one or more operating systems.

When sharing a data storage system across multiple hosts or multiple virtual machines, the computing environment must properly manage a high volume of data input/output (I/O) operations. The volume of I/O operations is commonly measured in IOPS (I/O Operations Per Second). FIG. 1 illustrates an example of an existing virtualized environment 100 including multiple hosts 102, 104, and 106, and a data storage system 108. In a particular implementation, hosts 102-106 are servers or other computing devices capable of performing a variety of processing and computing functions. Each host 102-106 includes multiple virtual machines 110 operating simultaneously.

During their normal operation, virtual machines 110 initiate data I/O requests, such as data read requests and data write requests, associated with data storage system 108. Data storage system 108 includes multiple data storage drives 112 and/or other data storage mechanisms. The storage resources associated with data storage system 108 are shared among the multiple hosts 102-106 and the virtual machines 110 included in those hosts. Each host 102-106 includes a virtualization kernel 114 (also referred to as a "hypervisor") that manages the virtual machines 110 as well as shared resources, such as data storage system 108.

As the number of virtual machines associated with a particular host increases, there is a corresponding increase in demand for shared resources, such as memory and I/O resources. An increase in I/O resource utilization includes an increased number of data I/O operations that cause a corresponding increase in data communicated between a host and a data storage system. In existing virtualized systems, the increased demand for shared resources such as I/O bandwidth often degrades the performance or application throughput of latency sensitive workload operations within a virtualized system. In these situations, one or more of the virtual machines experiences increased latency or decreased throughput, which may decrease the performance of the virtual machines. Thus, it is desirable to provide a computing environment that improves the handling of data I/O operations associated with multiple hosts or other systems.

It is also desired to provide approaches that leverage existing virtual machine system applications that depend on off-site resources, but still optimizes memory and I/O resources. According to embodiments of the invention, some of these approaches require a local system to cooperate with existing virtual system operating systems to appear to be operating as expected and without any different, circumventing or disruptive operations. As will be seen, the invention provides such approaches, each in an elegant manner.

BRIEF DESCRIPTION OF THE DRAWINGS

FIG. 10 illustrates example clock hand data values associated with a cache tag over time.

Throughout the description, similar reference numbers may be used to identify similar elements.

DETAILED DESCRIPTION

The systems and methods described herein relate to the management of data input/output (I/O) operations in a computing environment. Although particular examples discussed herein relate to virtualized environments, the same systems and methods are applicable to any type of computing environment. In particular implementations, the described systems and methods intercept I/O operations in the virtualized environment to dynamically allocate resources, such as cache resources, across multiple virtual machines in the virtualized environment. This management of data I/O operations improves the performance of the virtual machines and reduces the number of I/O operations handled by the primary storage system. Additionally, the management of I/O operations is transparent to other components in the virtualized environment and can be implemented without modification to existing application software or existing data storage systems. Thus operating systems that currently exist will be oblivious to the operations of the embodiments described herein, which will cooperate with the basic operation characteristics of virtual operating systems and not disrupt them, while better optimizing the operations of virtual machines resident in hosts.

Specific systems and methods described herein utilize a cache memory constructed with various memory devices, such as flash memory devices or RAM (random access memory) that may or may not be block oriented. The systems and methods described herein do not differentiate between flash memory, RAM or other types of memory, and further envision new types of memory developed in the future that will utilize various embodiments described herein. The described systems and methods may utilize any type of memory device, regardless of the specific type of memory device shown in any figures or described herein. Particular systems and methods described herein may generally be referred to as an "I/O hypervisor" due to their management of I/O operations in a virtualized environment.

Figure 1:
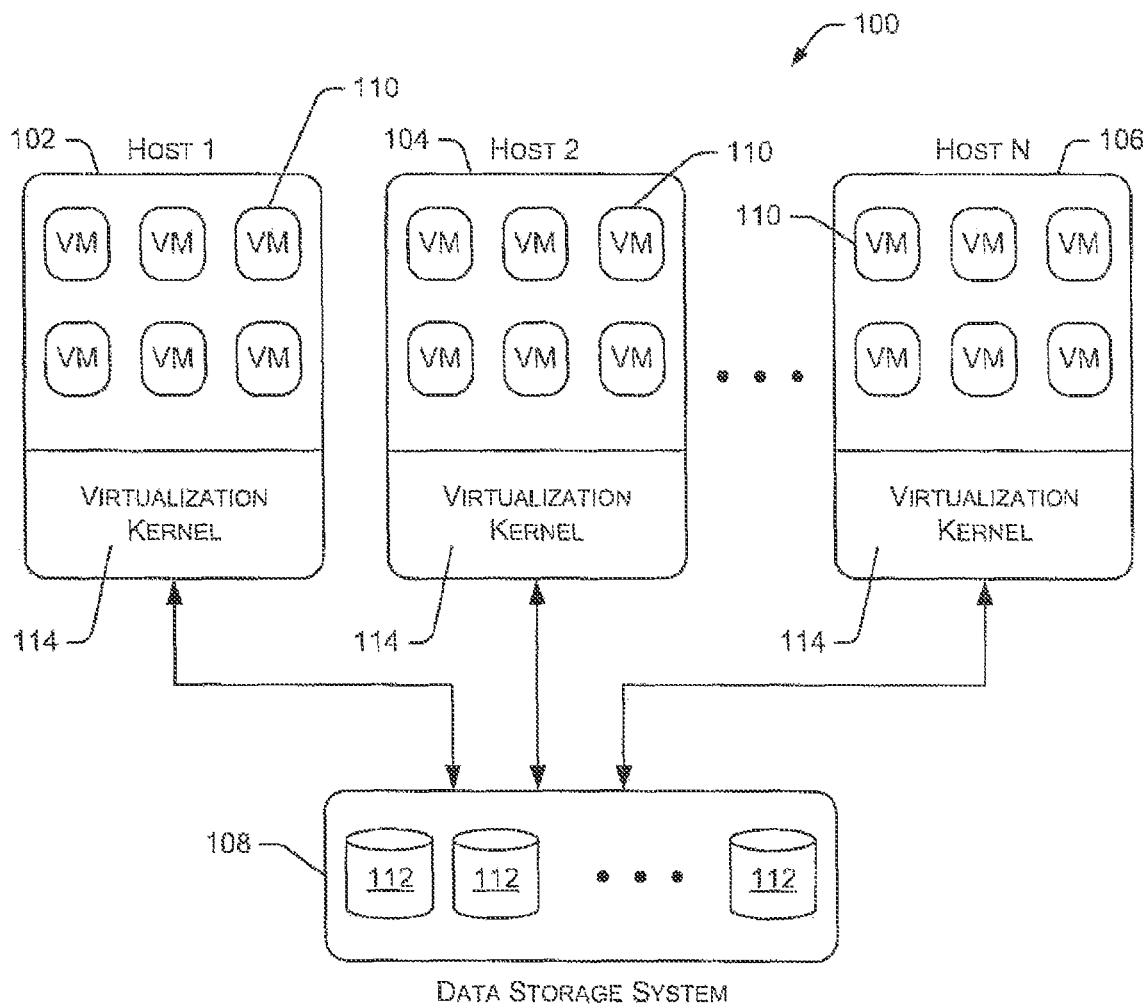
FIG. 1 illustrates an example of an existing virtualized environment including multiple hosts and a shared data storage system.
Figure 2:
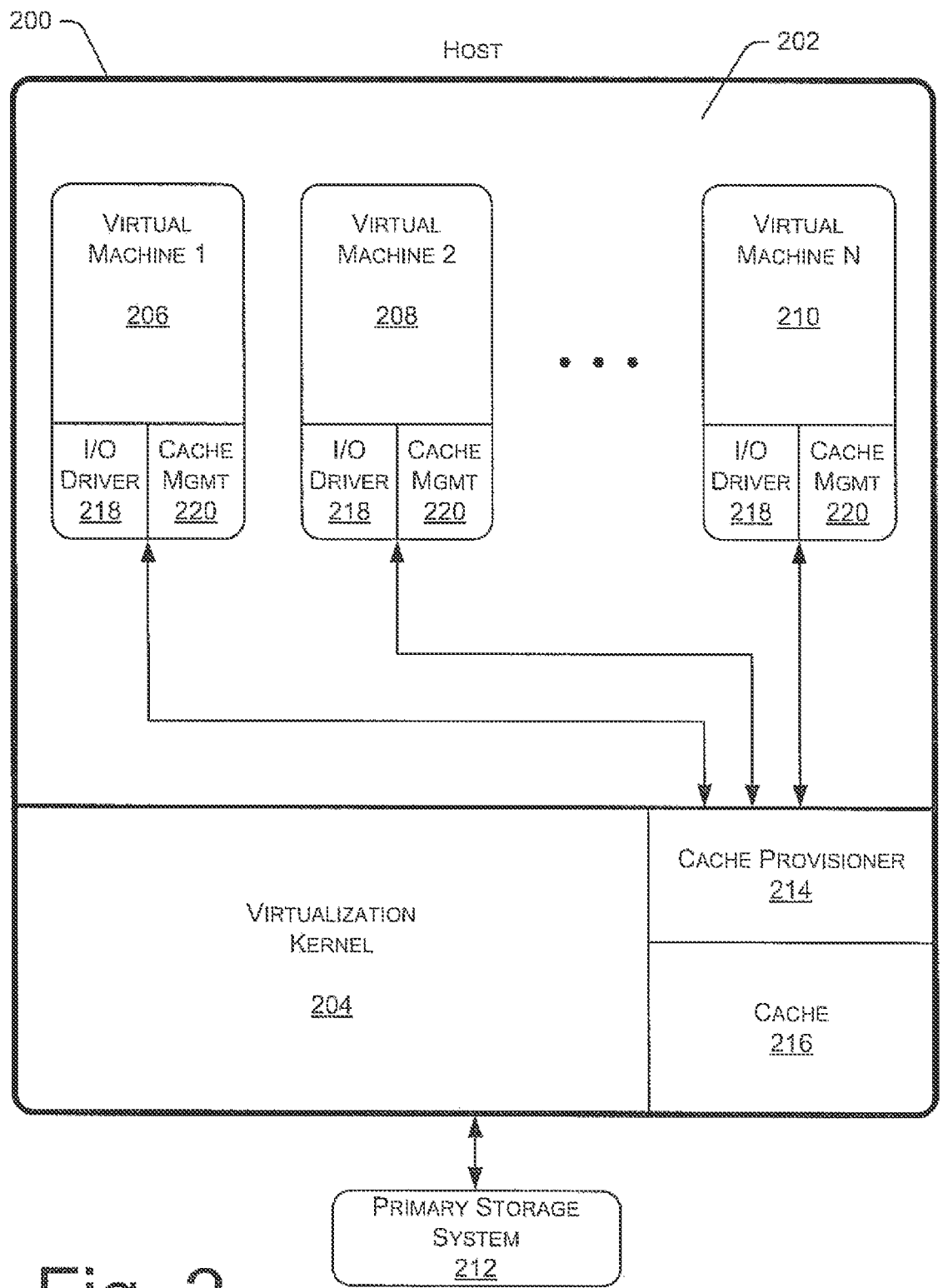
FIG. 2 is a block diagram illustrating example components of a virtualized environment.

FIG. 2 is a block diagram illustrating example components of a host 200 operating in a virtualized environment. Host 200 includes a user space 202 and a virtualization kernel 204. User space 202 includes multiple virtual machines 206, 208 and 210, which are also referred to as "guest operating systems". In various implementations, the system shown in FIG. 2 can operate as a "bare metal" system or a virtual system. A bare metal system has an operating system (such as Windows or Linux) that executes directly on hardware. In a bare metal system, virtualization kernel 204 is not present. In a virtual system, a virtual machine executes on a virtualization kernel (e.g., virtualization kernel 204). The terms "virtual machine" and "guest OS" (guest operating system) are used interchangeably herein. A bare metal system includes a "base operating system" instead of a virtual machine.

Each virtual machine 206-210 can implement a different operating system, such as Windows, Linux, and so forth. In a particular embodiment, host 200 is a computing device capable of hosting the multiple virtual machines 206-210 and supporting the applications executed by the virtual machines and the functions associated with those applications. Host 200 includes, for example, one or more processors, memory devices, communication devices, I/O interfaces, and related components. Although three virtual machines 206-210 are shown within host 200, a particular embodiment may include any number of virtual machines.

Virtualization kernel 204 manages the operation of virtual machines 206-210 as well as other components and services provided by host 200. For example, virtualization kernel 204 handles various I/O operations associated with a primary storage system 212 or other storage devices. Primary storage system 212 is shared among the multiple virtual machines 206-210, and may be shared by multiple hosts. In a particular embodiment, primary storage system 212 includes multiple disk drives or other storage devices, such as storage arrays.

Host 200 also includes a cache provisioner 214 and a cache 216 containing one or more memory devices, such as flash memory devices or RAM. A flash memory device is a non-volatile memory that can be repeatedly erased and reprogrammed. A cache memory constructed using flash memory may also be referred to as a solid state drive (SSD). Cache 216 is managed by cache provisioner 214 to dynamically provision capacity and IOPS to virtual machines 206-210. Cache provisioner 214 allows multiple virtual machines to share the same cache without risk of having two virtual machines access the same cache page. Additional details regarding the operation of cache provisioner 214 and cache 216 are discussed herein.

Each virtual machine 206-210 includes an I/O driver 218 and a cache management system 220—also referred to as a CFS (Cache File System). I/O driver 218 intercepts I/O operations generated by the associated virtual machine and directs the I/O operation to cache provisioner 214 for processing. I/O driver 218 is particularly effective at intercepting I/O operations due to its location within the virtual machine and its close proximity to the source of the data associated with the I/O operation. I/O driver 218 may also be referred to as a "device driver". In a particular embodiment, the I/O drivers are included with an operating system. For example, each device comes with its own device driver. These device drivers have a generic component that is a part of the operating system and there is a device-specific component that is typically supplied by the device vendor. In a particular embodiment, the I/O drivers discussed herein are implemented on top of both these drivers. These I/O drivers are in the path of the device driver and intercept well known I/O APIs that are published by the operating system. This architecture is often referred to as a filter driver. In a particular implementation, this is referred to as a filter driver that sits above standard device drivers for I/O operations.

Cache management system 220 contained in each virtual machine interacts with cache provisioner 214 and other components to manage access to cache 216. For example cache management system 220 includes multiple cache tags that are used in associating an address in a virtual machine with a physical address in cache 216. Cache provisioner 214 manages the storage capacity of cache 216 by, for example, allocating cache space among the multiple virtual machines 206-210, as discussed herein. The allocation information associated with a particular virtual machine is communicated to the cache management system in that virtual machine. Additional details regarding the operation of I/O driver 218 and cache provisioner 214 as well as the use of cache tags are provided below.

In a particular embodiment, each virtual machine 206-210 represents a virtual desktop, such as a desktop environment associated with a particular user. In this embodiment, the user accesses the desktop environment via a terminal or other system. This desktop environment is commonly referred to as VDI (Virtual Desktop Infrastructure). Thus, a single host can replace hundreds or more individual desktop computing systems. In another embodiment, each virtual machine 206-210 represents a server application. In this embodiment, a single host can replace any number of individual software or application servers running multiple server applications.

Figure 3:
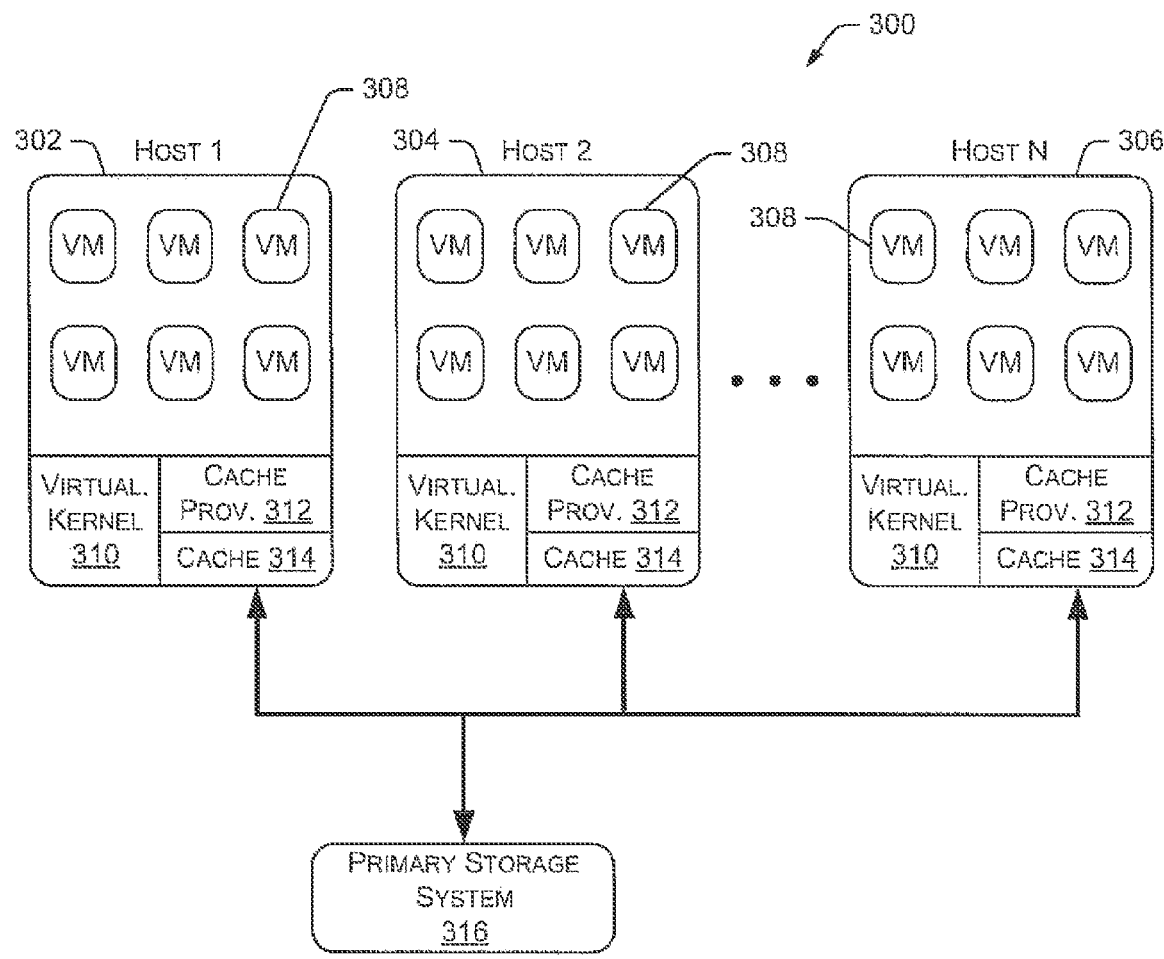
FIG. 3 illustrates an example virtualized environment containing multiple hosts and shared data storage systems.

FIG. 3 illustrates an example virtualized environment 300 containing multiple hosts and shared data storage systems. Virtualized environment 300 includes three host systems 302, 304, and 306, each of which contains multiple virtual machines 308. Although not shown in FIG. 3, each virtual machine 308 includes an I/O driver similar to I/O driver 218 and a cache management system 220 shown in FIG. 2. Each host system 302-306 includes a virtualization kernel 310 and a cache provisioner 312 (labeled "Cache Prov."), similar to those discussed above with respect to FIG. 2. Additionally, each host system 302-306 includes a cache 314, similar to cache 216 discussed with respect to FIG. 2. Although three host systems 302-306 are shown in virtualized environment 300, a particular embodiment may include any number of host systems.

Virtualized environment 300 also includes a primary storage system 316 that is shared among the multiple host systems 302-306 and the multiple virtual machines 308 in those host systems. In a particular embodiment, primary storage system 316 includes multiple disk drives or other storage devices.

Figure 4:
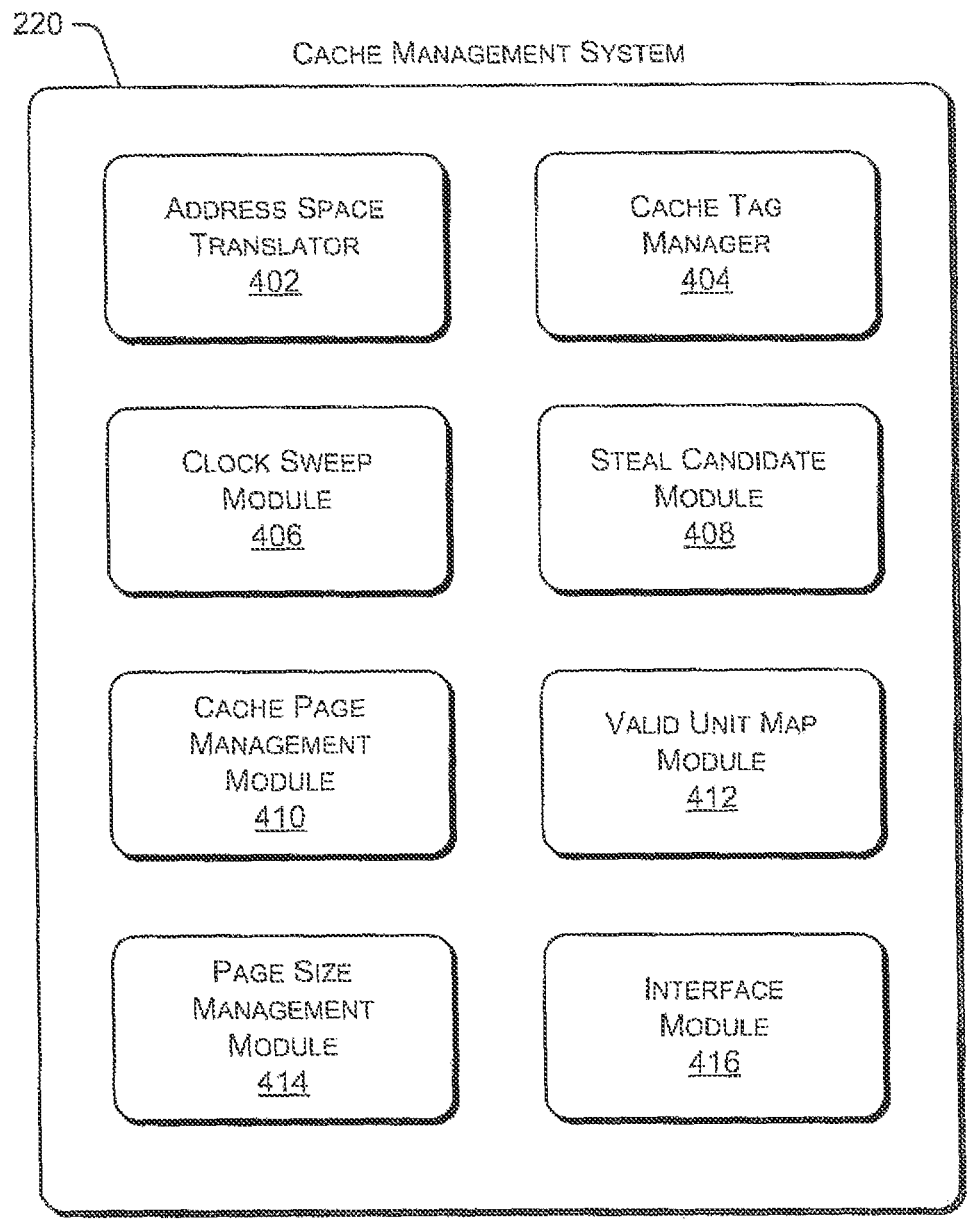
FIG. 4 is a block diagram illustrating example components of a cache management system.

FIG. 4 is a block diagram illustrating example components of cache management system 220 (shown in FIG. 2). Cache management system 220 includes an address space translator 402 that correlates addresses in a primary storage system with storage locations in a cache. A cache tag manager 404 performs various operations associated with a cache and related cache tags, as described herein. A clock sweep module 406 performs various operations associated with the clock hand sweep timer discussed below.

Cache management system 220 also includes a steal candidate module 408 that identifies stored cache data that are candidates for removal from the cache. A cache page management module 410 manages various cache page data and related operations. A valid unit map module 412 identifies valid data stored in a cache and/or a primary storage system. A page size management module 414 performs various page size analysis and adjustment operations to enhance cache performance. Finally, an interface module 416 allows cache management system 220 to interact with other components, devices and systems.

Figure 5:
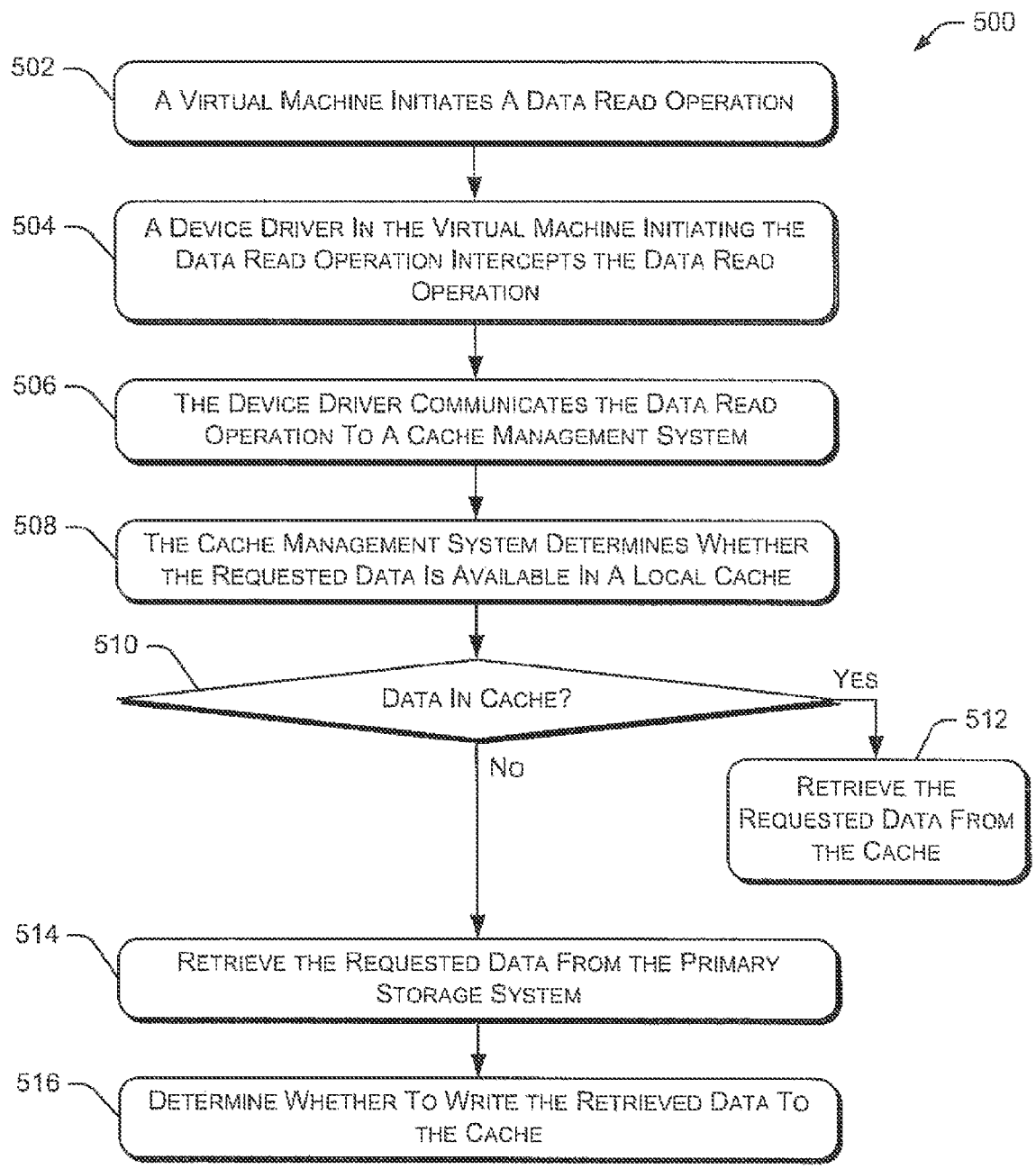
FIG. 5 is a flow diagram illustrating an embodiment of a procedure for implementing a data read operation.

FIG. 5 is a flow diagram illustrating an embodiment of a procedure 500 for implementing a read operation. Initially, a virtual machine initiates a data read operation (block 502). A device driver, such as an I/O driver, in the virtual machine that initiated the data read operation intercepts the data read operation (block 504). The device driver communicates the data read operation to a cache management system (block 506). In alternate implementations, the cache provisioner is located in a different host or in a different component or system.

Procedure 500 continues as the cache management system determines whether the requested data is available in the cache (block 508), such as cache 216 or 314. If the data is determined to be in the cache (block 510), the procedure branches to block 512, where the requested data is retrieved from the cache. If the data is not available in the cache, the procedure branches to block 514, where the requested data is retrieved from the primary storage system, such as primary storage system 212 or 314 discussed above. After retrieving the requested data from the primary storage system, the procedure determines whether to write the retrieved data to the cache (block 516) to improve the storage I/O performance of the virtual machine. This determination is based on various cache policies and other factors.

The cache management system discussed herein (also referred to as a "Cache File System or CFS") treats the flash memory devices as a cache, but uses a file system model. The cache management system develops and maintains a working set for the cache. In general, the working set is the set of data that should be contained in the cache to support optimal performance of the host and its supported virtual machines.

As mentioned above, the cache is created using flash memory devices. These devices typically provide fast read operations, but slow write operations. These slow write operations can result in a significant delay when initially developing the working set for the cache. Additionally, flash devices can generally accept a limited number of write operations. After reaching the "write lifetime" of the flash device, portions of the flash device become unusable and the integrity of the device begins to deteriorate. These characteristics of flash devices are taken into consideration by the cache management system when managing the cache.

Figure 6:
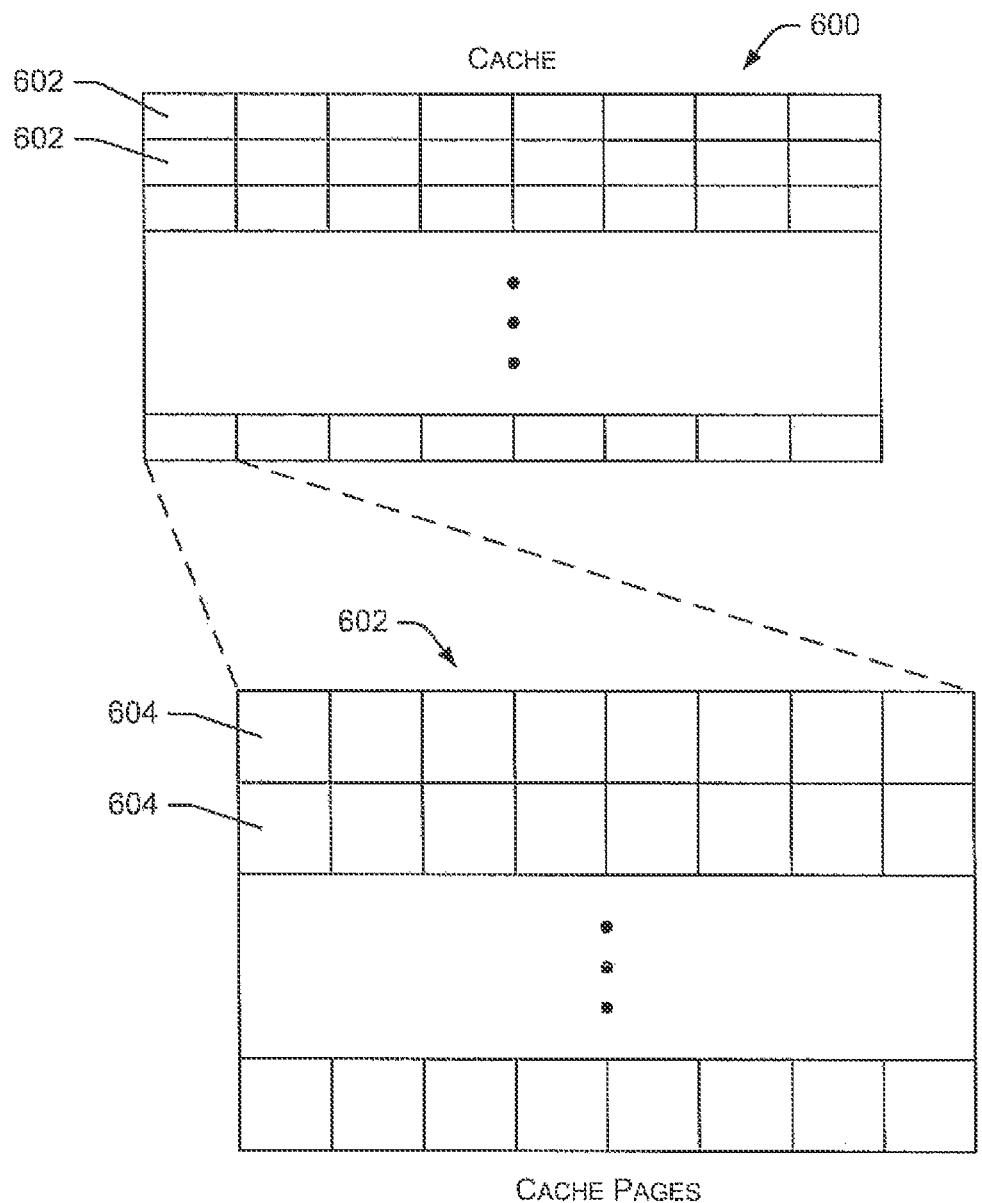
FIG. 6 illustrates an example structure of a data cache and associated cache pages contained in the data cache.

FIG. 6 illustrates an example structure of a cache 600 and associated cache pages contained in the cache. Cache 600 is broken into multiple chunks 602. A cache can be divided into any number of chunks having any size. In a particular embodiment, each chunk 602 contains 256 MB (megabytes) of memory storage. In this embodiment, the number of chunks depends on the cache capacity. For example, a 1 TB (terabyte) cache may be divided into 256 MB chunks, and may contain 4192 chunks. As shown in FIG. 6, each chunk 602 is divided into multiple cache pages 604.

Cache chunks 602 are assigned to virtual machines based on the cache needs of each virtual machine. The number of chunks 602 assigned to a particular virtual machine can change over time as the cache needs of the virtual machine changes. The number of chunks 602 assigned to a specific virtual machine defines the cache capacity of that virtual machine. For example, if two 256 MB chunks are assigned to a specific virtual machine, that virtual machine's cache capacity is 512 MB. The assignment of chunks 602 to particular virtual machines is handled by the cache provisioner.

Cache tags are used in mapping storage I/O addresses in a virtual machine to actual cache pages 604 (e.g., physical addresses in the cache). The cache tags can cache data associated with any storage device assigned to a virtual machine. These cache tags perform translations between the addresses of blocks on the storage device (e.g., the primary storage system) and a cache address. Cache tags are organized linearly in RAM or other memory. This allows the address of the cache tag to be used to locate a physical cache page because of the algorithmic assumption that each cache tag has a linear 1:1 correspondence with a physical cache page.

As shown in FIG. 2, cache tags associated with a particular virtual machine are stored within that virtual machine. The cache tags contain metadata that associates storage I/O addresses to specific cache pages in the cache. In a particular embodiment, each cache tag is associated with a particular page in the cache.

In a particular embodiment, a "thin provisioning" approach is used when allocating cache chunks to the virtual machines. In this embodiment, each virtual machine is allocated a particular number of cache chunks, as discussed above. However, the entire cache capacity is "published" to each of the virtual machines. For example, if the total cache size is 1 TB, each virtual machine reports that it has access to the entire 1 TB of storage space. However, the actual allocation of cache chunks may be considerably smaller (e.g., 256 MB or 512 MB)—based on the current needs of the virtual machine. The allocated cache chunks represent a specific range of addresses allocated to each virtual machine within the cache. The cache provisioner dynamically changes these cache chunk allocations as each virtual machine's working set requirements change. Regardless of the number of cache chunks actually allocated to a particular virtual machine, that virtual machine reports that it has access to the entire 1 TB cache.

Figure 7:
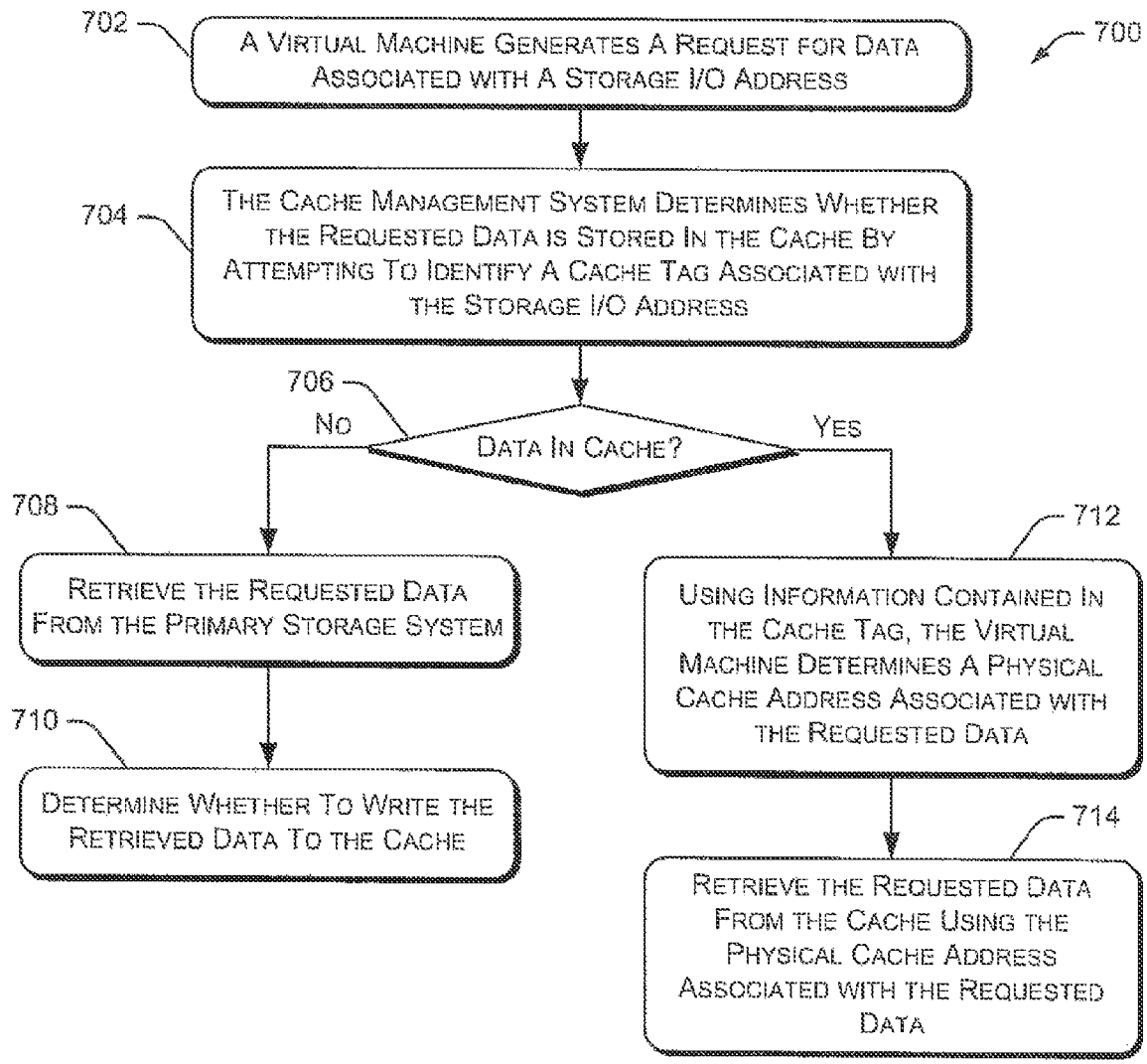
FIG. 7 is a flow diagram illustrating an embodiment of a procedure for implementing a virtual machine read operation using cache tags.

FIG. 7 is a flow diagram illustrating an embodiment of a procedure 700 for implementing a virtual machine read operation using cache tags. Initially, a virtual machine generates a request for data associated with a storage I/O address (block 702). The cache management system (e.g., cache management system 220 shown in FIG. 2) determines whether the requested data is stored in the cache by attempting to identify a cache tag associated with the storage I/O address (block 704). If the requested data is not in the cache (block 706), the requested data is retrieved from the primary storage system (block 708). After retrieving the requested data from the primary storage system, the procedure determines whether to write the retrieved data to the cache (block 710) to improve storage I/O performance of the virtual machine. This determination is based on various cache policies and other factors.

If the decision is to write the retrieved data to the cache, the cache management system uses the memory address of the cache tag to determine a physical cache address associated with the data to be written. The data is then written to the cache using the physical cache address associated with the data.

If the requested data is in the cache (block 706), the cache management system uses the memory address of the cache tag to determine a physical cache address associated with the requested data (block 712). The requested data is then retrieved from the cache using the physical cache address associated with the requested data (block 714).

Storing the cache tag information within the associated virtual machine allows the virtual machine to easily determine where the data is stored physically in the cache without having to access a different system or process. Instead, the systems and methods described herein allow each virtual machine to quickly access cache tags, which increases the speed and efficiency of the I/O operations. Additionally, the virtual machine typically understands the data it is processing better than other systems. For example, the virtual machine understands the nature and context of the data it is processing. This understanding of the data enhances the development and management of an effective working set. Other systems that are external to the virtual machine may simply see the data as raw data without any context or other understanding. Thus, having the cache tag information stored locally in the virtual machine enhances the operation of the virtual machine and the I/O operations.

Figure 8:
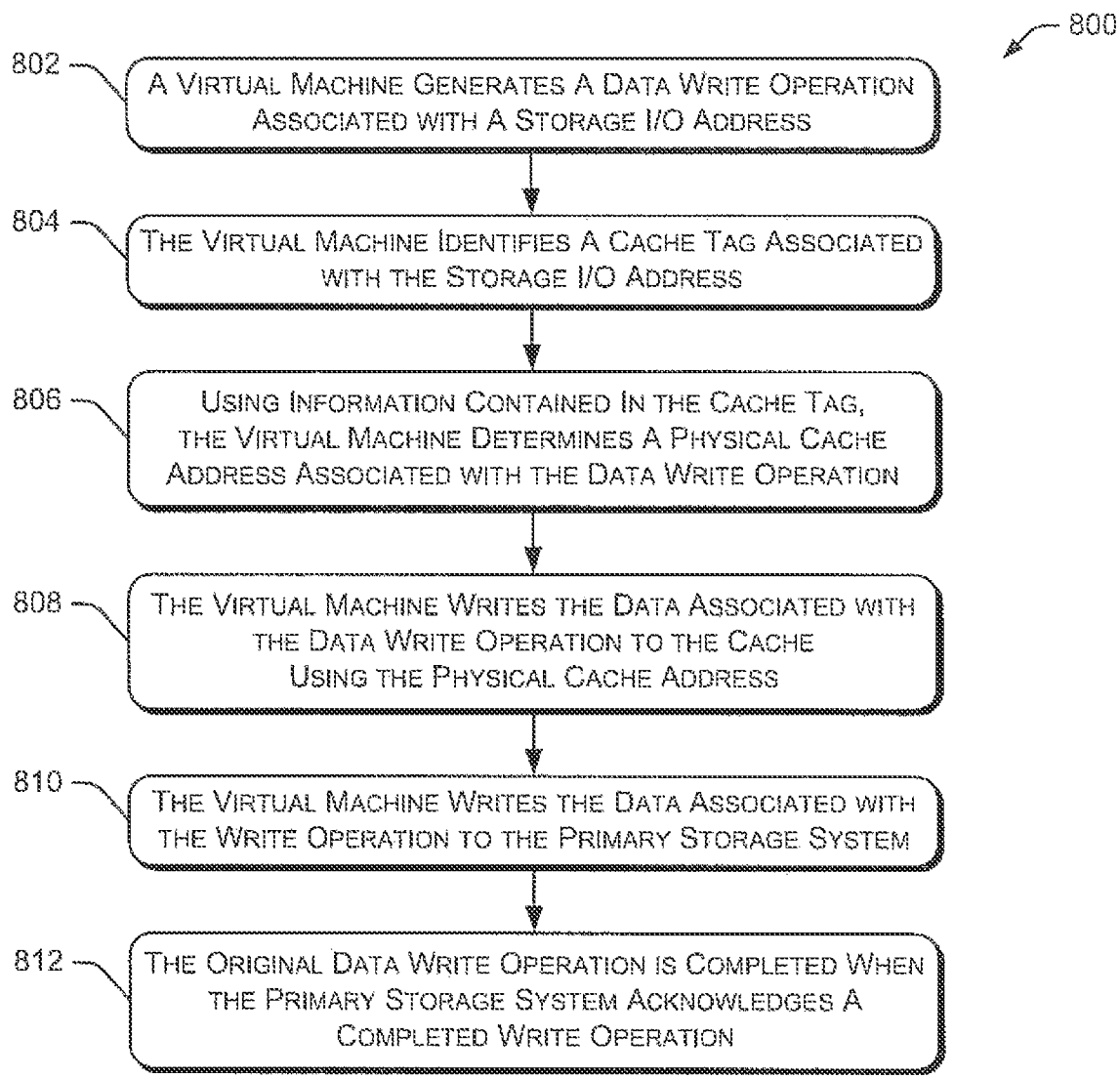
FIG. 8 is a flow diagram illustrating an embodiment of a procedure for implementing a data write operation.

FIG. 8 is a flow diagram illustrating an embodiment of a procedure 800 for implementing a data write operation. Initially, a virtual machine generates a data write operation associated with a storage I/O address (block 802). As discussed herein, the storage I/O address is translated to a physical address in the cache device using the cache tags stored within the cache management system of the virtual machine. The virtual machine identifies a cache tag associated with the storage I/O address (block 804). Using the information contained in the cache tag, the virtual machine determines a physical cache address associated with the data write operation (block 806).

Next, the virtual machine writes the data associated with the data write operation to the cache using the physical cache address (block 808). The virtual machine also simultaneously writes the data associated with the data write operation to the primary storage system (block 810). The original data write operation is completed when the primary storage system acknowledges a completed write operation (block 812).

In a particular implementation, the cache discussed herein is a write-through cache. This type of cache writes data to both the primary storage system and the cache. A write completion is acknowledged after the write operation to the primary storage system is completed, regardless of whether a corresponding write operation to the cache has completed. In specific embodiments, cache write operations can be queued and completed as the cache speed allows. Thus, a cache with a slow write speed (or a queue of pending write operations) does not degrade performance of the overall system. Cache tags associated with incomplete or queued write operations are identified as "pending." After the write operation completes, the associated cache tag is identified as "valid". When the cache tag is identified as "pending," any attempted read of the data associated with the cache tag results in a cache miss, causing retrieval of the requested data from the pending memory buffer associated with the I/O, or from the primary storage system.

As mentioned above, each cache tag stored in a virtual machine is associated with a particular cache page. Additionally, the systems and methods described herein are capable of dynamically allocating cache resources (e.g., cache chunks) to the virtual machines in a virtualized environment. Using the features of the present invention, the number of cache tags associated with a particular virtual machine can be increased beyond the number of cache pages actually associated with the virtual machine. This increase in cache tags allows the cache management system to determine whether increasing the number of cache pages assigned to the particular virtual machine will likely improve the cache hit rate for that virtual machine. In other words, the systems and procedures described herein assist in determining cache misses caused by limited cache storage capacity. Specifically, this allows us to determine cache capacity misses.

Figure 9:
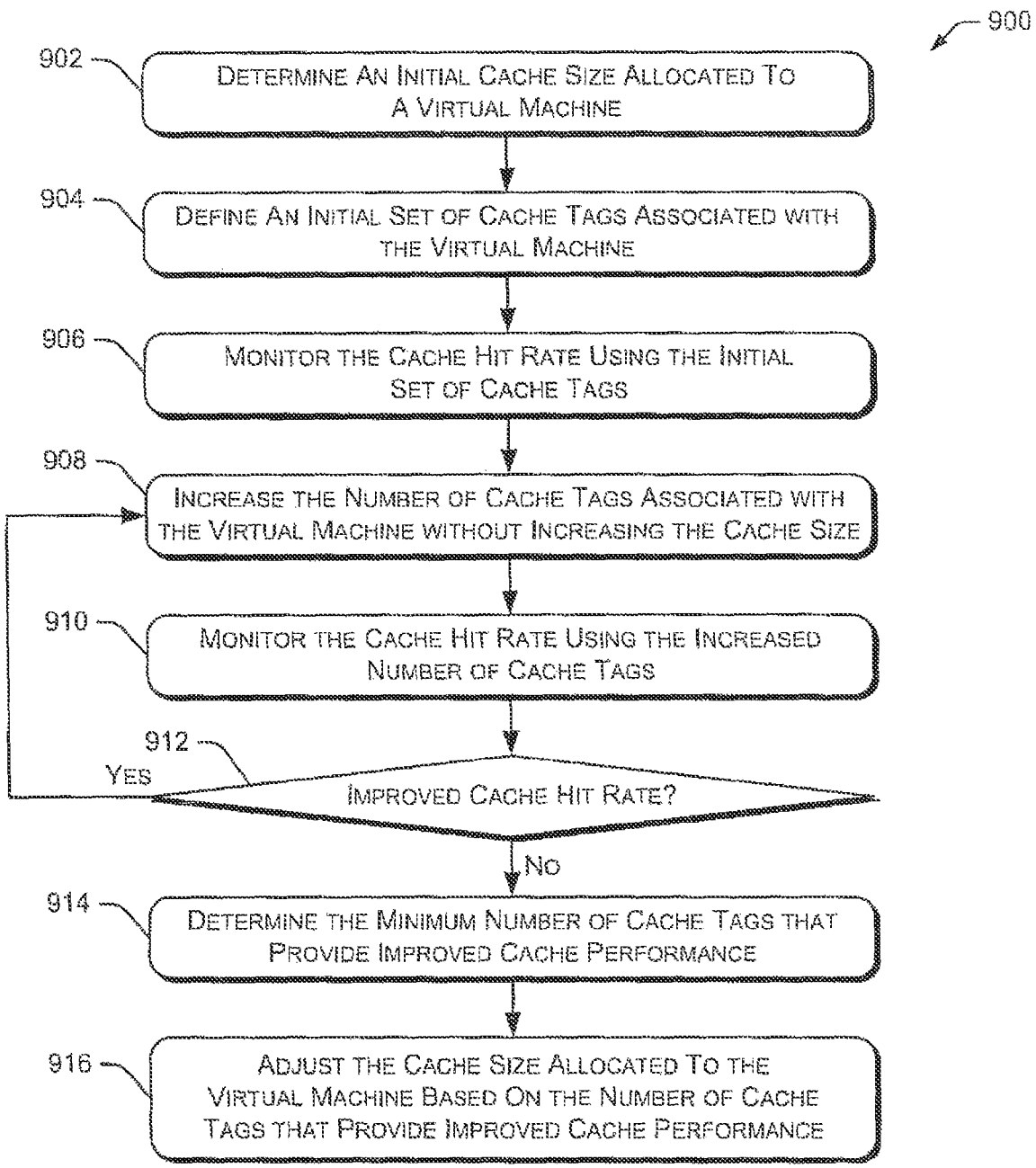
FIG. 9 is a flow diagram illustrating an embodiment of a procedure for allocating cache resources to a virtual machine.

FIG. 9 is a flow diagram illustrating an embodiment of a procedure 900 for allocating cache resources to a virtual machine. In a particular embodiment, procedure 900 is performed as part of a "profiler" process that analyzes data associated with a particular system. Initially, the procedure determines an initial cache size allocated to a virtual machine (block 902). The procedure then defines an initial set of cache tags associated with the virtual machine (block 904). The number of cache tags in this initial set corresponds to the initial cache size allocated to the virtual machine. The cache management system monitors the cache hit rate using the initial set of cache tags (block 906).

The procedure increases the number of cache tags associated with the virtual machine without increasing the cache size (block 908). For example, the procedure may increase the number of cache tags by an amount that corresponds to assigning an additional cache chunk to the virtual machine. However, the additional cache chunk is not actually assigned to the virtual machine at this point in the evaluation procedure. Next, procedure 900 monitors the cache hit rate using the increased number of cache tags (block 910). After monitoring the cache hit rate with the increased number of cache tags for a period of time, the procedure determines whether the cache hit rate has improved (block 912). If the cache hit rate has improved as a result of the additional cache tags, the procedure returns to block 908 to further increase the number of cache tags associated with the virtual machine.

The process of increasing the number of cache tags and monitoring the results continues until the increase in cache tags does not improve the cache hit rate. At this point, procedure 900 determines the minimum number of cache tags that provide improved cache performance (block 914). In an alternate embodiment, the procedure determines an optimal number of cache tags that provide optimal cache performance. The procedure then adjusts the cache size allocated to the virtual machine based on the number of cache tags that provide improved cache hit rate performance (block 916). Dynamic addition of cache chunks or capacity to a virtual machine is based on both the hit rate and other policy that handles cache resource provisioning to other virtual machines. The hit rate, IOPS improvements, and cache capacity are also adjusted using policy that can be controlled by the user or implemented algorithmically based on rules specified by the user.

In a particular embodiment, the number of cache tags added at block 908 is substantially the same as the number of the cache pages in a particular cache chunk. Thus, allocating additional cache resources to the virtual machine is performed by allocating a number of cache chunks that corresponds to the minimum number of cache tags that provide improved cache performance.

FIG. 10 illustrates example clock hand data values 1000 associated with a cache tag over time. The clock hand data values utilize two bits of information for each clock hand. In the example of FIG. 10, which includes two clock hands, a total of four bits are used. Thus, the memory usage to store these bits of data is considerably less than other systems that use pointers and other data structures requiring significant amounts of storage space.

Each clock hand has a different time interval. In the example of FIG. 10, one clock hand has a time interval of ten minutes and the other clock hand has an interval of one hour. The time interval associated with each clock hand indicates the frequency with which the clock hand "sweeps" the clock hand data bits. For example, a clock hand with a time interval of ten minutes clears one of the two clock hand data bits every ten minutes. Each time a cache page is accessed (a cache hit), all clock hand bits associated with the cache page are reset to a value of "1".

As shown in FIG. 10, all clock hand bits are initially set to "1" (e.g., at time 00:00). After the first ten minute clock sweep, Bit 2 of clock hand 1 is cleared to "0". The clock hand bits associated with the one hour clock hand are unchanged because the one hour clock sweep has not yet occurred. In this example, the ten minute clock sweep occurs at time 00:08, which is less than ten minutes. This occurs because the initial time (00:00) is not necessarily aligned with a clock sweep time.

After a second ten minute clock sweep without any access of the cache page, the Bit 1 of clock hand 1 is cleared, leaving a clock hand value of "00". At this time, the cache page associated with this example is identified as a "steal" candidate; i.e., the cache page is a candidate for removal from the cache due to a lack of access of the cache page data. A separate table or other listing is maintained for cache pages in which both clock hands have been cleared. Cache pages with both clock hands cleared are top candidates for "steal" prior to cache pages with only one clock hand cleared.

As shown in FIG. 10, if a cache page data access occurs at time 00:22, all clock hand bits are set to "1". At time 00:31, the one hour clock hand sweeps, causing the clearing of Bit 2 of clock hand 2. That bit is set (along with setting all other clock hand bits) at time 01:04 due to a cache page data access. Although the particular example of FIG. 10 uses two clock hands with ten minute and one hour intervals, alternate embodiments may use any number of clock hands, each having any time interval.

Figures 11, 12:
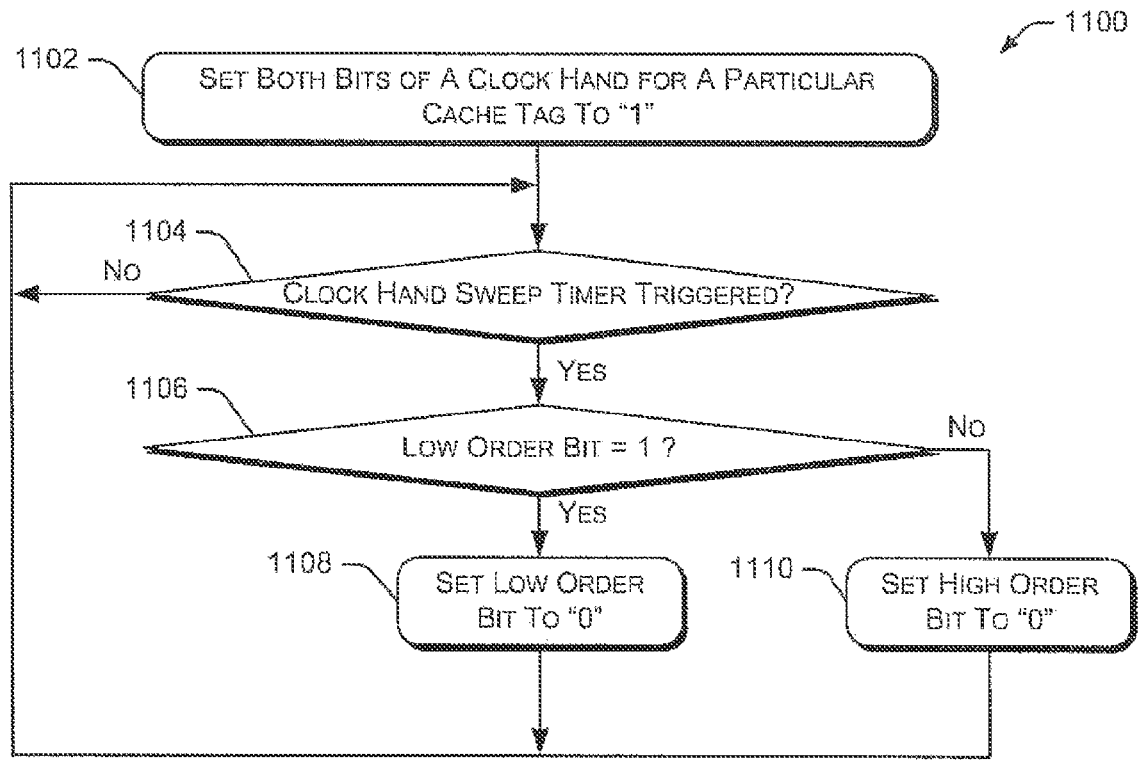
FIG. 11 is a flow diagram illustrating an embodiment of a procedure for managing clock hand data associated with a cache tag.
FIG. 12 illustrates an example cache tag data structure.

FIG. 11 is a flow diagram illustrating an embodiment of a procedure 1100 for managing clock hand data associated with a cache tag. In a particular embodiment, procedure 1100 is performed by each virtual machine in a host. Initially, both bits of a clock hand for a particular cache tag are set to "1" (block 1102). The procedure continues by determining whether a clock hand sweep timer has triggered (block 1104). In a particular embodiment, a separate thread is dedicated to the clock hand sweep. That thread has an associated timer that triggers at each clock sweep interval. If a clock hand sweep timer triggers, the procedure determines whether a low order bit associated with the clock hand is "1" (block 1106). If so, the low order bit is set to "0" (block 1108). If, at block 1106, the low order bit was already set to "0", the procedure branches to block 1110, which sets the high order bit to "0". Procedure 1100 then returns to block 1104 to continue monitoring for the triggering of the clock hand sweep timer.

FIG. 12 illustrates an example cache tag data structure. The size of several fields in the cache tag are dynamic. Thus, the entire cache tag data structure size is dynamic. A cache tag provides a translation between a storage I/O address and a physical address in the cache. The cache tag data structure shown in FIG. 12 includes a next cache tag index that is fixed in size which is used to link cache tags in the hash table. In operation, the next cache tag index is converted to a memory address to find the next cache tag linked to the current cache tag. A state field is fixed in size and identifies a current state of the cache tag. Example state transition diagrams are discussed below with respect to FIG. 13. The clock hands field is a dynamic field and indicates the number of clock hands (e.g., the number of time intervals) associated with the cache tag. The checksum field is a dynamic field that varies in size based on the size of the cache page and the level of integrity desired by the user. A user can determine the strength of the checksum. For example, a user can obtain a higher level of integrity for the checksum by allocating more bits of memory to the checksum.

Finally, the cache tag data structure includes a valid unit map field, which is a dynamic field that identifies which units in a page are cached. An example of a unit within a cache page is a sector. For example, a particular page may have one or more sectors that are missing or no longer valid. The valid unit map identifies the status of all units associated with a particular cache page to prevent accessing data in units that is not valid.

Figure 13:
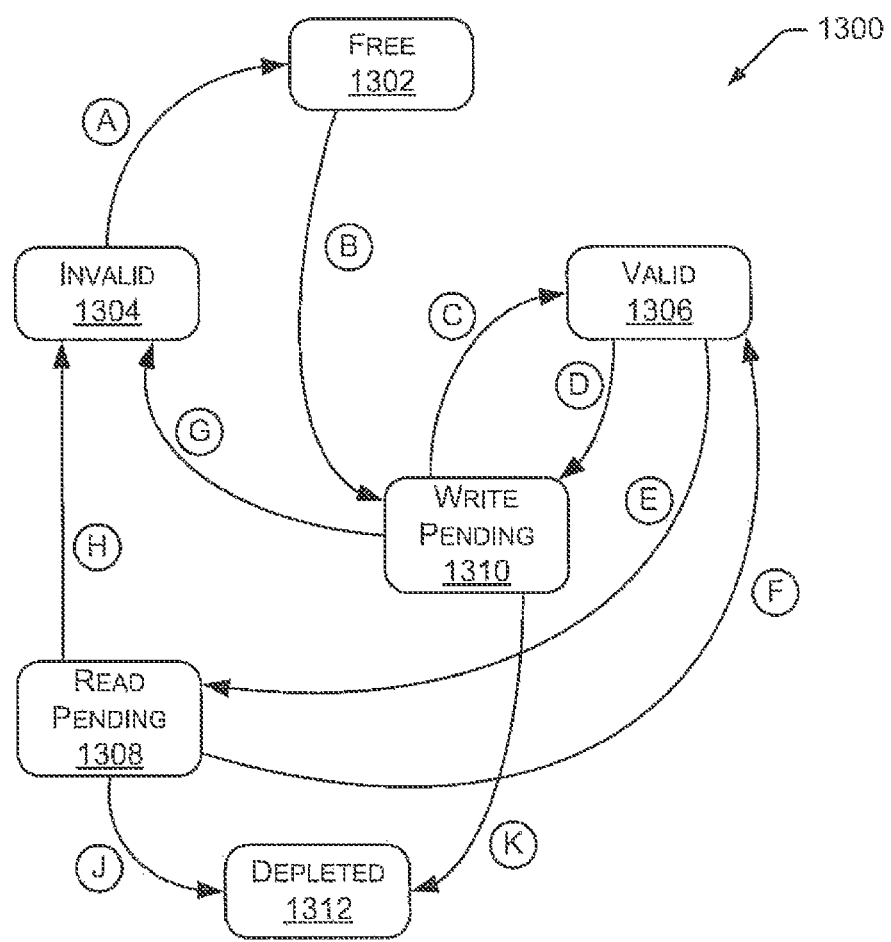
FIG. 13 illustrates an example state transition diagram.

FIG. 13 illustrates an example state transition diagram 1300 associated with the operation of the systems and methods described herein. State transition diagram 1300 includes multiple states: a Free state 1302, an invalid state 1304, a valid state 1306, a read pending state 1308, a write pending state 1310, and a depleted state 1312. In one embodiment, these various states 1302-1312 are associated with data stored in a cache. The transitions between states 1302-1312 are identified by letters (illustrated in circles) in FIG. 13. Transition B (from free state 1302 to write pending state 1310) occurs upon initiation of a cache write operation or a cache read update. Transition C occurs when a cache write or cache read operation is completed successfully. Transition D occurs upon initiation of a cache write operation or a cache read update. Transition E occurs upon initiation of a cache read operation. Transition F occurs upon successful completion of a cache read operation. Transition G occurs when a concurrent write operation occurs before an earlier cache write operation or cache read update completed. Transition H occurs when a concurrent write operation occurs before an earlier read operation completes. Transition A (from invalid state 1304 to free state 1302) occurs when the first cache write or read update is completed successfully. Transition J occurs when a cache read operation fails. Transition K occurs when a cache write operation or a read update fails.

As discussed above, cache chunks (and corresponding cache tags) are allocated dynamically among multiple virtual machines. The allocation is dynamic due to changes in data storage requirements, changes in applications executing on the virtual machines, and the like.

In a particular implementation of the systems and methods described herein, the cache supports multiple page sizes. Different applications executing in the virtual environment may require different page sizes to function properly. For example, some applications always perform 32K data I/O operations. For these applications, it is desirable to use a large cache page size, such as 16K or 32K, to minimize the number of data I/O operations necessary to handle the 32K of data. For example, if the cache page size is 4K and the application performs a 32K data I/O operation, eight cache pages must be accessed to read or write the 32K of data. Performing eight separate I/O operations to accommodate the 32K of data is a burden on system resources and dramatically increases the number of I/O operations that must be processed by the system. In contrast, if the cache page size is 16K, only two I/O operations are required to process the 32K of data. Thus, the larger cache page size reduces I/O operations and the corresponding burden on system resources.

Using larger cache page sizes also reduces the number of cache tags, thereby reducing the memory space required to store the cache tags. For example, in a one terabyte cache having 4K cache pages, 256M cache tags are necessary to provide a single cache tag for each cache page. In the same system using 16K cache pages, 64M cache tags are needed. Thus, the larger cache page size reduces the number of cache tags and the memory resources needed to store the cache tags.

Although larger cache page sizes can reduce I/O operations and reduce the number of cache tags, in certain situations a larger cache page size can result in underutilized cache resources. For example, if a system is using a 32K cache page size and an application performs a 4K I/O operation, only a small fraction of the 32K page is used (28K of the page is not needed). This situation results in significant unused cache resources. Therefore, the systems and methods described herein support multiple cache page sizes to improve utilization of system resources, such as I/O resources and cache storage resources.

Different applications have different data storage characteristics. Applications can be characterized as having "sparse address spaces" or "dense address spaces". Sparse address spaces tend to have scattered data with significant gaps between different groupings of data. In contrast, dense address spaces tend to have data that is more compact with fewer (or smaller) gaps between different groupings of data. When selecting cache page sizes for a particular virtual environment, it is important to consider the data storage characteristics (e.g., sparse or dense address spaces) associated with applications executing in the virtual environment. There can be exceptions where a sparse address space may comprise groups of contiguous data where the groups are sparsely located. In such cases one can use large pages even though the address space is sparse.

In a particular embodiment, data associated with existing applications can be analyzed prior to implementing a system or method of the type described herein. This prior analysis allows the system to be "tuned" based on typical application data. After the systems and methods are implemented, the dynamic nature of the system adjusts cache page sizes, cache allocations, system resources, and other parameters based on changes in the operation of the application.

In a particular implementation, a cache is divided into multiple sections such that each section supports different page sizes. For example, a cache may be divided into four sections, two of which support 4K cache pages, one that supports 16K cache pages, and one that supports 32K cache pages. The cache pages in these different sections are allocated to different virtual machines and different applications based, for example, on the data storage characteristics of the applications.

In one embodiment, different hash tables are used for different cache page sizes. Each hash table has its own associated hash function that identifies a particular hash slot in the table based on an address provided to the hash function. When using multiple hash tables, such as a 4K hash table and a 16K hash table, the systems and methods perform a lookup operation for each hash table. Performing a lookup in both hash tables is necessary because a 4K address could be contained within a 16K entry in the 16K hash table. To enhance the lookup process, the systems and methods described herein apply one or more algorithms based on a percentage of cache hits associated with different cache page sizes, a success rate associated with different hash tables, and other factors.

In a particular implementation, an algorithm uses both the percentage of cache hits associated with cache page sizes and the success rate associated with different hash tables to search for data in a cache.

In other embodiments, the systems and methods use a single hash table associated with the smallest cache page size, such as 4K. Although the cache supports multiple cache page sizes, the hash table uses a 4K page size exclusively. This approach eliminates the need to perform a lookup in multiple hash tables associated with different cache page sizes. In this scheme a 16K page would require 4 hash table lookups and groups of cache tags are managed as one.

In certain situations, it is desirable to prevent one or more cache pages from being stolen or usurped by another virtual machine. This is accomplished in the systems and methods discussed herein by "pinning" the cache tags associated with the cache pages that are to be protected from being stolen. Cache tags are pinned by setting the state bit to "pinned state" in the cache tag.

Pinning cache tags is used in a variety of situations. For example, a system may "freeze" a group of cache tags associated with a virtual machine and move the cache tags to a persistent storage device to preserve the virtual machine's working set. Later, when the virtual machine "warms up," the cache tags are retrieved from the persistent storage device, and actual data is read back from the primary or shared storage, thereby recreating the working set. This allows the virtual machine to resume operation immediately with a fully functioning working set, rather than taking a significant period of time recreating the working set.

Pinning cache tags are also useful to lock a range of addresses in the cache. For example, a user can pin specific data within the cache to prevent the data from being replaced or modified. The user may know that the specified data is critical to the operation of the virtual machine and wants to ensure that the data is always available in the cache.

In certain situations, a portion of data associated with a read operation is available in the cache, but a portion is not available (or not valid) in the cache. In these situations, the system must decide whether to retrieve all of the data from the primary storage system or retrieve a portion from the cache and the remainder from the primary storage system. The decisions involving what's available in the cache can result in more than 1 I/O to primary or shared storage (which is usually more efficient when doing sequential I/Os). Our algorithms have the ability to control the amount of fragmentation of I/Os to primary storage based on its I/O characteristics.

In a particular embodiment, a checksum is calculated for each cache page. When calculating the checksum, the system only performs the calculation on the valid data, based on a valid unit map (e.g., the valid data sectors). When a write operation is performed that increases the number of valid data sectors, the checksum is recalculated to include the new valid data sectors.

Figure 14:
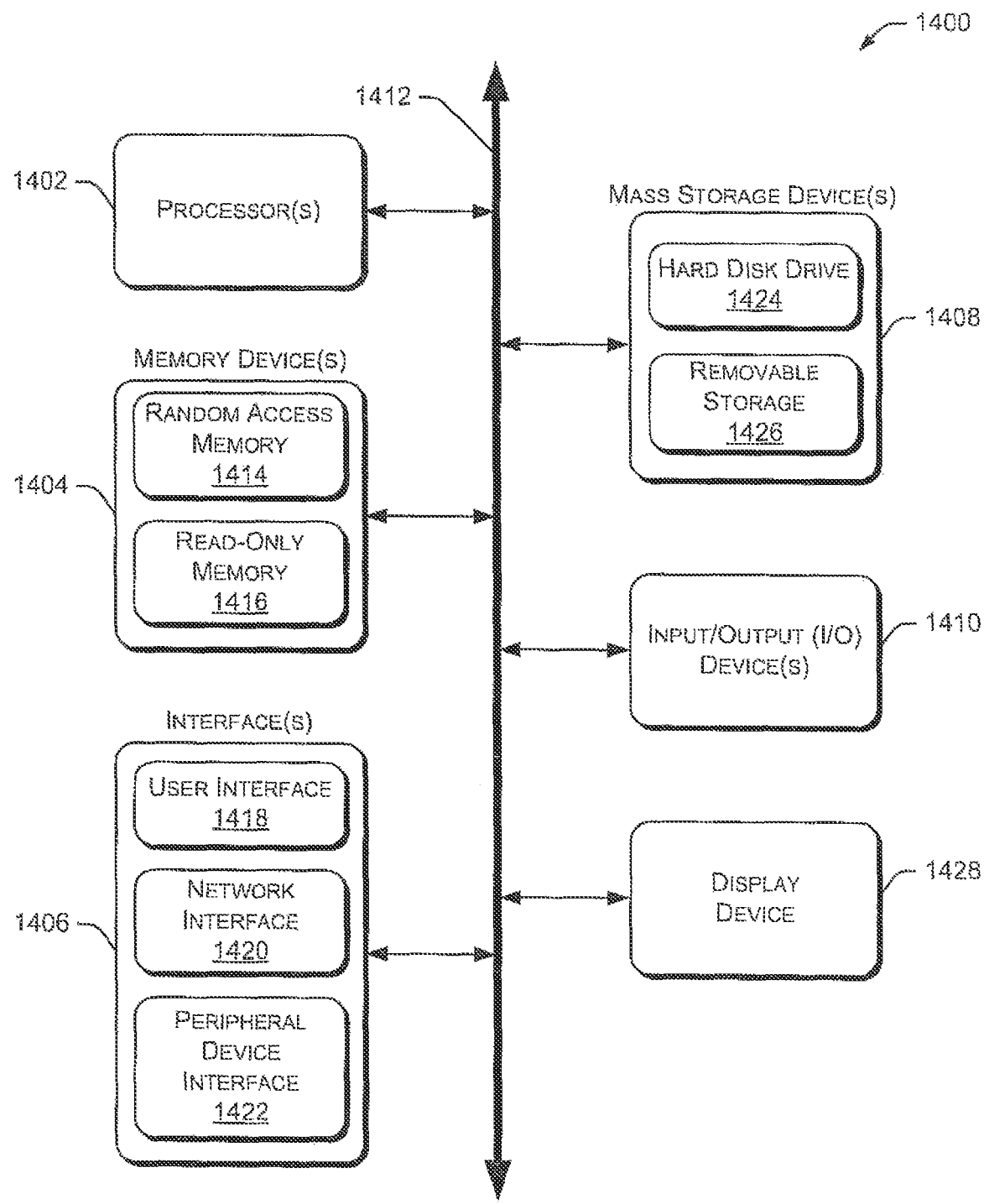
FIG. 14 is a block diagram illustrating an example computing device.

FIG. 14 is a block diagram illustrating an example computing device 1400. Computing device 1400 may be used to perform various procedures, such as those discussed herein. Computing device 1400 can function as a server, a client, or any other computing entity. Computing device 1400 can be any of a wide variety of computing devices, such as a desktop computer, a notebook computer, a server computer, a handheld computer, and the like.

Computing device 1400 includes one or more processor(s) 1402, one or more memory device(s) 1404, one or more interface(s) 1406, one or more mass storage device(s) 1408, one or more Input/Output (I/O) device(s) 1410, and a display device 1428 all of which are coupled to a bus 1412. Processor(s) 1402 include one or more processors or controllers that execute instructions stored in memory device(s) 1404 and/or mass storage device(s) 1408. Processor(s) 1402 may also include various types of computer-readable media, such as cache memory.

Memory device(s) 1404 include various computer-readable media, such as volatile memory (e.g., random access memory (RAM)) 1414 and/or nonvolatile memory (e.g., read-only memory (ROM)) 1416. Memory device(s) 1404 may also include rewritable ROM, such as Flash memory.

Mass storage device(s) 1408 include various computer readable media, such as magnetic tapes, magnetic disks, optical disks, solid state memory (e.g., Flash memory), and so forth. As shown in FIG. 14, a particular mass storage device is a hard disk drive 1424. Various drives may also be included in mass storage device(s) 1408 to enable reading from and/or writing to the various computer readable media. Mass storage device(s) 1408 include removable media 1426 and/or non-removable media.

I/O device(s) 1410 include various devices that allow data and/or other information to be input to or retrieved from computing device 1400. Example I/O device(s) 1410 include cursor control devices, keyboards, keypads, microphones, monitors or other display devices, speakers, printers, network interface cards, modems, lenses, CCDs or other image capture devices, and the like.

Display device 1428 includes any type of device capable of displaying information to one or more users of computing device 1400. Examples of display device 1428 include a monitor, display terminal, video projection device, and the like. Interface(s) 1406 include various interfaces that allow computing device 1400 to interact with other systems, devices, or computing environments. Example interface(s) 1406 include any number of different network interfaces 1420, such as interfaces to local area networks (LANs), wide area networks (WANs), wireless networks, and the Internet. Other interfaces include a user interface 1418 and a peripheral device interface 1422.

Bus 1412 allows processor(s) 1402, memory device(s) 1404, interface(s) 1406, mass storage device(s) 1408, and I/O device(s) 1410 to communicate with one another, as well as other devices or components coupled to bus 1412. Bus 1412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1400, and are executed by processor(s) 1402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In another embodiment, an issue of compatibility that occurs within virtual systems is addressed. In certain virtual systems, some of the processes make certain assumptions about the environment in order to properly operate.

In a single host, there typically will be multiple virtual machines operating in the host. Each virtual machine will have its own separate I/O drivers and also separate cache management module to manage local storage operations from the perspective of each particular virtual machine. Each virtual machine needs to share the local storage cache and each virtual machine will have its own unique demand for space on the local storage cache during its operation. Multiple virtual disks may be created on the local cache storage, and these can be exposed to the local virtual machines. During operation of the various virtual machines, the demand can vary among the different virtual machines. As a result, capacity in the local cache may not be efficiently utilized by the virtual machines, and cache capacity may be wasted.

In one example, a thin provisioned storage is provided, such as a thin provisioned cache, for dynamic allocation of storage space among multiple virtual machines within a host. Since virtual machines are dynamic in nature, their demand for storage space may vary. If they share actual storage space with other virtual machines, the use of the storage space by a group of virtual machines may conflict. For example, if one or more virtual machines experience a higher than normal I/O traffic rate, their operations may become bogged down, causing lags in output. Other machines may experience a lower than normal I/O traffic rate at the same time, leaving their allocated storage space unutilized. Thus, in some cases, the higher I/O virtual machines' use of actual storage space may be unnecessarily restricted by rigid or inefficient allocation schemes. Virtual machines may be transferred from one host to another, may become inactive or offline for some period of time, may power down or rest on a host that needs to power down, or its demand for storage space may change up or down during operation. Thus, it would be useful if the storage space allocated to the group of virtual machines could be dynamically allocated and re-balanced, where actual storage space allocated to any one machine can be apportioned more intelligently. As such, dynamic allocation of storage space could serve to reduce lag time for virtual machines that demand more space and I/O transfers by provisioning more space when other virtual machines associated with the same storage demand less space. The embodiment provides such solutions in an elegant manner.

In typical virtual machine environments, shared storage is utilized among multiple hosts that have equal access to the common storage space. The shared storage may be a clustered file system, a virtual machine file system (VMFS), where the system provides correctness and consistency among the various virtual machine hosts using file based locking and other methods.

One common feature in virtual machine systems is the ability to move a virtual machine from one host to another host. VMWare™ has a product called VMotion™ that enables virtual machines to move from one host to another, where the main storage of the moving virtual machine is maintained on storage that is shared among two or more hosts. The virtual machine may be a live operating virtual machine located on one host, and the desire is to be able to move the virtual machine from one host to another without interruption in the virtual machine during relocation. This is possible because the multiple hosts see and share the common data storage system. Thus, the virtual machine may move from one host to another without shutting down or rebooting the virtual machine, the move is transparent to the moving virtual machine.

When a virtual machine boots up and begins to run, it communicates with its available resources, such as storage devices, network devices, etc., similar to a physical machine. It may send out Small Computer System Interface (SCSI) inquiries to connected storage devices to determine what resources are available, and it discovers what storage is available to the virtual machine. The storage available to the virtual machine is virtual storage that is encapsulated in a file. The encapsulated file is the main storage space for the virtual machine. Thus, the storage for the virtual machine is now instantiated in a file and becomes a virtual hard drive. In prior art devices, this file is stored in the common data storage system shared among multiple hosts.

According to one embodiment, it is desired to store the virtual disk of the virtual machines hosted on a single host in local storage, such as the cache storage. In such a system, if a virtual machine existed that stores its main drive storage on the local cache storage located on the host, a virtual machine would not be able to move from one host to another host. Again, in prior art systems, the virtual disk of the virtual machines is located on storage that is shared among the hosts that are physically separate but commonly connected to the shared storage system.

A virtual disk's block number zero translates to offset zero in the file encapsulating the virtual disk. In response to the virtual machine sending out inquires to define its storage, the system replies that the virtual machine has a virtual storage. As that layer begins to receive reads and writes as SCSI (Small Computer System Interface) traffic it will convert this into file I/O and read and write to the shared file. Thus, a seed of a virtual disk is created on the shared storage that may be visible by the separate hosts. As a result, once the virtual machine moves from one host to another, the virtual machine may continue to operate because it can communicate with the original virtual disk associated with the virtual machine that was moved to the second host just as it did from the prior host. Therefore, in order to move a virtual machine from one host to another, there must be shared storage.

Once provisioned, each virtual machine expects to have access to predetermined and contiguous storage space for which it has the cache tags (discussed above). In one embodiment, a dynamic provisioning approach is provided to divide the cache storage into chunks that can be dynamically provisioned to the separate virtual machines according to their demand for space. According to one embodiment, a cache provisioner is encapsulated in a virtual logical unit number (VLUN) driver, provided to manage the chunks of storage data that is allocated to each virtual machine. A LUN is a misnomer of an acronym known in the art as a place where a machine can read and write a block of data, for example an array of storage disks or other storage devices. In a system, storage devices or arrays publish storage space as addressed that do not necessarily identify a particular storage device or individual storage disks. According to one embodiment, a VLUN disk is a virtual storage space allocated to a virtual machine. Since multiple virtual machines will typically be operating on a single host, the chunks of storage space that come available will likely be located in different physical areas of the cache storage. A VLUN device driver creates a VLUN disk that is assigned to the virtual machine.

In a virtual system, the virtual operating system runs processes and manages operations to allow different processes within the virtual system to properly operate and not conflict with other processes. In one example, an operating system of a virtual machine may operate with the assumption that each separate virtual machine operates with a fixed amount of storage space that typically does not change. Thus, the operating system of the virtual machine may react adversely or may not operate properly if there is sudden atypical change in storage space size for the virtual machine. Thus, it may be important for a virtual machine to appear to have a fixed allotment of storage space, such as cache storage space. According to one embodiment, this is achieved by allocating a limited amount of physical storage space to any one virtual machine as needed by the particular machine's needs. And, to avoid any potential conflict with the operating system that expects to detect a fixed storage space, a virtual amount of space is allocated to each virtual machine that is equal to a set amount of space that a virtual machine's operating system expects to detect. Thus, in operation, the operating system of the virtual machine will detect the set amount of virtual storage space that is allocated, and it will appear to the operating system that that amount of space is constant and consistent. However, in actual operation, the space allocated to a particular virtual machine may vary according to the machine's demand for storage space. And, the overall space will be traded among the virtual machines accessing storage cache to ensure that each virtual machine has no more cache storage than it actually needs, while the operating system is essentially fooled to thinking that each virtual machine has a fixed amount of cache storage space allocated to it.

Thus, the VLUN manager is configured to manage the dynamic allocation of the available chunks to the virtual machines that need them. The storage is thus physically managed in chunks by the VLUN driver that provides each virtual machine with the notion of contiguous chunks of storage space. The VLUN driver thus in a sense translates the allocation from the virtual space into the underlying physical chunks allocated to each virtual machine by the VLUN driver. As a result, the embodiment allows the system within the host to divide up the cache storage into chunks that it can allocate on the fly to the various virtual machines using virtualization of the storage space allocated to the individual virtual machines. In operation, the VLUN driver maintains mapping of the virtual space of each virtual machine to actual physical storage space located in the cache storage. This allows the VLUN to dynamically increase and decrease the size of the allocated storage space of each virtual machine.

Figure 15:
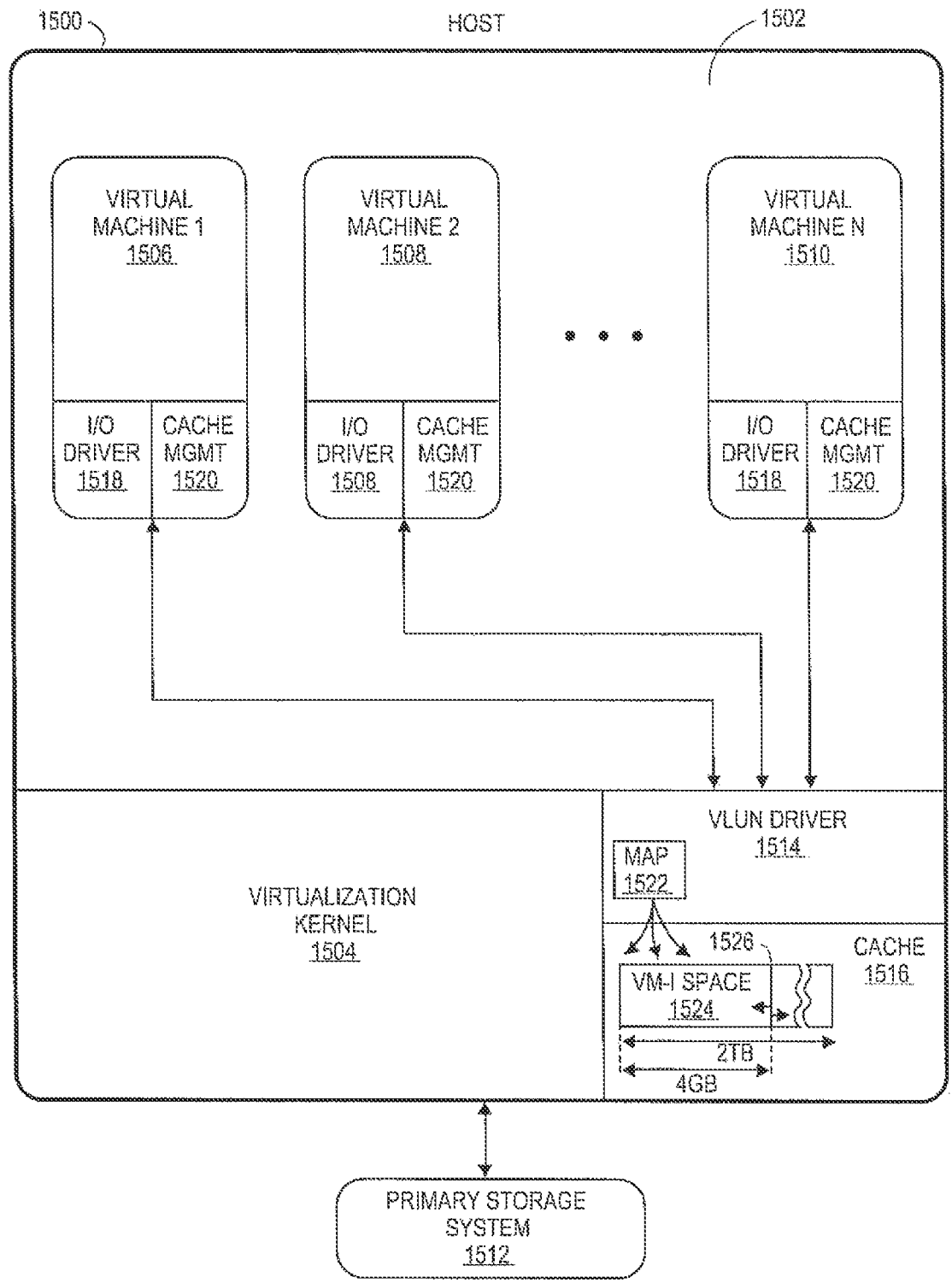
FIGS. 15 through 24 illustrate various other embodiments of the invention related to provisioning of cache storage and transferring virtual machines from one host to another.

Referring to FIG. 15, a block diagram is shown illustrating example components of a host 1500 operating in a virtualized environment, with further details regarding VLUN operations. Similar to systems discussed above, host 1500 includes a user space 1502 and a virtualization kernel 1504. User space 1502 includes multiple virtual machines 1506, 1508 and 1510. Each virtual machine communicates with a VLUN driver 1514 that communicates with cache storage 1516. Each virtual machine has individual I/O drivers 1518 and cache management modules 1520 for managing the communications with the VLUN driver and cache. The cache memory utilized in one embodiment is Flash storage, but may be other types of storage devices. Flash memory is an expensive resource that should be used efficiently and sparingly to keep costs of devices down. In one embodiment, the amount of physical storage that is allocated to any one virtual machine may be varied. This would allow a relatively small cache storage space to dynamically allocate storage space to a number of virtual machines without having to allocate a fixed storage space for each virtual machine. If done properly, virtual machines may be serviced with varying amounts of storage space as they each need them according to their actual demand for cache storage space, and space may be allocated to increase allocations to some virtual machines and decrease allocations to others to keep the net amount of space required for a group of virtual machines to a minimum. Fixed space allocations for each virtual machine would require allocating the maximum capacity needed by each virtual machine. Thus, allowing for variable allocations of space allows for device designs to have a smaller overall flash storage required compared to a device that sets a fixed amount for each virtual machine.

Map module 1522 may be configured within the VLUN to map the virtual space allotted to each virtual machine to physical space existing in the cache storage. Since the actual physical space allocated to a particular virtual machine may not be the same as the virtual cache storage space of the host, the two need to be reconciled so that the virtual machine can properly store and retrieve data (read and write data) stored in the physical cache storage.

For example, cache space allocated for Virtual Machine-1 1506 is illustrated diagrammatically as space 1524 in cache 1516. The virtual space allocated to this virtual machine in this example is two terabytes (2 TB), and the physical cache storage space that is actually allocated to this virtual machine in this example is four gigabytes (4 GB). As discussed above, in one embodiment, a virtual machine is configured to have an allocated physical storage space appear to its operating system as a fixed amount (2 TB in this example), but to have an actual physical storage allocation that is necessary for the particular virtual machine's operation (4 GB in this example). The actual physical storage space for any particular virtual machine may be more or less than that which appears to the operating system. Thus, the virtual barrier 1526 between a particular host's actual allocated physical space and virtual physical space may be different and may vary dynamically as groups of virtual machines that share common cache storage operate.

Figure 16:
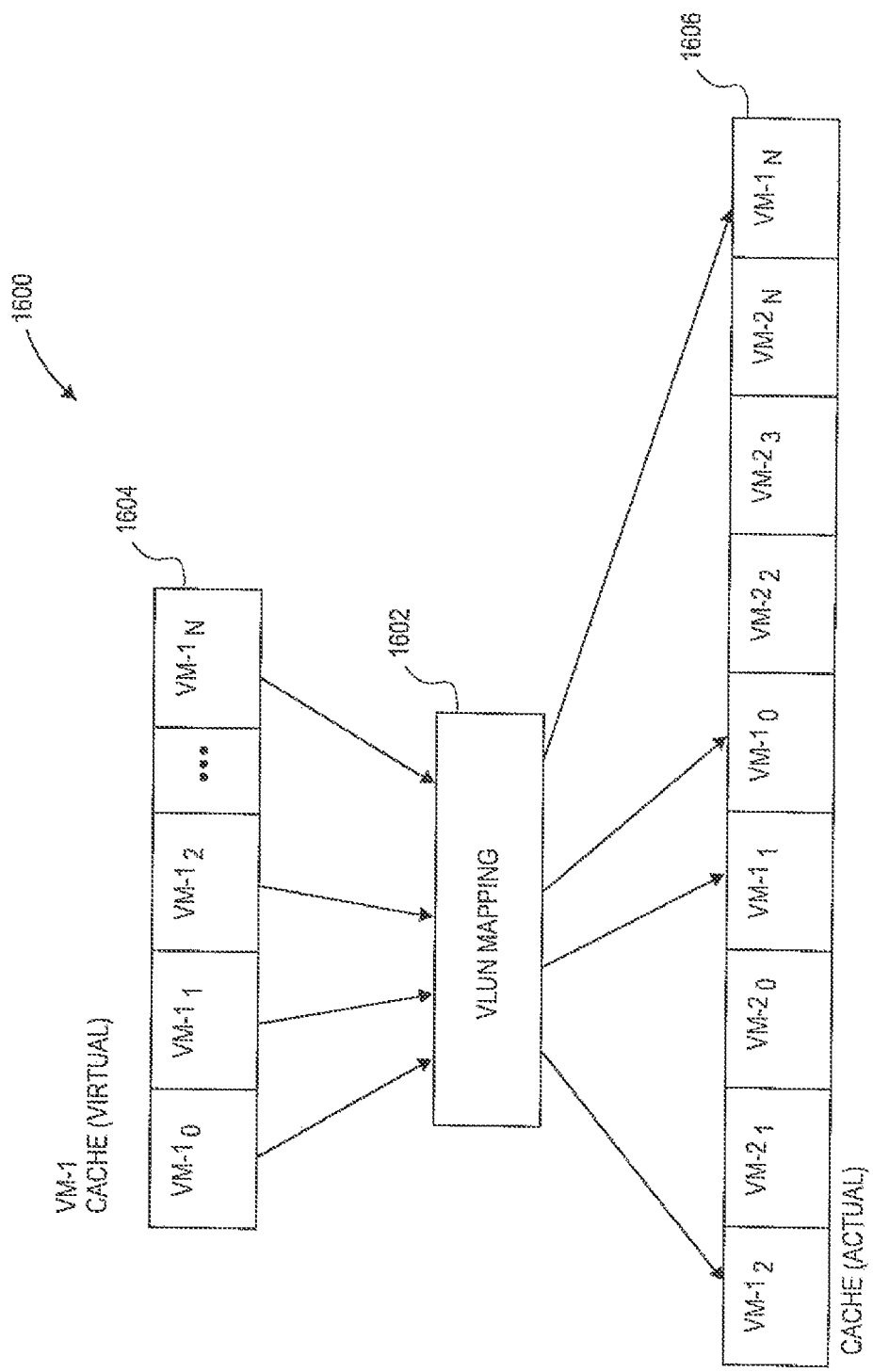

Furthermore, the chunks of storage space allocated to a particular virtual machine may be disbursed within the physical cache space 1516 in an incongruous manner, where the physical storage locations of data for one virtual machine may be interleaved with the storage locations of another virtual machine. This is a result of a configuration where chunks of physical cache storage space are allocated dynamically. The VLUN driver may usurp space from other machines that are not utilizing all of their allocated space and allocate the space to other virtual machines that need more allocated space in cache storage. Referring to FIG. 16, a diagram 1600 illustrating the mapping function 1602 of a VLUN driver is shown. The allocated space 1604 of a virtual cache for a virtual machine is shown as consecutive locations VM-$1_0$, VM-$1_1$, VM-$1_2$, VM-$1_n$. The actual cache space 1606 shows the corresponding locations in actual cache space, where the locations of actual cache storage space is interleaved and in different order among another virtual machine's space, VM-$2_0$, VM-$2_1$, VM-$2_2$, VM-$2_3$, VM-$2_n$. In practice, with multiple virtual machines sharing a common cache, the interleaving of allocated space used by the various machines can become quite complex, particularly as space gets allocated dynamically according to the need of the various virtual machines sharing the actual physical space of the common cache storage. Also, though the illustration in FIG. 16 shows some of the different locations in some physical order, in practice, the spaces allocated may be located in other orders including random order, where space is allocated as available. Thus, the VLUN driver is configured to manage the allocation of the different chunks of physical storage space within cache storage.

Figure 17:
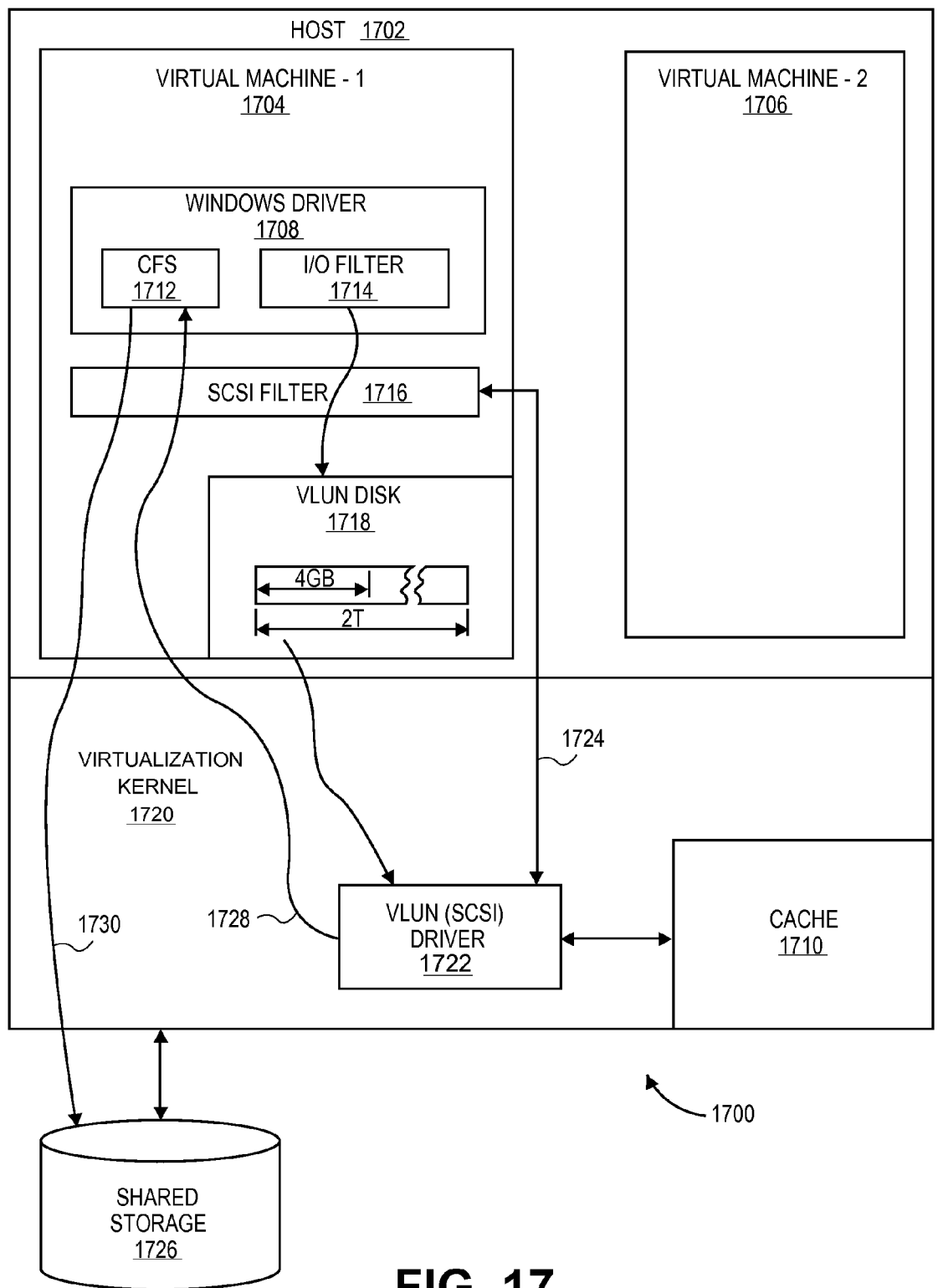

Further Referring to FIG. 17, a diagrammatic system 1700 is shown to illustrate an example of a unique and novel process for changing cache capacity at run time. This is done by dynamically provisioning the amount of space a given virtual machine is allocated according to its current needs. As discussed above, from the view of applications outside a virtual machine, there is a fixed amount of cache storage space allocated to a virtual machine, and it may or may not be the same for each virtual machine. Since multiple virtual machines may exist in a particular host machine, the different machines may have varying demands for storage space, and managing the allocations of space to the various virtual machines is greatly desired in order to optimize the use of the cache space. The VLUN driver, therefore, represents to the operating system that a large fixed amount of space is allocated to the virtual machine, even though a lesser amount is actually allocated to any one virtual machine. Thus, it appears fixed for the virtual machine to appear as having fixed space similar to hosts within conventional virtual systems. According to one embodiment, though this appearance of a fixed amount of allocated cache space is reported, the actual cache space allocated to a particular virtual machine may be dynamically provisioned by a VLUN driver according to each virtual machine.

The host system 1702 illustrated in FIG. 17 includes one or more virtual machines 1704, 1706, and each includes its own SCSI filter 1716 that is incorporated into the virtual machine OS SCSI stack. Each windows driver includes a cache file system (CFS) 1712 that is configured to operate a cache storage device 1710 in the manner of a file system. The CFS may have components that are distributed between the virtual machine and other components of the system, but the individual CFS 1712 serves to manage data transfers between the virtual machine 1704 and various storage devices. An input/output (I/O) filter 1714 serves to selectively screen out data transfers destined to storage that is shared among different host machines and to store certain data locally in cache storage 1710 located within the host 1702. A lower level filter, the small computer system interface (SCSI) filter 1716 is configured to manage transfers between the CFS 1712 and I/O filter 1714 and the various storage devices. Traditionally, SCSI has been used for transferring data between computers and peripheral devices, but the SCSI filter 1716 in this embodiment is configured to manage the transfer of data among physical and virtual entities within the system 1700. Within the virtual machine, the SCSI filter is configured to determine which disk is a VLUN disk, and to manage capacity changes that occur in a virtual disk that is allocated to the particular virtual machine. A VLUN disk 1718 is a virtual storage space as represented by the virtual machine.

As discussed above, in operation, though the actual storage space that is allocated to a particular virtual machine is one value, another value is represented to the operating system so that the system as a whole operates in a stable manner. Thus, a virtual machine may have 4 GB of actual cache storage space allocated to it, but it may appear to the operating system by the virtual machine's representations that it has 2 TB of storage space allocated to it. Within the host there is a user space where the virtual machines reside, and there is a virtualization kernel 1720 where a VLUN (SCSI) driver 1722 resides and is configured to allocate the actual space that is allocated to each virtual machine in cache storage 1710. In order for the SCSI filter 1716 and CFS 1712 to properly operate and manage I/O operations, they both need to be informed of the actual storage space that is allocated to the virtual machine 1704 within the cache 1710, and they need to not be "fooled" that there is more space allocated to the virtual machine than has actually been provisioned to the virtual machine. There is a communication link 1724 that communicates separately from the I/O data traffic and between the VLUN driver 1722 and SCSI filter 1716 that informs CFS 1712 and I/O filter 1714 via the SCSI filter 1716 of the actual cache storage space allocated to the virtual machine 1704. Thus, asynchronous out of band messages may be sent between the VLUN driver 1722 and the SCSI filter 1716 to inform the Windows driver 1708 of actual space allocated to the virtual machine 1704 in the system. The information reaches CFS 1712 so that CFS manages the cache tags used to manage the data stored in the allocated cache storage space within cache storage 1710. Thus, the cache is a thin provisioned cache, where the operating system perceives the appearance of a large amount of space, such as 2 TB for example, but each virtual machine actually gets allocated the amount of storage space it actually needs, 4 GB for example. The communication path 1724 allows the ability to inform the Windows driver, particularly CFS 1712, of cache storage capacity changes when actual cache storage space that is allocated to the virtual machine 1704 changes.

Thus, in underlying operation, each virtual machine is actually allocated an amount of actual cache storage space that may vary over time as each virtual machine's storage needs change or in the event of power on/off events and also events where virtual machines move from one host to another, while the operating system perceives another set value that appears to not change from the perspective of the operating system. The VLUN driver 1722 manages this deception to the operating system together with the SCSI filter 1716. For example, assume for a moment that virtual machine 1704 had 4 GB of actual cache storage space located in cache storage 1710 allocated to it, and 2 TB of virtual storage space as perceived by the operating system.

Figure 18:
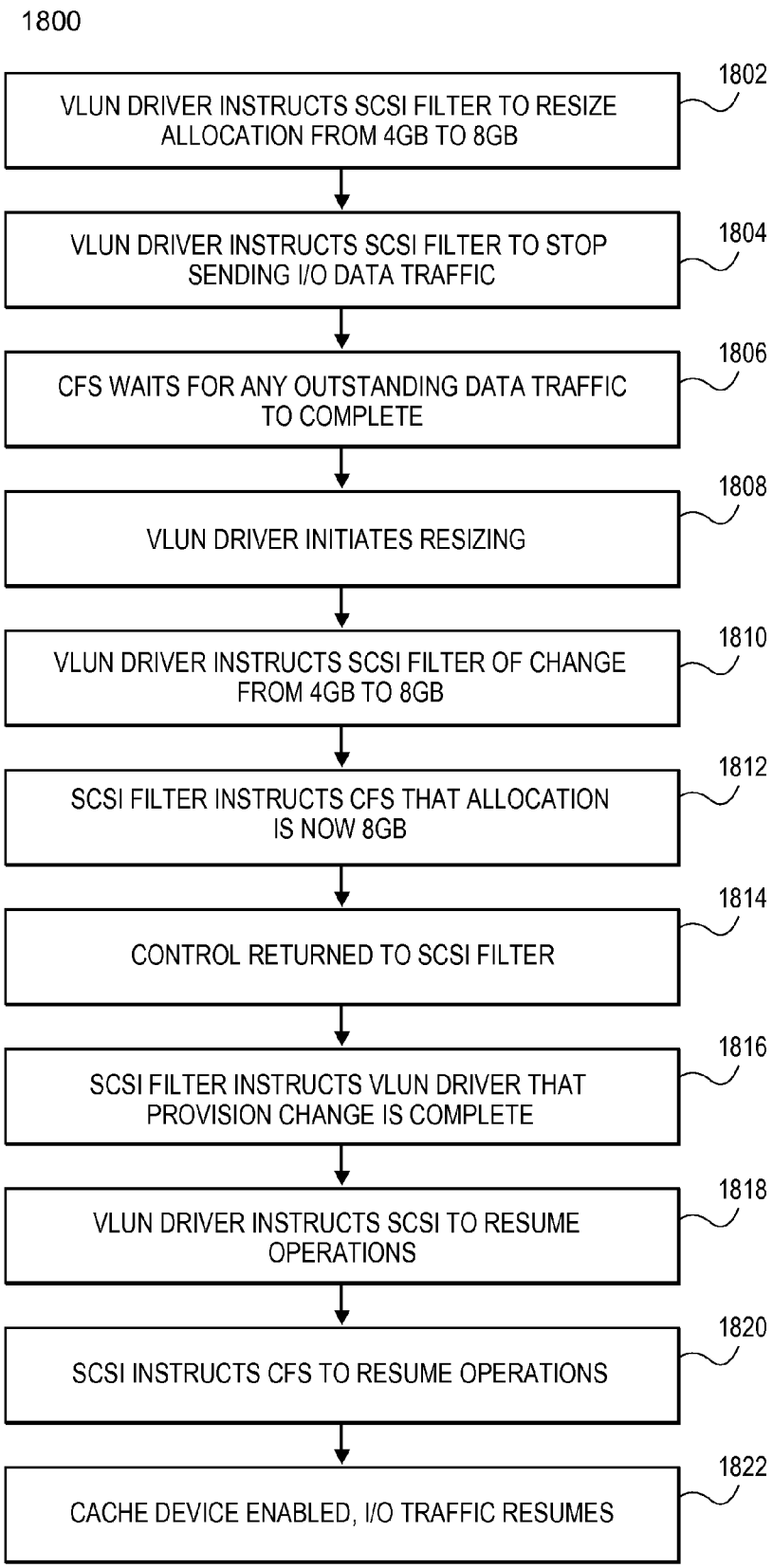

During operation, a virtual machine's needs for cache storage may increase, and it thus needs more cache storage space allocated to it. According to one embodiment, the virtual machine may have its allocated cache storage space changed as its needs for cache storage changes. Referring to FIG. 18, a process flow chart 1800 of a change in allocation of cache storage space is shown, and will act as a process guide in conjunction with the system diagram of FIG. 17 to illustrate how cache storage space is allocated when the cache storage needs of a virtual machine change. As with other processes described herein, certain of these specific process steps may be combined with other steps or other steps may be added in particular applications, but this would not depart from the spirit and scope of the invention as defined in claims, as the processes described herein are intended as merely illustrative. Assume that virtual machine 1704 needs an increase to 8 GB of cache storage as an example. The VLUN driver 1722, a SCSI type device that monitors and manages use and allocations of cache storage space for each virtual machine, causes the SCSI filter 1716 to resize allocated cache storage space from 4 GB to 8 GB in this example. In step 1804, the VLUN driver instructs the SCSI filter to stop sending I/O data traffic during the dynamic provisioning of cache storage space. The SCSI filter 1716 instructs CFS 1712 that a resize is about to take place, so stop sending I/O data traffic to the cache storage device 1710. Alternatively, the instruction from the VLUN driver 1722 may communicate to CFS 1712 through the SCSI filter 1716 via path 1728 to stall I/O operations to the cache storage 1710. In one embodiment, while CFS stalls, it does not mean that applications communicating with the operating system stop working Rather, the I/O data traffic continues to communicate between the CFS 1712 and shared storage 1726 via path 1730 through SCSI filter 1716 and virtualization kernel 1720 (but not through VLUN Disk 1718) so that application operations in the virtual machine continue uninterrupted but will not leverage the cache storage 1710. Thus applications such as Iometer™, Microsoft Office™, SQL Server™, and other applications can continue to operate and the I/O traffic destined to the shared storage 1726 continues. CFS 1712 may also invalidate pertinent cache tags when application write operations occur during this process. CFS 1712 waits for any outstanding I/O data traffic to and from the cache storage to complete in step 1806. CFS 1712 notifies the VLUN driver that I/Os are complete. Once the outstanding I/O transfers complete, a CFS stall is engaged. Thus the VLUN driver initiates the resizing from 4 GB to 8 GB in step 1808 and instructs the SCSI filter 1716 that the new allocation of cache storage space is 8 GB in step 1810. In step 1812, the SCSI filter 1716 then instructs CFS to resize the allocation of storage space to 8 GB. In one embodiment, when this is done, CFS maintains the previously allocated 4 GB of cache storage space and simply adds the newly allocated space to its operations. Thus, CFS 1712 can maintain the cache tags and metadata associated with the previously allocated 4 GB of cache storage space, and allocates the additional 4 GB of cache storage space and assigns new cache tags as needed. In step 1814, control is returned to SCSI filter 1716, and in step 1816 the SCSI filter 1716 instructs VLUN driver 1722 that the provision change of cache storage space for virtual machine 1704 is completed. In step 1818 the VLUN driver instructs SCSI filter to resume operations. In step 1820, the SCSI filter instructs CFS to resume operations. In step 1822, the cache storage device is enabled, and I/O data traffic can resume to the cache storage device, and the virtual machine can continue to send I/O data traffic to either the cache storage device 1710 or the shared storage 1726.

Thus, a thin provisioned cache device is provided, where the limitation of a fixed disk capacity requirement in conventional virtual systems has been addressed. Thus, the operating system can essentially be deceived into thinking that a fixed amount of cache storage has been allocated so that applications in the operating system have no impact. And, the actual cache storage space allocated to any virtual machine may be resized on the fly without impacting other system operations. The result is an intelligent and optimized utilization of cache storage, where the available cache storage space is more efficiently utilized. Multiple virtual machines are dynamic in nature and their data flow and cache storage needs change dynamically. A virtual machine substantially reduces its demand for cache storage in different modes or circumstances. For example, it may power off or go into sleep mode, it may stall while moving from one host to another, and its needs will necessarily change when these operational changes occur. A virtual machine may alternatively increase its demand for cache storage in other modes or circumstances, such as when it wakes up from a sleep mode, arrives at a new host after moving, or simply experiences an upsurge in usage operations. This embodiment gives the host system the flexibility to dynamically change and optimizes the use of cache storage at the same time. Accordingly, the amount of cache storage designed in a host system can be minimized, substantially saving costs in a host system or device. The cache device, which is commonly implemented in expensive flash memory, is itself virtualized in this embodiment, and its operations are intelligently managed in a way that optimizes the use of its storage space, allocating cache storage to the various virtual machines according to their needs.

One fundamental precept of virtual systems is that shared storage must be secured among the different virtual machines. This is important because the different virtual machines may store confidential information in the various storage chunks in cache storage that possibly could be accessed by other virtual machines in the dynamic provisioning process. For example, a person's confidential financial and identity information may be stored by one virtual machine in one chunk of allocated cache data storage, and that machine's allocated cache storage may be resized as a result of low demand. The virtual machine may then give up allocated cache storage space to another machine in the dynamic allocation process, also giving the second virtual machine that acquires the data chunk having the person's confidential information stored in that chunk. This is thus a security risk, and the dynamic allocation process that has been designed to optimize the use of the cache storage may cause a problem when resizing cache space of particular machines and allocating cache storage chunks from one virtual machine to another. One embodiment of the invention addresses this security risk in an elegant manner without substantial impact to the work flow within the system while dynamically provisioning cache storage chunks.

Figure 19:
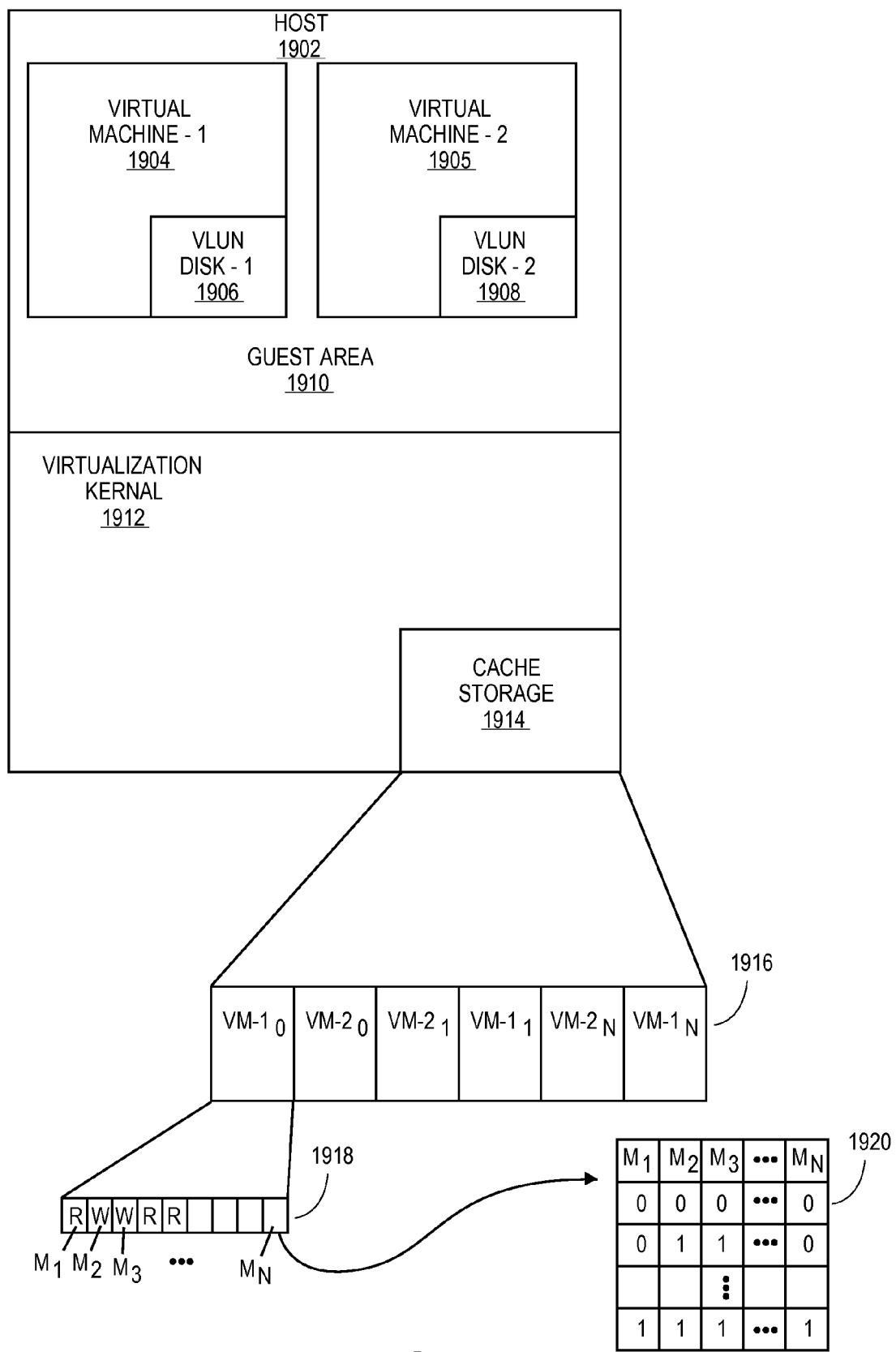

Referring to FIG. 19, a virtual system 1900 is illustrated showing a host 1902 having virtual machines 1904, 1905 and corresponding VLUN disks 1906, 1908 all located within guest area 1910. The virtualization kernel 1912 has a cache storage 1914 that is divided up into physically identifiable chunks 1916, where the chunks shown are showing chunks allocated to virtual machine-1 1904 as $VM-1_0$, $VM-1_1$ and, $VM-1_n$ and chunks allocated to Virtual Machine-2 as $VM-2_0$, $VM-2_1$ and $VM-2_n$. In operation, the individual chunks must be properly handled when being allocated from one virtual machine to another in the dynamic provisioning process, where the subsequent virtual machine acquiring a new chunk of cache storage space is ensured not to ever gain access to any leftover information from any prior virtual machine remaining in the chunk.

One way to address this issue is to erase any prior information from any chunk that is allocated from one virtual machine's cache space to another, ensuring that the data is deleted or otherwise rendered inaccessible to any subsequent virtual machine that gains access to the chunk. Though this is an attractive option that provides definiteness to securing information in reallocated chunks of cache storage, it has drawbacks. One primary drawback is that it requires I/O data transfers to zero out or otherwise delete the stored information, causing a burden on the system. In a dynamic allocation process, this would require all chunks of data storage that are to be transferred for use by a different dynamic machine to be deleted prior to the transfer by writing zeros into the chunks' space, which adds no value to the virtual system. One characteristic of cache storage devices that are made up of flash memory is that writing takes a long time to perform compared to reading. Thus, this may bog down the system during the dynamic provisioning process. Furthermore, the dynamic provisioning process causes latency in the system, delaying the operation of the virtual machine that is gaining the new chunk of data to be zeroed out.

One other approach is to use a new primitive operation that flash memory vendors refer to as TRIM. The problem is that not all vendors of flash memory support TRIM, and the contents of a data block that have been trimmed are undefined, and therefore TRIM cannot be trusted. Thus, there is no guarantee that the old data in the reallocated chunk has been deleted.

Figure 20:
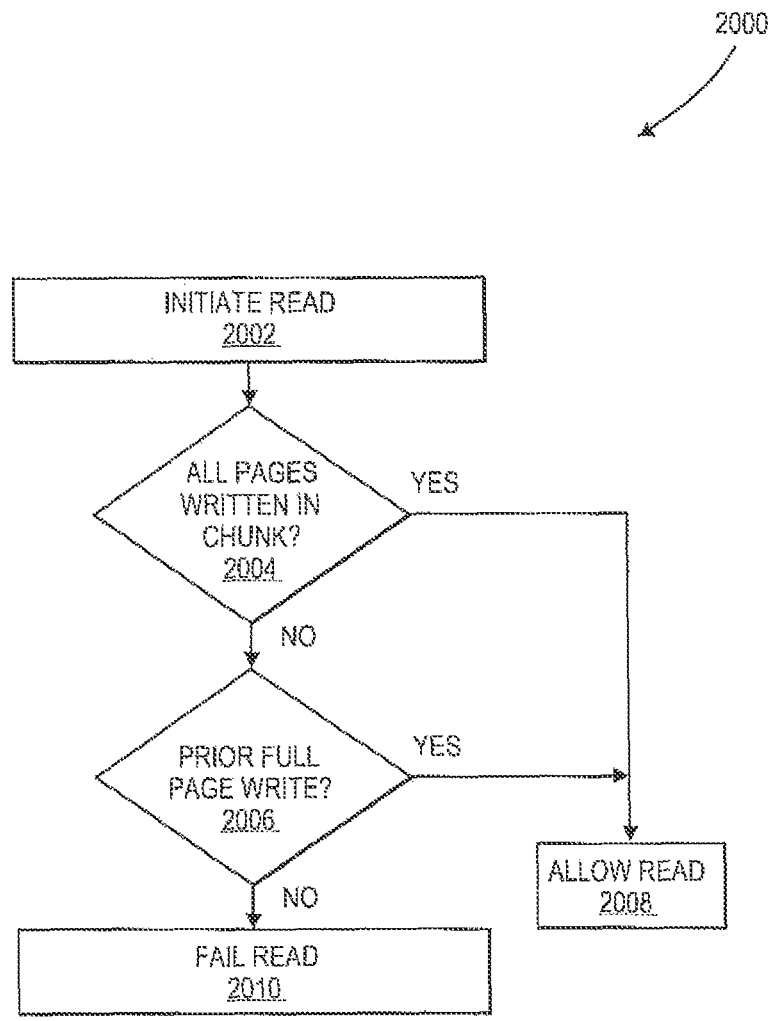

Yet another approach is to make sure that the new virtual machine acquiring the chunk having the old data has no access to it. This may be accomplished by keeping track of whether the prior virtual machine has touched or otherwise used the cache storage space in the chunk before the chunk was allocated to the current virtual machine. It may further be improved by tracking whether any prior machine has accessed the chunk. It can be determined whether a particular chunk has been written to or otherwise modified after being allocated to one or more previous virtual machines. A bit mask is used to protect from the reading of old data to a virtual machine that has acquired cache storage chunks that were utilized by other virtual machines. In one embodiment, each 4 kb sub portion of the chunk is monitored to determine whether there has been a read or a write in each 4 kb sub portion. This is determined at the time the subsequent virtual machine accesses the newly acquired chunk, and is performed only when necessary to prevent the reading of old data by the acquiring virtual machine. After the provisioning of the chunk to a machine, each sub portion of the chunk is tested prior to any read operation on the new chunk by the acquiring virtual machine. Referring to FIG. 20, a process flow chart illustrates an example of such a testing operation that is used in conjunction with the read operations of a virtual machine. The process for protection of the old data is called a "read before write" protection. Thus, if any sub portion is read by a virtual machine that has acquired a chunk from one or more virtual machines, it is presumed that the chunk has old data and that it must not be accessed by the later acquiring virtual machine. Here, a chunk is provisioned from a first virtual machine to a second virtual machine 2002, for example chunk $VM-1_0$ having subdivided spaces $m_1$ through $m_n$ 1918. In step 2004, a read is initiated by the second virtual machine, and it is determined whether there was a prior full write to entire space $m_1$ by the second virtual machine.

In step 2004, a read is initiated. The process then proceeds to step 2006, where it is determined whether all pages were written to in the chunk at least once by the second virtual machine, and in particular whether this has occurred since the chunk was provisioned to the second virtual machine. If yes, then the need for this security test is obviated, and the reads to this chunk by the second virtual machine may resume in step 2008 without further testing. If all pages of the chunk in question have not been fully written over by the second virtual machine, then the reads resume in step 2012 with testing and continues on an as needed basis until each page is fully written over at least once, so long as the second virtual machine continues to be allocated the chunk in question and continues to initiate reads into the chunk's pages. In step 2006, it is determined whether there was a full write of the page that covers any possible old data. This determination may be done in various ways. In one embodiment, an indication of whether a particular page is partially written to or completely written over may be indicated by a bit that is on or off, logic 1 or logic 0 for example. This bit may be recorded in a table, such as table 1920. This may be in the form of a type of bit mask that can be stored in cache or other storage location. The indication of whether a page is entirely written over may be indicated by a single bit that is toggled to a binary "1" when a full write over occurs. When a partial write occurs to the page of a chunk, the VLUN driver converts the partial write to a full write with zeros filled in for the data space that is not covered by the partial write from CFS. Any other write to a page while the very first write is in progress will be returned with error. If a read occurs before a write, then a test would show that a full write has not occurred, and the binary bit should be "0." As the chart 1920 shows, the table may start out as all logical "0," indicating that the individual pages have not been fully written over since being allocated to the second virtual machine. As full write over occurs in each page, the full write indicator bits eventually become more populated across the array, eventually ending up over time with all logical "1" bits, indicating that each and every page has been written over by the second virtual machine at least once.

If there was a prior full page write, then the read is allowed in step 2008, otherwise the read is failed and not allowed in step 2010. This process is an intelligent and efficient process for preventing read before write security breaches, and substantially reduces the amount of I/O traffic and latencies. Using the bit indicator approach, the trade off is the use of some memory space for the indicator bits for each sub portion and the use of processor resources to perform the testing, but the valuable security and the minimization of unnecessary I/O traffic in the process makes this read before write testing process valuable and useful.

Figure 21:
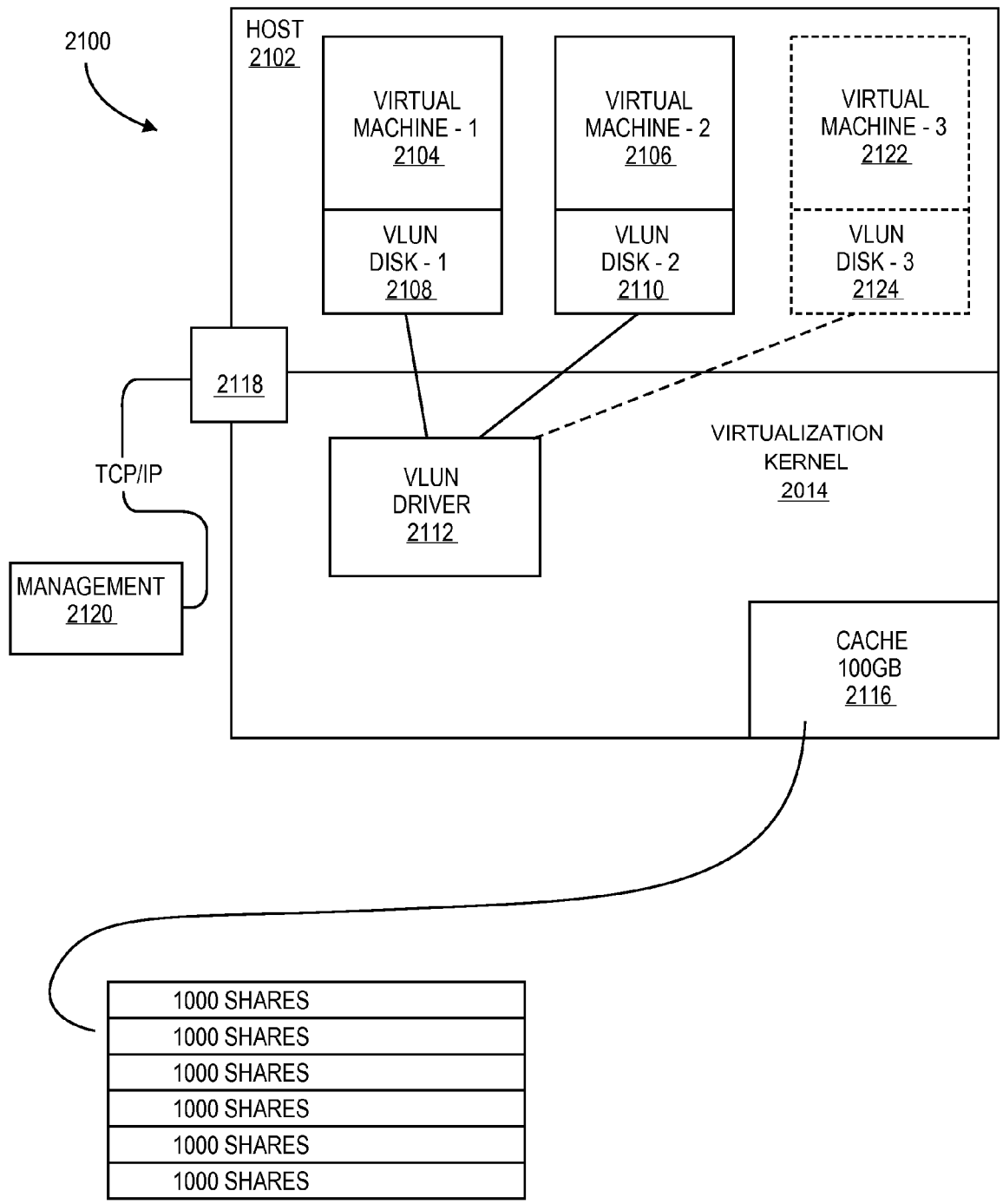

Referring to FIG. 21, a virtual system configured for cache allocation management is shown, where a host 2102 includes virtual machines 2104, 2106 and corresponding VLUN disks 2108, 2110, located within a guest area and that communicate with common VLUN driver 2112 located within the virtualization kernel 2014. Cache storage 2116 is configured to store data from the virtual machines as allocated by VLUN driver 2112. The system further includes a VLUN manager 2118 that communicates between host 2102 and management module 2120 via a TCP/IP protocol connection.

The VLUN Manager 2118 is a user space daemon that configures the provisioning of the portions of the cache storage among the different virtual machines. This is an application that runs on the host to parcel out the cache storage device fairly and efficiently among the virtual machines residing on the host. When a management module 2120 is configured to establish allocations for the virtual machines. This sets the relative proportions allocated among the various virtual machines. Shares of storage space are then defined for each virtual machine, for example:

Virtual Machine 1—1000 shares
Virtual Machine 2—3000 shares
Virtual Machine 3—2000 shares These shares are used as an abstract definition of proportions of cache storage that is allocated to particular machines without regard to actual size and space that is allocated to a particular virtual machine. This way, the definition and system works with any size cache storage space or device, whether it is flash memory or other type of memory, and the shares can be divided up and allocated among multiple virtual machines as they are added or subtracted from the system, as further cache memory is added, and as the system changes over time. The shares allow for the relative dynamic percentage for each virtual machine as the system changes. Thus, for each virtual machine (VM), the amount of cache storage it receives can be calculated as follows:

Capacity of VM-1 shares=(VM-1 shares/total active VM shares) Cache Capacity where the total "active" VM shares are the shares allocated to powered-on virtual machines. Thus, for virtual machines that are not up and running, their shares are not accounted for in the capacity equation. Thus, for the example in FIG. 21, and given the allocated shares set forth above, since only Virtual Machine-1 and Virtual Machine-2 are active, and given the example of a 100 GB cache storage capacity, the following capacities may be calculated:

VM1 Capacity=(1000/4000)100 GB=25.0 GB

VM2 Capacity=(3000/4000)100 GB=75.0 GB

The different virtual machines may be powering on and off, vMotion'ing away and back to the host, so the capacity allocations can change over time. At the time Virtual Machine-3 (for example virtual machine 2122 having VLUN disk-3 2124 in FIG. 21) comes on line, the capacity of each host would be calculated as follows:

VM1 Capacity=(1000/6000)100 GB=16.7 GB

VM2 Capacity=(3000/6000)100 GB=50.0 GB

VM3 Capacity=(2000/6000)100 GB=33.3 GB

Thus, the current percentage may be calculated based on current allocations. In performing this transition of VM3 online and being allocated its percentage or shares of cache storage, VM3 must be allocated its percentage shares, and virtual machines VM1 and VM2 must relinquish storage space. This is accomplished by the methods discussed above in connection with FIGS. 17 and 18. Each machine must stall operations, change capacity, and then resume operations. Thus, for each machine, VM2 must shrink from 75% to 50%, VM1 must shrink from 25% to 17%, and VM3 can then be given its 33.3%, which is taken from the relinquished storage space from VM1 and VM2. Thus, the embodiment provides a dynamic provisioning of cache using a virtual disk approach.

Additionally, to the extent virtual machines can be provisioned storage space according to the shares concept, IOPS capacity can also be allocated among the virtual machines. Thus, for each machine, VM1 Capacity=(1000/6000)100 k IOPS VM2 Capacity=(3000/6000)100 k IOPS VM3 Capacity=(2000/6000)100 k IOPS One feature that is desired in virtual systems is the ability to move virtual machines from one host to another without powering down or taking the virtual machine offline in the process. In conventional systems, since hosts are usually connected to shared storage, this process is well defined and seamless. However, in systems configured according to the various embodiments described above that utilize local cache storage rather than shared storage for certain virtual system operations, such as a thin provisioned cache, there are conflicts that result from exercising certain features common in virtual systems such as moving virtual machines from one host to another. In conventional virtual systems, a virtual machine may be moved from one host to another by utilizing shared storage. However, moving virtual machines from one host to another while utilizing the various embodiments described herein, problems would occur with the transfer, and critical data and virtual systems operations may be compromised. In some virtual systems, the move simply would not be allowed—such as by VMWare™ virtual system products for example. According to one embodiment, the issues related to the transfer of a virtual machine from one host to another without the aid of shared storage are addressed in an elegant manner, and transfers of virtual machines from one host to another is made seamless while also utilizing the various embodiments described herein. According to one embodiment, the virtual system may be configured to deceive the system into thinking that the local cache storage located in or communicating with the host is essentially a shared device.

Figure 22A:
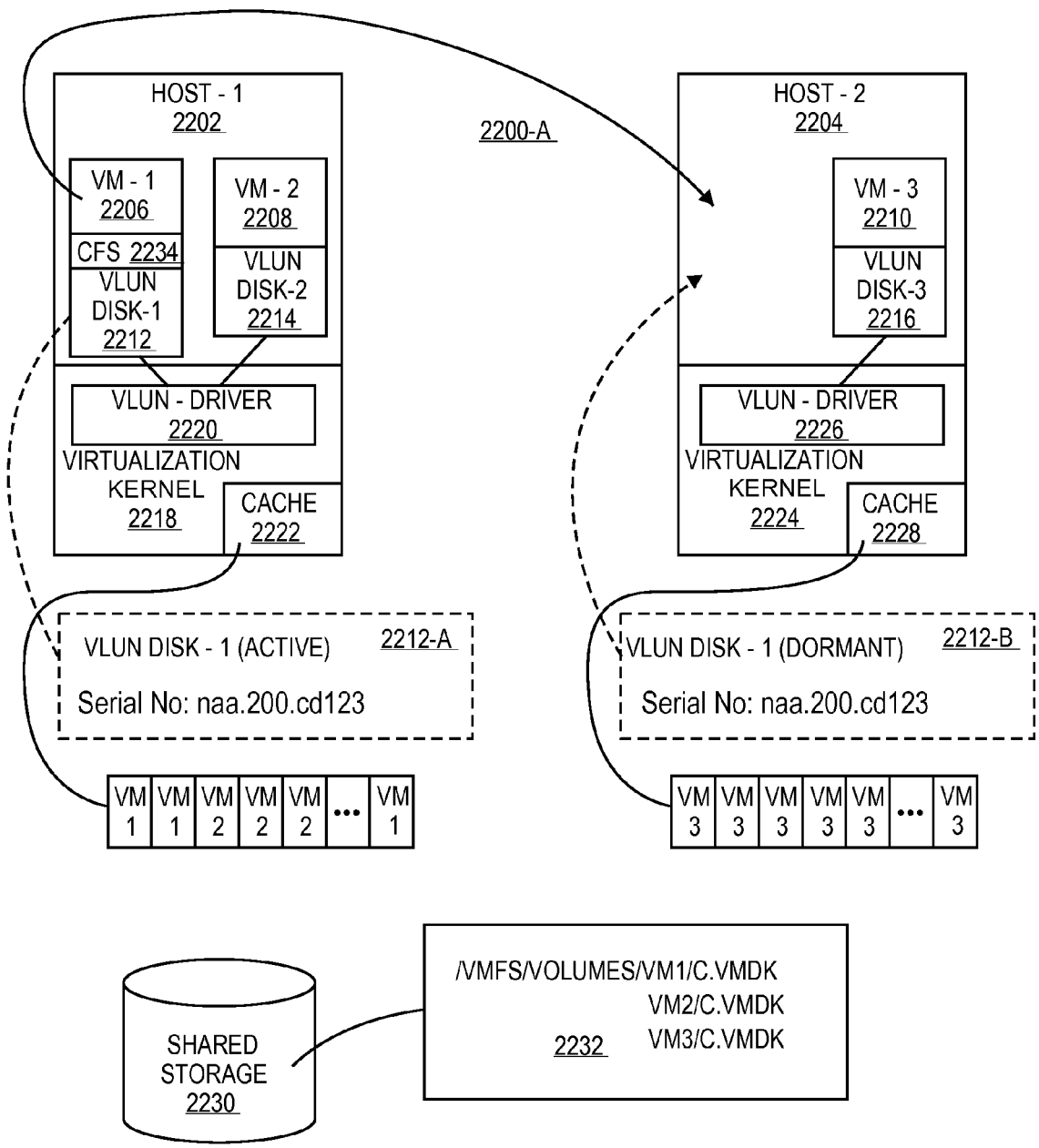

In one embodiment, in establishing a virtual system and adding virtual machines on separate hosts without shared storage, copies of the VLUN disks may exist on two or more different host in anticipation that the virtual machines may be moved from one host to another. Referring to FIG. 22A, one example of such a configuration is illustrated in a system 2200-*a* that includes two hosts Host-1, 2202 and Host-2, 2204, where Host-1 includes instances of two virtual machines, VM-1 2206 and VM-2 2208, that have VLUN disks 2212 and 2214 respectively. Host-2 includes virtual machine VM-3 2210 having VLUN disk-3 2216. Host-1 further includes virtualization kernel 2218 and VLUN driver 2220 instantiated therein, as well as cache storage 2222 for storing cache data from the virtual machines 2206, 2208. Each cache storage may be divided up into chunks as discussed above, where the chunks are identified as holding either VM-1 or VM-2 data in Host-1, and VM-3 data in Host-2. Host-2 includes its own virtualization kernel 2224, VLUN driver 2226 and cache storage 2228. In one embodiment, the system is configured to allow a transfer of one or any virtual machine, such as VM-1 for example, from Host-1 to Host-2, and to do so substantially seamlessly without the need to completely shut down.

In conventional virtual systems, shared storage 2230 stores the instances of the main storage drives 2232 of the virtual machines located among different hosts. This is typically a requirement in virtual systems to enable the transfer of virtual machines from one host to another. Given the embodiments described herein for optimizing cache transfers by utilizing the local cache devices of the hosts, this requirement is not met without further addressing this issue. According to one embodiment however, this requirement is addressed and virtual machine transfers from one host to another are accomplished by instantiating the main storage drive 2212-A in an active state in Host-1's cache storage 2222 and also storing corresponding main storage drive 2212-B in a dormant state in Host-2's cache storage 2228. In one example, a substantiation of VLUN disk-1 2212-A is created on VLUN disk-1 2212, having a serial number of "naa.200.cd123" in this example. An identical substantiation is made in on host-2 and has the same serial number, but it is dormant, where VM-1 does not actively use the copy 2212-B, but rather uses it as a type of holding place for VM-1 when and if it ever happens to transfer from Host-1 to Host-2.

In a system of multiple host computers that each have multiple virtual machines residing on them, multiple copies of VLUN disks can reside or be dynamically created among the different host computers to aid in transferring virtual machines from one host to another.

It has been observed that, in typical computing systems with peripheral and other system devices, such as virtual computing systems for example, SCSI operations serve as interfaces for devices within a system and can be utilized to fool the operating system into believing that the cache storage devices located in individual hosts are actually a unified shared device. When an operating system communicates to components within the system and discovers devices within the purview of the operating system, such as storage disks, VLUN disks, and other devices, it initiates queries when a device is found to learn the device's identity and relevant operating information. It questions who the manufacturer is, what the model number is, what the capacity is, and importantly for this embodiment, what the serial number is. The serial number is configured to be globally unique within the system. Thus, in a virtual system, the operating system queries discovered devices such as disks to identify them and to derive a serial number that will be used by the operating system to identify the storage device. For virtual machines, the operating system in conventional virtual systems identifies shared storage devices, and derives a unique serial number to identify it within the virtual system. Once the virtual machines are created, the conventional virtual systems identify each virtual machine as a shared storage device by using this unique serial number assigned to the shared storage.

According to the embodiments discussed herein however, cache storage devices are not shared among different hosts, but are local to the hosts and shared among virtual machines within the hosts. In operation, conventional virtual systems require that the virtual machines are assigned to shared storage in order to enable a transfer of a virtual machine from one host to another. According to one embodiment, fictitious shared storage is created and exported to the host as a Fibre channel or SAS device. Thus, the Fibre channel or SAS device is artificially recognized as a shared storage device with a unique serial number and is instantiated when a VLUN disk is created. VLUN disk devices are fictitious shared storage spaces that are associated with actual storage space in the local cache storage devices. Once created, these VLUN disks are treated as actual devices from the perspective of the operating system. The unique serial numbers for VLUN disks instantiated within the local cache devices, such as "naa.200.cd123", are derived by the virtualization kernel from the serial number of the shared local storage, and each are unique and associated with a particular VLUN disk. Thus, when the VLUN disk is created, it is created with the unique serial number, and these are recognize by the operating system as legitimate entities, but are fictitious shared storage. This derived serial number is also used to create another VLUN disk in Host-2, such as VLUN disk-1 2212-B, so that a virtual machine such as VM-1 will have a corresponding VLUN disk in the other host to communicate to and continue its I/O data traffic after transferred to Host-2.

Figure 23:
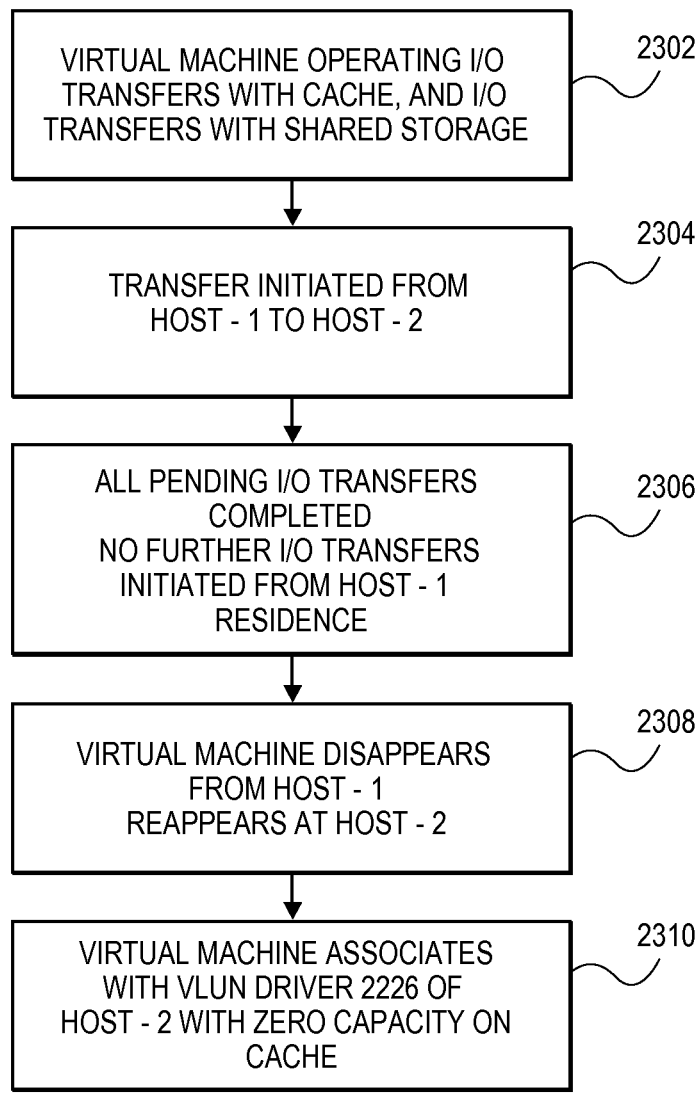

While running in Host-1 prior to moving, VM-1 through CFS 2234 believes it has some amount of data stored in the cache storage 2222, having chunks designated VM 1 in this illustration, and these chunks of data storage are not resident in Host-2 after the move. FIG. 23 is a flow chart 230 showing general steps of a transfer process that may occur prior to the move. In step 2302, CFS is actively caching data and issuing I/O data transfers to and from the cache storage in normal operation. CFS is doing read operations to the designated chunks of data storage prior to the move. The move is initiated in step 2304, and then in step 2306 the hypervisor first completes VM-1's initiated I/O transfers to the cache and any shared storage, and then stops these I/O transfers for a small period of time prior to the transfer of the virtual machine. In step 2308, the VM-1 then stops operating and essentially disappears from Host-1, and then reappears on Host-2 and begins operations.

Once a virtual machine moves from one host to another, the data is left resident on the prior host, Host-1 for example, and when the virtual machine arrives at the destination host, Host-2 in this example, the data is left behind. Again, this breaks the design assumption of conventional virtual systems that requires and assumes the existence of having the I/O data transfers associated with the virtual machine to be available to the virtual machine when it transfers, which is typically located on remote shared storage that is shared among different hosts. Having copies of the VLUN disks of the different virtual machines is an approach used to essentially deceive existing virtual systems into believing that each virtual machine is storing I/O data transfers in remote shared storage.

Figure 22B:
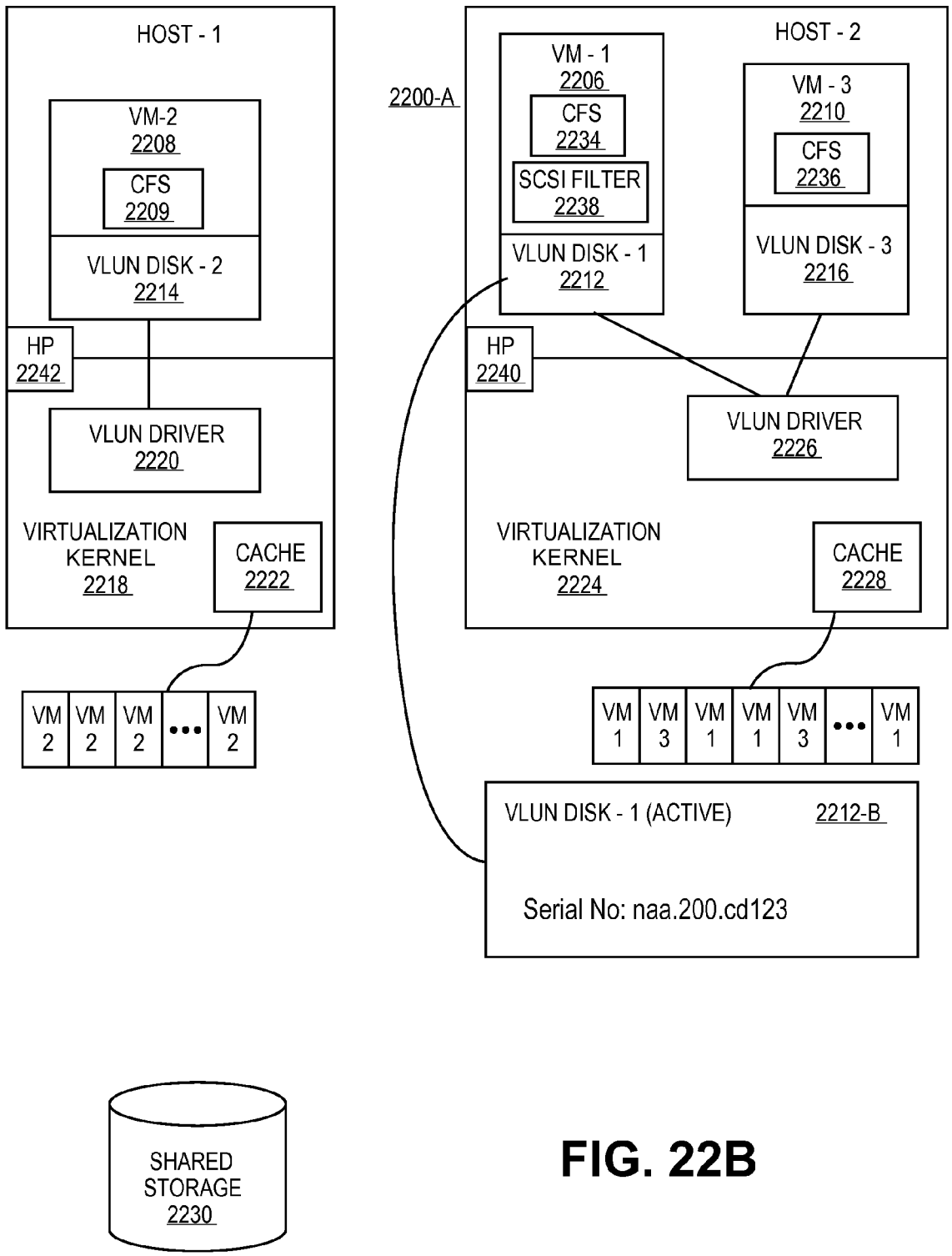
Figure 24:
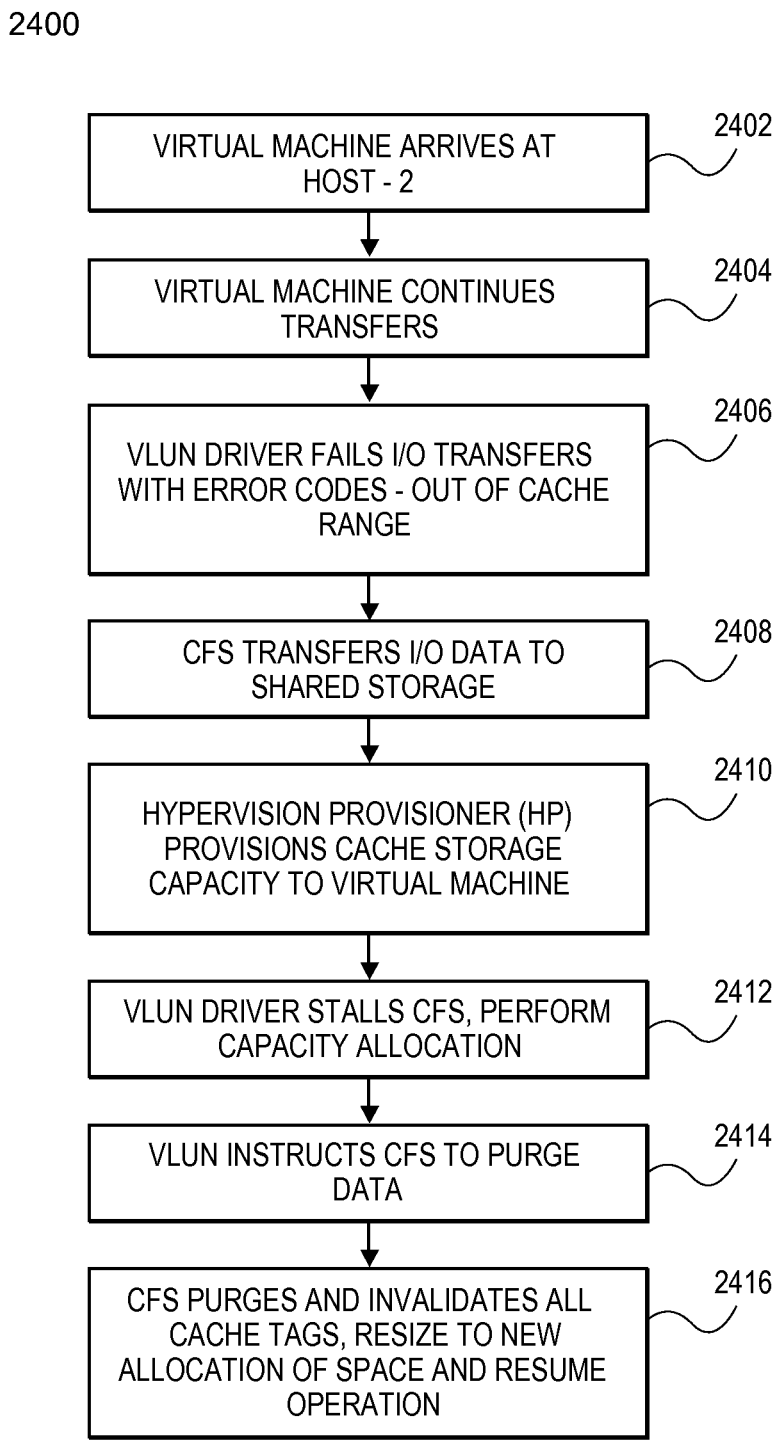

In conventional systems, the hypervisor stalls I/O transfers to the remote storage device prior to transferring from one host to another. The virtual machine is then transferred to another host, instantiated on that host, and operations resume. In this embodiment, however, there is not only remote shared storage for operations, but also local storage. After the transfer, in step 2310, VM-1 is associated with VLUN driver 2226 and cache 2228, which does not have the former cached data, and VM-1 has essentially zero capacity in the local cache 2228. Referring to FIG. 22B, the post-move system is illustrated, with VM-1 2206 appearing in Host-2, VLUN disk 2212 associating with VLUN driver 2226, and VLUN disk-1, now designated as 2212-B and being in the active state, with identical serial number naa.200.cd123. After the move, CFS 2234 of VM-1 still registers that it has 4 GB of data, and that it has data chunks stored in the cache 2222, but is now located in Host-2 without access to that cache storage with that capacity and also without access to the stored data that is still resident in cache storage 2222. Thus, VM-1 is essentially not aware that the move has occurred. Referring back to FIG. 22A, prior to the move Host-2 has only VM-3 that has the entire capacity of cache 2228 (Note: In a typical system, multiple virtual machines VM-1, VM-2, ... VM-n, exists in a host, and there is a complex mapping of shared cache storage. For simplicity of discussion and to avoid obscuring the description of the embodiments, only these three virtual machines are illustrated). When VM-1 arrives in Host-2, VM-3 has substantially the entire capacity of cache 2228, and VM-1 needs to get acclimated and acquire capacity in resident cache storage 2228. FIG. 24 shows an example acclamation process 2400.

After arriving in Host-2 in step 2402, CFS will continue to send I/O transfers to the VLUN driver 2226 in step 2404. The VLUN driver will fail the I/O transfers in step 2406 with errors to the CFS that VM-1 is out of its range and has no capacity. The error code is interpreted and recognized by the SCSI filter 2238 within VM-1. The SCSI filter will fail the I/O transfer requests to the CFS 2234 and request CFS to invalidate the cache tags associated with the transfers. Thus, there is a small period of time after the transfer from Host-1 to Host-2 where there is no cache storage capacity available to VM-1 in Host-2. The small number of I/O transfers that are issued are failed, and the cache tags are invalidated. The CFS will then reissue the I/O transfers to shared storage 2230 in step 2408 until it acquires capacity in local cache storage 2228. VLUN Manager 2240 then recognizes the arrival of VM-1 in Host-2, and provisions cache storage capacity for VM-1 in step 2410 according to an allocation of shares as discussed above. In step 2412, the VLUN driver stalls CFS as discussed above to perform capacity allocation. In step 2414 VLUN instructs CFS to purge its data related to the I/O data transfers, because CFS essentially thinks that it has stored data in the cache storage and 4 GB in space, but that is all left behind in Host-1's local cache storage 2222. This is different than the capacity allocation as discussed above, because the resize that occurs after a transfer from one host to another leaves the data behind, and the stored data in the allocated space is not the same data that CFS registers as the stored data, because it is left behind and does not exist in Host-2's cache storage 2228. Thus, this is a unique resize and allocation of cache space. In step 2416, CFS will invalidate all cache tags, resize to new allocation of space and resume operation. Also, the allocation will utilize the bit mask processes to protect against VM-1 reading any old data that may have been written to the host by VM-3 or any other prior host. Thus, VM-1 would need to write to the chunks of allocated cache storage space before it can read, or the read requests will get a fail error. Thus, this embodiment allows the VLUN driver to essentially fool the virtual system to believe that shared storage exists, then allow a virtual machine to move from one host to another, then because VM-1 has a SCSI filter, it can talk to the VLUN driver to cover up the missteps, initially failing the I/Os to the VLUN device with an error, invalidate all past cache tags, allocating space to VM-1, and resuming operation of VM-1. Also the VLUN manager 2242 of 22B will allocate the space relinquished by VM-1 to virtual machines that are local to Host-1. Thus, virtual machines may be moved around to different hosts for non-destructive upgrades, balancing among hosts, failure recovery, and other operations that aid the virtual system.

As discussed herein, the invention may involve a number of functions to be performed by a computer processor, such as a microprocessor. The microprocessor may be a specialized or dedicated microprocessor that is configured to perform particular tasks according to the invention, by executing machine-readable software code that defines the particular tasks embodied by the invention. The microprocessor may also be configured to operate and communicate with other devices such as direct memory access modules, memory storage devices, Internet-related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of devices, such as laptop or desktop computers, hand held devices with processors or processing logic, and also possibly computer servers or other devices that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the invention as described herein enable the physical transformation of these memory devices. Accordingly, the invention as described herein is directed to novel and useful systems and methods that, in one or more embodiments, are able to transform the memory device into a different state. The invention is not limited to any particular type of memory device, or any commonly used protocol for storing and retrieving information to and from these memory devices, respectively.

Embodiments of the systems and methods described herein facilitate the management of data input/output operations. Additionally, some embodiments may be used in conjunction with one or more conventional data management systems and methods, or conventional virtualized systems. For example, one embodiment may be used as an improvement of existing data management systems.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

Finally, although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method, comprising:
provisioning respective amounts of cache resources to virtual machines operating on a host computing device, such that a first one of the virtual machines is provisioned a first amount of cache resources and a second one of the virtual machines is provisioned a second, different amount of cache resources;
modifying the cache resources provisioned to the first virtual machine by assigning a set of cache storage locations comprising data of another virtual machine to the first virtual machine; and
servicing storage requests of the virtual machines by use of cache storage resources of the host computing device in accordance with the cache resources provisioned to the respective virtual machines, wherein servicing the storage requests of the virtual machines comprises;
blocking the first virtual machine from reading data stored on the set of cache storage locations;
allowing read access to a cache storage location of the set of cache storage locations in response the first virtual machine writing data to the cache storage location.

2. The method of claim 1, further comprising modifying the amount of cache resources provisioned to the first virtual machine in response to storage requests of the virtual machines.

3. The method of claim 1, further comprising:
monitoring input/output requests issued by the virtual machines; and
modifying the amount of cache resources provisioned to the respective virtual machines in response to determining one or more input/output requirements of the virtual machines based on the monitoring.

4. The method of claim 1, further comprising modifying the amount of cache resources provisioned to the first virtual machine based on a request from another one of the virtual machines.

5. The method of claim 1, wherein the cache resources provisioned to the virtual machines correspond to cache storage resources of a cache storage device, the method further comprising mapping cache addresses of respective virtual machines to physical storage locations of the cache storage device.

6. The method of claim 1, further comprising modifying the amount of cache resources provisioned to the first virtual machine by allocating a cache storage location of the first virtual machine to the second virtual machine, the method further comprising preventing the second virtual machine from accessing data of the first virtual machine stored on the cache storage location.

7. The method of claim 1, further comprising:
maintaining a bitmap representing write operations by the first virtual machine within the set of cache storage locations; and
identifying cache storage locations comprising data of the first virtual machine by use of the bitmap.

8. The method of claim 1, wherein provisioning the respective amounts of cache resources to the virtual machines comprises provisioning respective shares of cache storage capacity to the virtual machines within a cache.

9. The method of claim 1, wherein provisioning the respective amounts of cache resources to the virtual machines comprises provisioning respective shares of input/output capacity to the virtual machines.

10. An apparatus, comprising:
a virtual storage driver embodied as computer-readable instructions stored on a non-transitory storage medium of a computing device, the virtual storage driver configured to provide caching services to a plurality of virtual machines by use of a non-volatile storage device;
a cache provisioner module configured to allocate storage capacity of the non-volatile storage device to respective virtual machines for storage of cache data of the respective virtual machines; and
a cache map module configured to map virtual cache addresses of the virtual machines to storage addresses on the non-volatile storage device, and to control access to data of the virtual machines,
wherein the cache provisioner module is configured to assign a cache storage location to a particular virtual machine, and to block the particular virtual machine from reading data stored on the cache storage location until an operation to write data of the particular virtual machine to the cache storage location.

11. The apparatus of claim 10, wherein the cache provisioner module is configured to allocate a portion of the non-volatile storage device comprising cache data of a first one of the virtual machines to a second one of the virtual machines, and wherein the cache mapping module is configured to reject access, by the second virtual machine, to the cache data of the first virtual machine stored in the portion.

12. The apparatus of claim 11, wherein the cache mapping module is configured to provide access to the portion in response to storing cache data of the second virtual machine at least once within the portion.

13. The apparatus of claim 10, wherein the cache provisioner module is configured to dynamically modify the storage capacity of the non-volatile storage device allocated to the respective virtual machines, the apparatus further comprising a virtual disk configured to represent the dynamically allocated storage capacity as fixed-size storage devices within the respective virtual machines.

14. The apparatus of claim 10, wherein the virtual storage driver comprises a virtual logical unit number (VLUN) driver configured for operation within a virtualization kernel.

15. The apparatus of claim 10, wherein the cache provisioner module is configured to modify the storage capacity of the non-volatile storage device allocated to a first one of the virtual machines in response to storage operations of the virtual machines performed on the non-volatile storage device.

16. The apparatus of claim 10, wherein the cache provisioner module is configured to modify the storage capacity of the non-volatile storage device allocated to a first one of the virtual machines in response to an allocation request from one or more of the first virtual machine and another one of the virtual machines.

17. The apparatus of claim 10, wherein the cache provisioner module is configured to allocate input/output capacity between the respective virtual machines, and to manage an input/output rate of a virtual machine in response to determining that the virtual machine is exceeding an input/output capacity allocated to the virtual machine.

18. A non-transitory computer readable storage medium having program instructions stored thereon, wherein the program instructions are executable by a computing system to cause the computing system to perform operations, comprising:
assigning chunks of shared cache storage to respective virtual machines;

modifying a number of chunks allocated to the respective virtual machines in response to cache storage requirements of the virtual machines, wherein modifying the number of chunks allocated to the respective virtual machines comprises,
   assigning a chunk of the shared virtual machine cache previously assigned to another virtual machine to a first virtual machine, and
   restricting access, by the first virtual machine, to portions of the chunk corresponding to write operations of the first virtual machine; and
representing variably sized cache storage resources corresponding to the chunks of the shared cache storage allocated to the virtual machines as fixed-size storage devices within the respective virtual machines.

19. The non-transitory computer readable storage medium of claim 18, the operations further comprising mapping a contiguous set of virtual cache addresses of a virtual machine to a disjoint set of cache chunks of the shared cache storage.

20. The non-transitory computer readable storage medium of claim 18, the operations further comprising:
allocating input/output operations (IOPs) capacity to the virtual machines; and
servicing cache storage requests of the virtual machines in accordance with the IOPs capacity allocated to the virtual machines.

21. A method, comprising:
allocating input/output operations (IOPs) capacity to virtual machines operating within a hypervisor, such that a first one of the virtual machines is allocated a first IOPs capacity and a second one of the virtual machines is allocated a second, different IOPs capacity;
allocating cache storage capacity to the virtual machines from cache storage resources of the host computing device, including allocating a cache page to a first virtual machine that comprises data of a second virtual machine;
servicing storage requests of the virtual machines by use of the cache storage capacity allocated to the virtual machines in the cache storage resources of the host computing device in accordance with the I0Ps capacity allocated to the virtual machines, wherein servicing storage requests comprises restricting read access to the cache page until data is written to the cache page by the first virtual machine.

\* \* \* \* \*